United States Patent
Du et al.

(10) Patent No.: US 12,521,429 B2
(45) Date of Patent: Jan. 13, 2026

(54) ZIKA VIRUS IMMUNOGENIC COMPOSITIONS

(71) Applicants: New York Blood Center, Inc., New York, NY (US); Loyola University of Chicago, Maywood, IL (US)

(72) Inventors: Lanying Du, New York, NY (US); Wanbo Tai, New York, NY (US); Liang Qiao, Maywood, IL (US); Frank Gambino, Maywood, IL (US)

(73) Assignees: New York Blood Center, Inc., Rye, NY (US); Loyola University of Chicago, Maywood, IL (US)

( * ) Notice: Subject to any disclaimer, the term of this patent is extended or adjusted under 35 U.S.C. 154(b) by 751 days.

(21) Appl. No.: 17/797,662

(22) PCT Filed: Feb. 4, 2021

(86) PCT No.: PCT/US2021/016654
§ 371 (c)(1),
(2) Date: Aug. 4, 2022

(87) PCT Pub. No.: WO2021/158815
PCT Pub. Date: Aug. 12, 2021

(65) Prior Publication Data
US 2023/0065376 A1 Mar. 2, 2023

Related U.S. Application Data

(60) Provisional application No. 62/970,592, filed on Feb. 5, 2020.

(51) Int. Cl.
*A61K 39/12* (2006.01)
*A61P 31/14* (2006.01)
*A61K 39/00* (2006.01)

(52) U.S. Cl.
CPC .............. *A61K 39/12* (2013.01); *A61P 31/14* (2018.01); *A61K 2039/53* (2013.01); *A61K 2039/55505* (2013.01); *A61K 2039/55572* (2013.01); *A61K 2039/572* (2013.01); *A61K 2039/6031* (2013.01)

(58) Field of Classification Search
CPC ...................................................... A61K 39/12
USPC ...................................................... 424/186.1
See application file for complete search history.

(56) References Cited

U.S. PATENT DOCUMENTS

| 2019/0008945 A1 | 1/2019 | Barbero Calzado et al. |
| 2019/0083601 A1 | 3/2019 | Tauber et al. |
| 2019/0175716 A1 | 6/2019 | Gilbert et al. |

FOREIGN PATENT DOCUMENTS

| WO | 2017/140905 A1 | 8/2017 |
| WO | 2018/129160 A1 | 7/2018 |
| WO | 2019/126690 A1 | 6/2019 |
| WO | 2021/158815 A1 | 8/2021 |

OTHER PUBLICATIONS

International Search Report and Written Opinion, mailed May 3, 2021, for International Application Serial No. PCT/US2021/016654 filed on Feb. 4, 2021.
Griffin et al., DNA vaccination protects mice against Zika virus-induced damage to the testes. Nat Commun, 8:15743 (2017).
Grubor-Bauk et al., NS1 DNA vaccination protects against Zika infection through T cell-mediated immunity in immunocompetent mice. Sci. Adv., 5:eaax2388 (2019).
Hassert et al., Identification of protective CD8 T cell responses in a mouse model of Zika virus infection. Front. Immunol., 10:1678 (2019).
Regla-Nava et al., Cross-reactive Dengue virus-specific CD8(+) T cells protect against Zika virus during pregnancy. Nature Communications, 9:3042 (2018).
Van Rompay et al., DNA vaccination before conception protects Zika virus-exposed pregnant macaques against prolonged viremia and improves fetal outcomes. Sci Transl Med, 11(523) (2019).
Wen et al., Identification of Zika virus epitopes reveals immunodominant and protective roles for dengue virus cross-reactive CD8+ T cells. Nat Microbiol., 2:17036 (2018).
Wen et al., Dengue virus-reactive CD8+ T cells mediate cross-protection against subsequent Zika virus challenge. Nature Communications, 8:1459 (2017).
Tripathi et al., A novel Zika virus mouse model reveals strain specific differences in virus pathogenesis and host inflammatory immune responses. PLoS Pathog, 13(3): e1006258 (2017).
Tebas et al., ZIKA-001: Safety and immunogenicity of an engineered DNA vaccine against Zika virus infection. N Engl J Med, Author Manuscript (PMC Nov. 2, 2019).
Tai et al., Transfusion-transmitted Zika virus infection in pregnant mice leads to broad tissue tropism with severe placental damage and fetal demise. Frontier in Microbiology, vol. 10, Article 29 (2019).
Wang et al., Effects of adjuvants on the immunogenicity and efficacy of a Zika virus envelope domain III subunit vaccine. Vaccines, 7:161 (2019).
Tai et al., Critical neutralizing fragment of Zika virus EDIII el

(56) References Cited

OTHER PUBLICATIONS

Shim et al., Zika virus-immune plasmas from symptomatic and asymptomatic individuals enhance Zika pathogenesis in adult mice and pregnant mice. mBio, 10:e00758-19 (2019).
Shan et al., A live-attenuated Zika virus vaccine candidate induces sterilizing immunity in mouse models. Nat Med., 23(6):763-767 (2017).
Screaton et al., New insights into dengue pathogenesis and control. Nature Reviews Immunology, 15:745-759 (2015).
Sapparapu et al., Neutralizing human antibodies prevent Zika virus replication and fetal disease in mice. Nature, 540(7633):443-447 (2016).
Rodriguez et al., DNA immunization: Ubiquitination of a viral protein enhances cytotoxic T-lymphocyte induction and antiviral protection but abrogates antibody induction. Journal of Virology, 71(11):8497-8503 (1997).
Richner et al., Vaccine mediated protection against Zika virus inducted congenital disease. Cell, 170(2):273-283 (2017).
Richner et al., Modified mRNA vaccines protect against Zika virus infection. Cell, 168(6):1114-1125 (2017).
Reynolds et al., Strong CD4 T cell responses to Zika virus antigens in a cohort of dengue virus immune mothers of congenital Zika virus syndrome infants. Frontiers in Immunology, 11:185 (2020).
Rathore et al., Maternal immunity and antibodies to dengue virus promote infection and Zika virus-induced microcephaly in fetuses. Science Advances, 5:eaav3208 (2019).
Rabelo et al., Placental inflammation and fetal injury in a rare Zika case associated with Guillain-Barre syndrome and abortion. Front. Microbiol., 9:1018 (2018).
Priyamvada et al., Human antibody responses after dengue virus infection are highly cross-reactive to Zika virus. PNAS, 113(28):7852-7857 (2016).
Phoo et al., Structure of the NS2B-NS3 protease from Zika virus after self-cleavage. Nature Communications, 7:13410 (2016).
Pardi et al., Zika virus protection by a single low dose nucleoside modified mRNA vaccination. Nature, 543 (7644):248-251 (2017).
Osuna et al., Nonhuman primate models of Zika virus infection, immunity, and therapeutic development. JID, 216 (Suppl 10):S928-S934 (2017).
Ngono et al., Cross-reactive T cell immunity to Dengue and Zika viruses: New insights into vaccine development. Front. Immunol., 10:1316 (2019).
Morrison et al., Animal models of Zika virus infection, pathogenesis, and immunity. Journal of Virology, 91(8): e00009-17 (2017).
Mirza et al., Towards peptide vaccines against Zika virus: Immunoinformatics combined with molecular dynamics simulations to predict antigenic epitopes of Zika viral proteins. Scientific Reports, 6:37313 (2016).
Miner et al., Zika virus infection during pregnancy in mice causes placental damage and fetal demise. Cell, 165(5):1081-1091 (2016).
Marzi et al., Lethal Zika virus disease models in young and older interferon alpha/beta receptor knock out mice. Front. Cell. Infect. Microbiol. 8:117 (2018).
Li et al., Structural characterization of the linked NS2B-NS3 protease of Zika virus. FEBS Letters 591:2338-2347 (2017).
Lazear et al., Zika virus: New clinical syndromes and its emergence in the western hemisphere. Journal of Virology, 90(10):4864-4875 (2016).
Larocca et al., Adenovirus vector-based vaccines confer maternal-fetal protection against Zika virus challenge in pregnant IFNalphaR-/- mice. Cell Host Microbe, 26(5):591-600 (2019).
Larocca et al., Vaccine Protection against Zika virus from Brazil. Nature, 536(7617):474-478 (2016).
Langerak et al., The possible role of cross-reactive dengue virus antibodies in Zika virus pathogenesis. PLoS Pathog, 15(4): e1007640 (2019).
Jegaskanda, Sinthujan. The potential role of Fc-receptor functions in the development of a universal influenza vaccine. Vaccines, 6:27 (2018).
Jagger et al., Protective efficacy of nucleic acid vaccines against transmission of Zika virus during pregnancy in mice. JID, 220:1577-1588 (2019).
Huang et al., CD8+ T cell immune response in immunocompetent mice during Zika virus infection. Journal of Virology, 91(22):e00900-17 (2017).
Herrera et al., Sustained specific and cross-reactive T cell responses to Zika and dengue virus NS3 in West Africa. Journal of Virology, 92(7): e01992-17 (2018).
Herrera et al., T cell responses to nonstructural protein 3 distinguish infections by dengue and Zika viruses. mBio, 9:e00755-18 (2018).
Grifoni et al., Prior dengue virus exposure shapes T cell immunity to Zika virus in humans. Journal of Virology, 91 (24): e01469-17 (2017).
Gorman et al., An immunocompetent mouse model of Zika virus infection. Cell Host Microbe, 23(5):672-685 (2018).
Gaudinski et al., Safety, tolerability, and immunogenicity of two Zika virus DNA vaccine candidates in healthy adults: randomised, open-label, phase 1 clinical trials. Lancet, 391:552-562 (2018).
Fowler et al., Maternally acquired Zika antibodies enhance dengue disease severity in mice. Cell Host Microbe, 24(5):743-750 (2018).
Du et al., Introduction of neutralizing immunogenicity index to the rational design of MERS coronavirus subunit vaccines. Nature Communications, 7:13473 (2016).
Dejnirattisai et al., Dengue virus sero-cross-reactivity drives antibody-dependent enhancement of infection with Zika virus. Nat Immunol, 17(9):1102-1108 (2016).
Brasil et al., Zika virus infection in pregnant women in Rio de Janeiro. N Eng J Med., 375(24):2321-2334 (2016).
Bardina et al., Enhancement of Zika virus pathogenesis by preexisting antiflavivirus immunity. Science, 356(6334):175-180 (2017).

Placenta

Fetal brain

FIG. 5D

Sera

Amniotic fluid

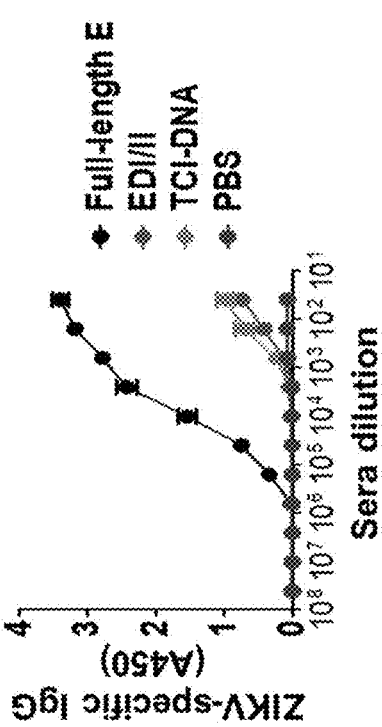
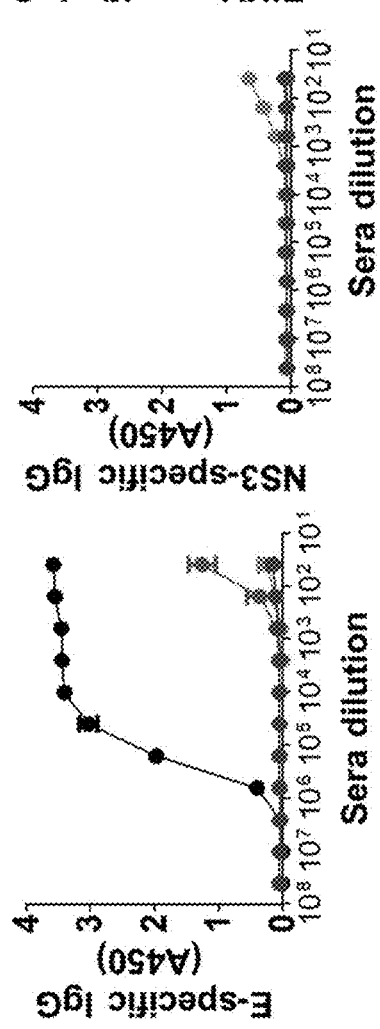
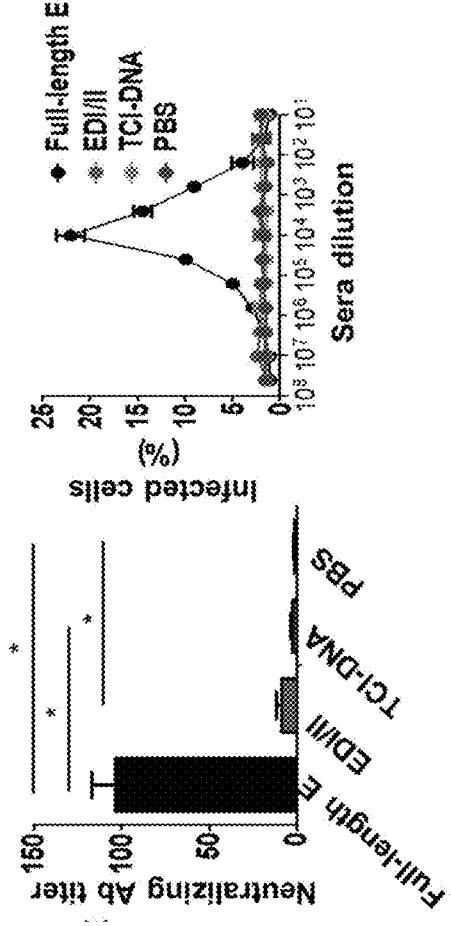
FIG. 9A  FIG. 9B  FIG. 9C  FIG. 9D  FIG. 9E

ZIKA VIRUS IMMUNOGENIC COMPOSITIONS

CROSS REFERENCE TO RELATED APPLICATIONS

This application is a National Phase application of PCT/US2021/016654 filed Feb. 4, 2021, which claims the benefit of U.S. provisional patent application 62/970,592 filed Feb. 5, 2020, the entire contents of both of which are incorporated by reference herein.

FEDERALLY SPONSORED RESEARCH OR DEVELOPMENT

This invention was made with government support under Grant No. R21AI145465 and R21AI137790 awarded by the National Institutes of Health. The government has certain rights in the invention.

TECHNICAL FIELD

The present disclosure relates to immunogenic compositions, and their use, in the prevention and treatment of Zika virus infections.

BACKGROUND

Zika virus (ZIKV) is a flavivirus in the same genus of human pathogenic arboviruses, including dengue virus (DENV), West Nile virus (WNV), yellow fever virus (YFV), and Japanese encephalitis virus (JEV). Zika virus causes neurological diseases such as Guillain-Barré syndrome and congenital Zika syndrome (symptoms include microcephaly, brain abnormalities, and other congenital malformations). Despite several ZIKV vaccines currently in clinical trials, no vaccines have been approved for preventing ZIKV infections in humans.

Dengue virus has four serotypes that differ by 30-35%, with their viral envelope (E) protein sequences differing from ZIKV E protein only by 41-46%. Dengue virus infection usually does not cause severe symptoms, but may lead to life-threatening complications such as Dengue Hemorrhage Fever (DHF) and Dengue Shock Syndrome (DSS). Primary infection with DENV leads to life-long immunity to the infecting serotype, but not to the other serotypes. Secondary infection by other serotypes is often responsible for DHF and DSS. In some cases, antibodies generated during primary DENV infection are unable to neutralize, but may opsonize, another serotype virus during secondary infection to target monocytes and macrophages via Fc-receptor-mediated endocytosis, leading to antibody-dependent enhancement (ADE) of infection.

Similar to DENV infection, ZIKV infection causes mild, if any, symptoms such as fever, myalgia, arthralgia, headache, conjunctivitis, and thrush in the most infected people. However, severe symptoms such as microcephaly and other neurological abnormalities have been associated with ZIKV infection. Human monoclonal antibodies (mAbs) generated from DENV-infected subjects cross-react with ZIKV. Importantly, DENV-specific antibodies may enhance ZIKV pathogenesis and ZIKV-induced microcephaly-like syndrome in mice. In addition, maternally-acquired ZIKV-specific antibodies enhanced DENV infection and heightened disease states in mice. However, it has been demonstrated that preexisting high antibody titers to DENV are associated with reduced risk of ZIKV infection and symptoms in humans. Vaccination with Dengvaxia®, which expresses the precursor of membrane (prM) and E proteins from four serotypes of DENV, in DENV uninfected children has led to more hospitalization than in the infected children, a possible consequence of ADE.

These studies strongly suggest that improper pre-existing immunity (non-neutralizing antibodies) may predispose to severe DENV/ZIKV-induced diseases such as DHF/DSS and microcephaly, a vaccine which does not induce antibodies that could enhance either disease should be developed. Thus, innovative approaches are needed in the development of a vaccine against ZIKV without inducing ADE-mediated symptoms.

SUMMARY

Provided herein are immunogenic compositions useful in the prevention and treatment of Zika virus infections.

Thus, disclosed herein are immunogenic compositions comprising an expression vector and a nucleotide sequence disposed therein, wherein the nucleotide sequence comprises: a nucleotide sequence encoding a Zika virus NS3 protein, wherein the NS3 nucleotide sequence is reorganized and comprises the nucleotide sequence of SEQ ID NO:3; and a ubiquitin nucleotide sequence upstream of the Zika virus NS3 protein sequence. In some embodiments, the nucleotide sequence is SEQ ID NO:5.

Disclosed herein are immunogenic compositions comprising an expression vector and a nucleotide sequence disposed therein, wherein the nucleotide sequence comprises a nucleotide sequence encoding a Zika virus NS3 protein, wherein the NS3 nucleotide sequence is reorganized and comprises the nucleotide sequence of SEQ ID NO:3.

Further disclosed herein are methods for preventing a Zika virus infection in a subject in need thereof, the method comprising administering a therapeutically effective amount of an immunogenic composition of the present disclosure to the subject. In some embodiments, the method further comprises co-administration of an adjuvant.

In some embodiments, the administration increases production of Zika virus-specific cytotoxic T lymphocytes and does not induce Zika virus-specific antibodies in the subject.

Also disclosed herein are methods for preventing birth defects associated with a Zika virus infection in a subject at risk of Zika virus infection, comprising immunizing a woman who is pregnant, who may become pregnant, or who plans to become pregnant, with an immunogenic composition of the present disclosure. In some embodiments, the immunized woman does not produce neutralizing antibodies after infection with Zika virus. In some embodiments, the immunized woman exhibits decreased decreases viral titers after infection with Zika virus compared to a woman not immunized with an immunogenic composition disclosed herein.

In some embodiments, the administration increases production of Zika virus-specific $CD8^+$ T lymphocytes in the woman. In some embodiments, as a result of the administration, a pregnancy in the woman does not result in Zika virus-associated birth defects.

In some embodiments, as a result of the administration of an immunogenic composition disclosed herein, a strong cytotoxic T lymphocyte (CTL) response against Zika virus is induced. In some embodiments, the CTL response provides protection against Zika virus infection.

Disclosed here is the use of an immunogenic composition of the present disclosure in the prevention of a Zika virus infection.

Disclosed here is the use of an immunogenic composition of the present disclosure in the prevention of birth defects associated with Zika virus infection.

Disclosed here in a composition of the present disclosure for use in the prevention of a Zika virus infection.

Disclosed here in a composition of the present disclosure for use in the prevention of birth defects associated with Zika virus infection.

DESCRIPTION OF DRAWINGS

FIG. 1A depicts a schematic diagram of plasmid design. The gene sequence (SEQ ID NO:1) encoding for the NS3 protein (SEQ ID NO:2) was split into three parts (denoted 1, 2, 3). The 30 nucleotide bases before and after any cleaved sequence were placed in front of each region to preserve any epitopes that may have been disrupted (SEQ ID NO:3). The open reading frame (ORF) gene encoding for a mouse monomer of ubiquitin (Ub; SEQ ID NO:4) was placed immediately upstream of the rearranged NS3 sequence. A glycine at the $76^{th}$ residue was modified to encode an alanine to enhance the stability of the Ub/NS3 complex (SEQ ID NO:5). FIG. 1B: 293T cells were transfected with the rearranged Ub/NS3 plasmid overnight. The cells were allowed to stably express plasmid for 36 h. After this period, the proteasome inhibitor MG132 was added overnight. The cell lysates from triplicate experiments were analyzed via Western blot for the expression of NS3 and beta-actin. FIG. 1C: Total band density was quantified using ImageJ and analyzed using GraphPad (Prism). * and ** indicate $P<0.05$ and $P<0.01$, respectively.

FIG. 2A depicts the relative gene expression of rearranged Ub/NS3 and GAPDH normalized control. FIG. 2B: PCR products were run on a 1% agarose gel. Each treatment condition was replicated twice. Data was analyzed by student's T test. Error bars depict standard error of the mean (s.e.m). ** indicates $P<0.01$.

FIG. 3A depicts the morphology of representative images of uteri (E11-E13) of ZIKV-challenged pregnant BALB/c mice immunized with one of the four compositions above. Arrows indicate fetal death. Viral titers in placenta (FIG. 3B) and amniotic fluid (FIG. 3C) of ZIKV-challenge pregnant mice were also determined. The detection limit was 12.5 PFU/g for placenta and 25 PFU/ml for amniotic fluid. The data in FIG. 3B and FIG. 3C are represented as mean±s.e.m (n=6).  and * indicate $P<0.01$ and $P<0.001$, respectively.

FIG. 4C: The immunized Ifnar1$^{-/-}$ mice were challenged with ZIKV (strain PAN2016 (2016/Panama), GenBank: KX198135) ($10^3$ PFU/mouse), and 6 days later sera and tissues (brain, kidney, lung, heart, liver, spleen, muscle, and testis) were collected for detection of viral titers using a plaque-forming assay. The detection limit was 25 PFU/ml (for sera), 12.5 PFU/g (for brain), 20 PFU/g (for kidney, spleen, and muscle), and 25 PFU/g (for lung, heart, liver, and testis). The data are represented as mean±s.e.m (n=3 for testis, and n=6 for other groups). *, , and * represent $P<0.05$, $P<0.01$, and $P<0.001$, respectively.

FIG. 5A-E depict that the ZIKV TCI-DNA vaccine-protected female pregnant Ifnar1$^{-/-}$ mice and their fetuses against ZIKV challenge. Female Ifnar1$^{-/-}$ mice were immunized with ZIKV TCI-DNA vaccine, control vaccines (ZIKV full-length E protein and EDI/II mixed peptides), or PBS control, and then mated with male Ifnar1$^{-/-}$ mice at day 10 post-$2^{nd}$ immunization. The pregnant mice (E10-E12) were challenged with ZIKV (strain R103451, $10^4$ PFU/mouse), and 6 days later, uteri and fetuses were collected to evaluate morphological changes, as well as collection of sera, body fluid, and tissues (including placenta) to measure viral titers using plaque-forming assay. Placentas were also evaluated for apoptosis and vascular damage, and inflammatory cytokines and chemokines were assayed as described. FIG. 5A depicts a representative image of morphology of uteri (E16-E18) and fetuses from pregnant mice challenged with ZIKV at E10-E12. The total numbers and dead fetuses from each group are shown in FIG. 5B. Viral titers in placenta and fetal brain (FIG. 5C), sera and amniotic fluid (FIG. 5D) and tissues (brain, kidney, heart, liver, spleen, and muscle) (FIG. 5E), were measured in a plaque-forming assay 6 days post-challenge. The detection limit was 12.5 PFU/g (for placenta and fetal brain), 20 PFU/g (for heart), 25 PFU/ml (for sera and amniotic fluid), and 25 PFU/g (for brain, kidney, liver, spleen, and muscle). The data are represented as mean±s.e.m (n=6). *, , and * indicate $P<0.05$, $P<0.01$, and $P<0.001$, respectively.

FIG. 6A depicts representative images of immunofluorescence staining of activated caspase-3 in placenta. ZIKV, activated caspase-3, and nuclei were stained with anti-ZIKV antibody, anti-active caspase-3 antibody, and DAPI, respectively. The images were magnified at 63×, with a scale bar of 10 μm. Quantification of ZIKV$^+$ (FIG. 6B) and activated caspase-3$^+$ (FIG. 6C) staining in the samples of FIG. 6A were conducted with ImageJ software. The data are presented as mean±s.e.m of fluorescence intensity for ZIKV$^+$ or caspase-3$^+$ staining in each field (n=6: "n" indicates numbers of images from different placentas). *,  and * indicate P<0.05, P<0.01, and P<0.001, respectively.

FIG. 7A depicts representative images of immunofluorescence staining of vimentin in placenta. ZIKV, vimentin, and nuclei were stained with anti-ZIKV antibody, anti-vimentin antibody, and DAPI, respectively. The images were magnified at 63×, with a scale bar of 20 μm. Quantification of ZIKV$^+$ (FIG. 7B) and vimentin$^+$ (FIG. 7C) staining in the samples of FIG. 7A were conducted with ImageJ software. The data are presented as mean±s.e.m of fluorescence intensity for ZIKV$^+$ or vimentin$^+$ staining in each field (n=6: "n" indicates numbers of image from different placentas). *,  and * indicate P<0.05, P<0.01, and P<0.001, respectively.

FIG. 9A-E depict that the ZIKV TCI-DNA vaccine induced low to no ZIKV-, E-, and NS3-specific antibodies, eliminating the antibody-dependent enhancement (ADE) effect in BALB/c mice. Mouse sera collected at 10 days post-2$^{nd}$ immunization were assayed for ZIKV E-, NS3-, and ZIKV-specific IgG antibody, neutralizing antibodies, and ADE of ZIKV infection. ZIKV strain R103451 was used for the neutralization and ADE tests. Enzyme-linked immunosorbent assay (ELISA) for detection of IgG antibody specific to ZIKV full-length E protein (FIG. 9A), NS3 peptides (FIG. 9B), and ZIKV (R103451 strain) (FIG. 9C) in sera of BALB/c mice immunized with ZIKV full-length E protein, EDI/II mixed peptides, TCI-DNA, or PBS control. IgG antibody titers are presented as positively detectable endpoint serum dilutions. Measurement of neutralizing antibodies (FIG. 9D) by plaque reduction neutralization test (PRNT) and ADE (FIG. 9E) by a flow cytometry-based assay was performed with sera of immunized BALB/c mice. Neutralizing antibody titers are presented as 50% plaque reduction neutralizing antibody titer (PRNT$_{50}$) of 2-fold serially diluted sera. The ADE is presented as percent of infected cells, which was calculated based on fluorescence signals in the presence or absence of serially diluted sera. The data are expressed as mean±s.e.m (n=6). * indicates P<0.01.

DETAILED DESCRIPTION

Figure 1A:
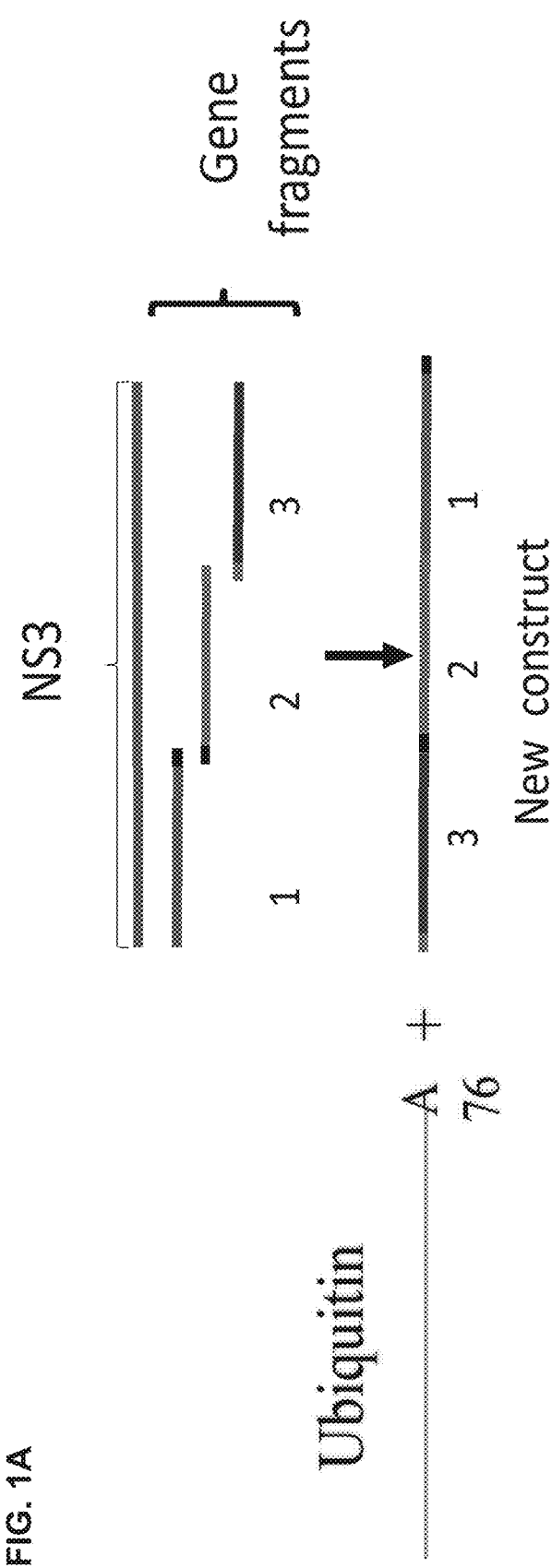
FIG. 1A-C depict the disclosed ZIKV T-cell-inducing (TCI)-DNA vaccine design and antigen expression.
Figure 1B:
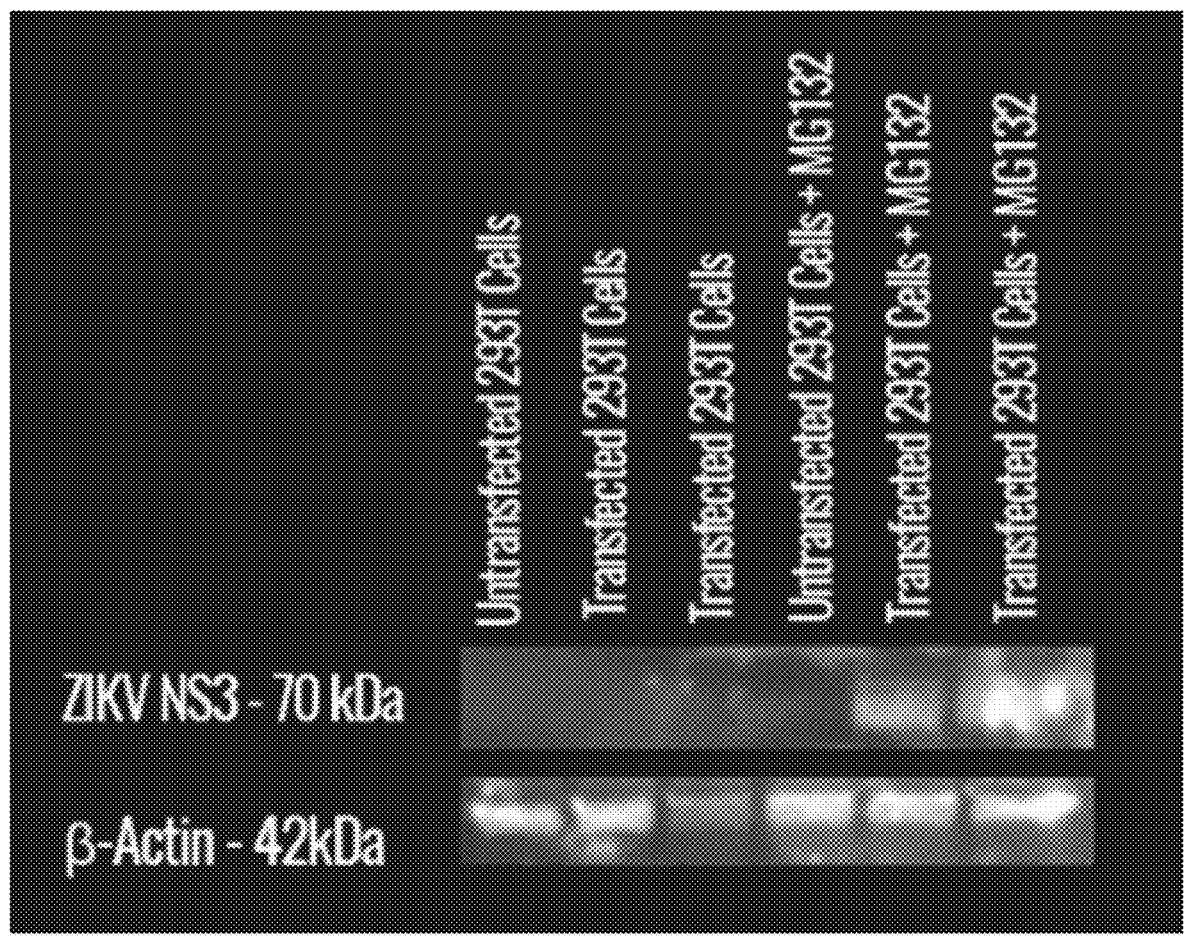
Figure 1C:
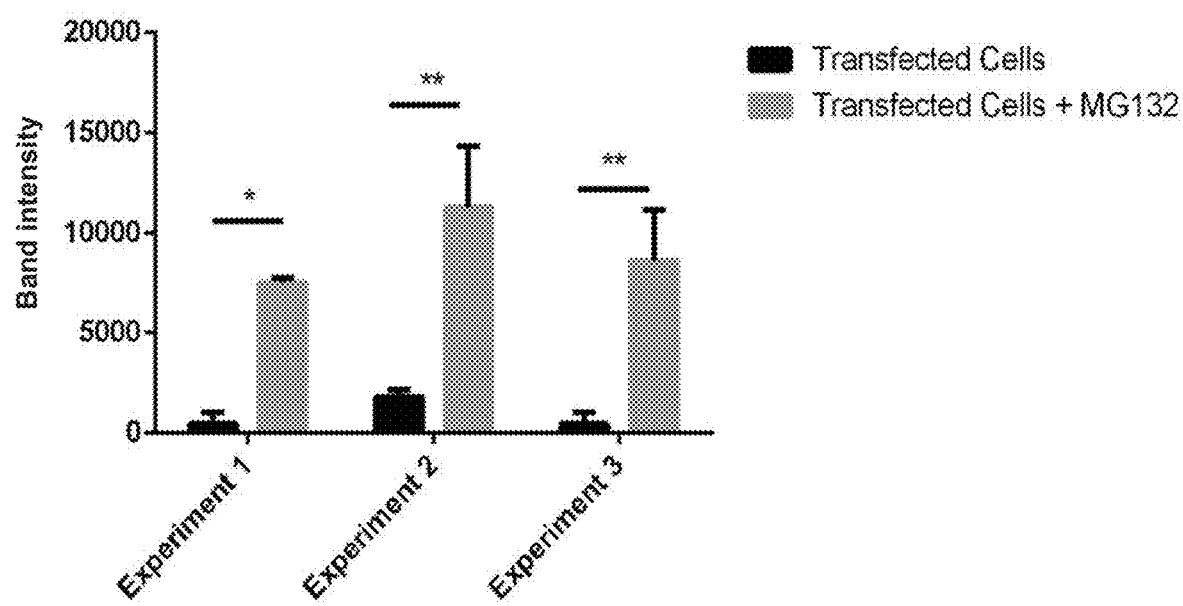
Figure 2A:
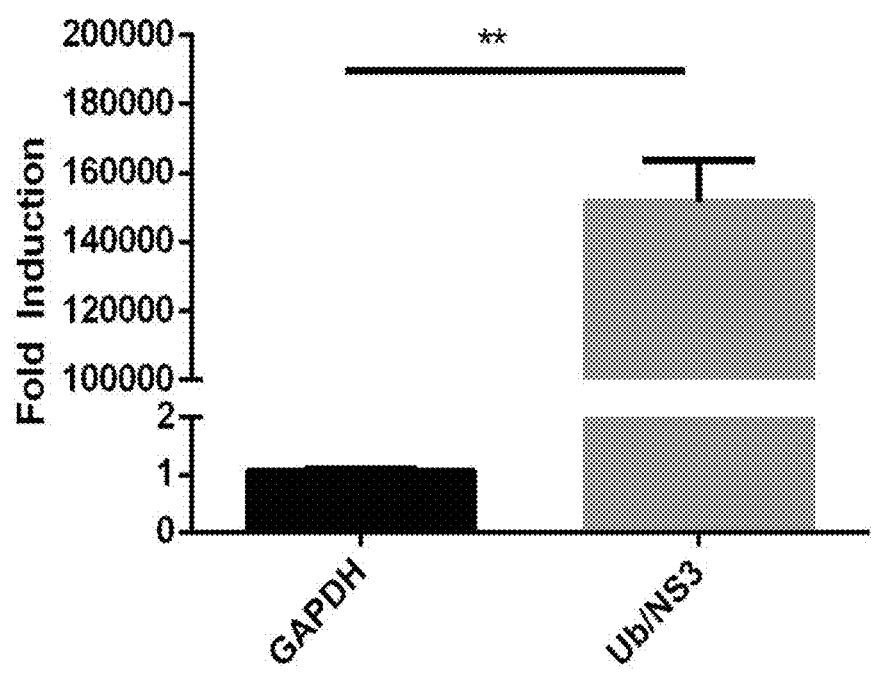
FIG. 2A-B depict mRNA levels of Ub/NS3 gene sequence in 293T cells. 293T cells were transfected with rearranged Ub/NS3 in polyethylenimine (PEI) transfection reagent overnight. RNA was further isolated, cDNA was synthesized, and analysis of gene expression was conducted by quantitative reverse transcription PCR (qRT-PCR).
Figure 2B:
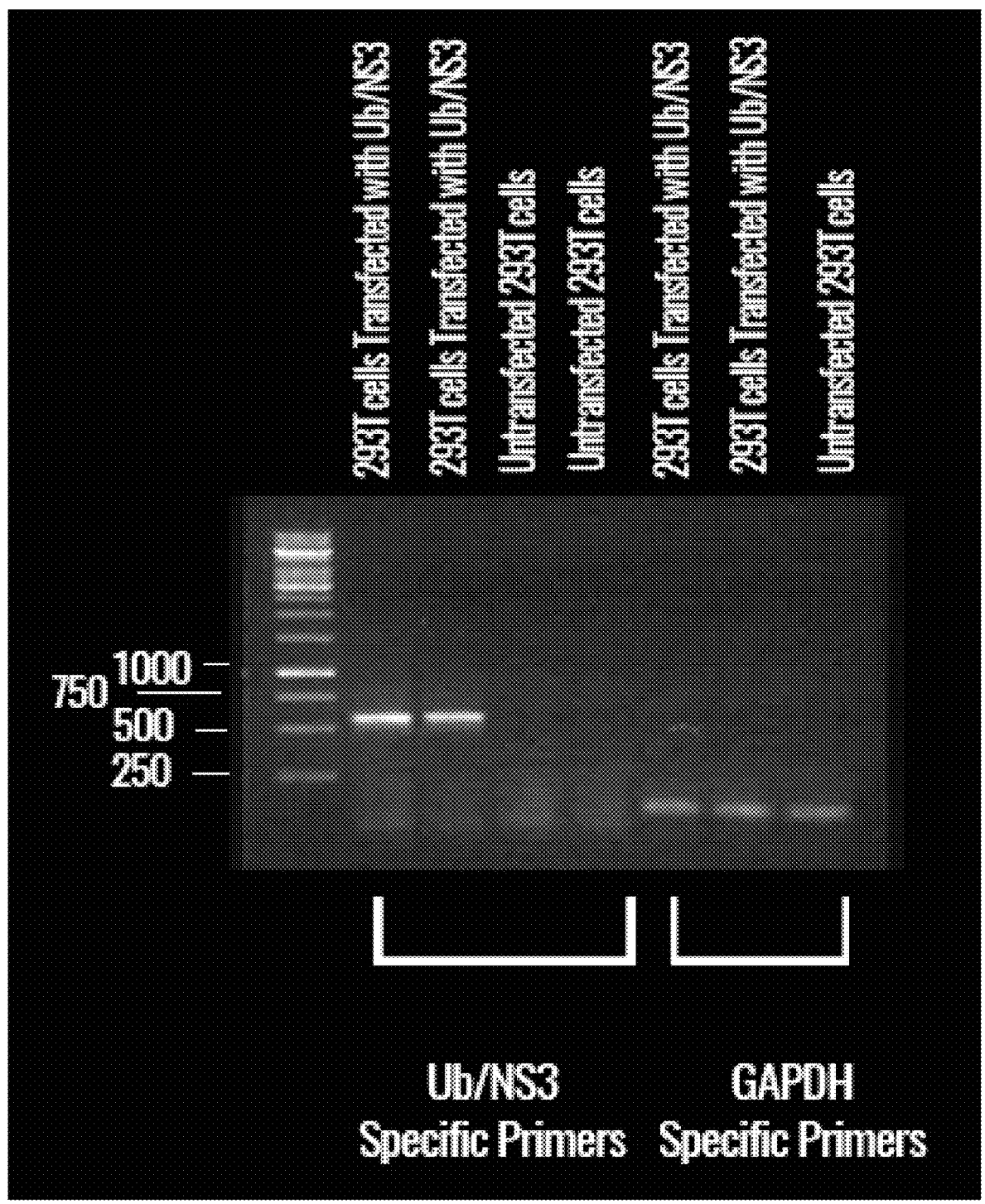

A conventional vaccine is expected to induce neutralizing antibodies. However, it also induces non-neutralizing antibodies, which are responsible for ADE of DENV or ZIKV infection when neutralizing antibodies wane. In contrast, a vaccine which elicits only ZIKV-specific cytotoxic T lymphocytes (CTLs), but not ZIKV-specific antibodies, is expected to prevent ZIKV infection without risk of ADE-mediated consequences. As humans mount significant T cell responses to ZIKV nonstructural protein 1 (NS1), the disclosed vaccine targets ZIKV nonstructural protein 3 (NS3). Thus, disclosed herein is a DNA vaccine which not only targets ZIKV nonstructural protein 3 (NS3) without E and prM proteins but also uses a ubiquitin and/or gene rearrangement strategy to enhance its degradation in the proteasome with the goal of inducing only NS3-specific CTLs. The efficacy of this T-cell-inducing (TCI) ZIKV DNA (i.e., TCI-DNA) vaccine protects against ZIKV challenge in animal models. In alternative embodiments, the protein encoded in the DNA vaccine is produced using standard biotechnology and used as a vaccine.

A number of embodiments of the disclosed immunogenic compositions have been described. Nevertheless, it will be understood that various modifications may be made without departing from the spirit and scope of the present disclosure.

As used herein an "immunogenic composition" refers to composition comprising a nucleic acid or an expressed protein, with or without an adjuvant, and which elicits an immune response in the host. The immunogenic compositions disclosed herein are immunoprotective or therapeutic. When the immunogenic compositions may prevent, ameliorate, palliate, or eliminate disease from the host then the immunogenic composition may also optionally be referred to as a vaccine. In some embodiments, the immunogenic composition includes one or more pharmaceutically acceptable excipients and may optionally include an adjuvant.

Some embodiments comprise a ZIKV DNA vaccine that expresses an ubiquitinated and rearranged ZIKV NS3 protein to generate CTLs without ADE-mediating antibodies. This unique property is due to rapid degradation of the vaccine antigen NS3 in the proteasome. Western blot analyses showed negligible amounts of the rearranged NS3 protein in the cells transfected with the plasmid expressing the NS3. In contrast, large amounts of NS3 are seen in the presence of a proteasome inhibitor, indicating that the ubiquitinated/rearranged NS3 protein is rapidly degraded in the proteasome. It is not expected that large amounts of NS3-specific antibodies would be induced with this DNA vaccine because of lack of intact NS3. There is not much concern that even small amounts of antibodies to NS3 were induced, because NS3 is not on the ZIKV virion surface and NS3-specific antibodies would not induce ADE. Indeed, sera from mice immunized with the disclosed ZIKV TCI-DNA vaccine did not show any ADE activity. As expected, the vaccine induced a strong NS3-specific CTL response. This is most likely due to the inclusion of an ubiquitin sequence upstream of the rearranged NS3 sequence, which promotes protein degradation in the proteasome, where antigenic peptides are loaded on MHC class I to induce the CTL response.

The NS3 sequence was rearranged to avoid potential harmful effects of an intact NS3 protein. In an exemplified embodiment, the NS3 gene is divided into three segments and their order inverted. In further alternative embodiments, ubiquitin is placed upstream of NS3, but the NS3 sequence is not rearranged. In still further alternative embodiments, the NS3 sequence is rearranged, but ubiquitin is not included. The misfolding due to the rearrangement of NS3 segments can induce endogenous ubiquitination of the expressed protein.

A conventional vaccine can enhance both CTL numbers and titers of antibodies including unwanted non-neutralizing antibodies, and the non-neutralizing antibodies may enhance viral infection, causing ADE. However, the vaccine strategy disclosed herein can selectively boost CTL responses rather than nonselectively amplifying all immune responses including the unwanted non-neutralizing antibodies. This is the first report of the development of such a TCI vaccine against a virus. The present disclosure demonstrates that a ZIKV DNA vaccine inducing NS3-specific CTLs, but no antibodies against prM or E proteins, provided full protection against ZIKV challenge, and in particular, against fetal damage in pregnant mice. The data demonstrate that the CTLs controlled the virus infection in the placenta so that virus-induced inflammation was greatly reduced and fetal damage was prevented.

The most devastating consequence of ZIKV infection is the congenital syndrome, which may develop in DENV-endemic countries. DENV-specific antibodies enhance transmission of ZIKV from mother to fetuses, and these antibodies cross-react with ZIKV but do not neutralize the virus. In contrast, CTLs cross-reactive with DENV and ZIKV can protect the host against ZIKV challenge. There is an 11-13% risk of microcephaly in children born to Brazilian women infected with ZIKV during pregnancy, particularly in the first trimester of pregnancy. However, not all of the DENV-immune individuals are protected against ZIKV infection. This may be dependent on titers of cross-reacting neutralizing and non-neutralizing antibodies and numbers of cross-reacting CTLs at the time of ZIKV infection.

ZIKV-induced microcephaly occurs in the DENV-immune mothers, suggesting that T cell immunity do not provide sufficient cross protection among ZIKV and DENV serotypes. The protection may be dependent on the numbers of cross-reacting CTLs and amounts of neutralizing antibodies (if any) at the time of ZIKV infection. It is likely that DENV-immune individuals presenting large amounts of CTLs cross-reacting with ZIKV and high titers of cross-neutralizing antibodies reacting with ZIKV will be protected, whereas those with small amounts of CTLs and low titers of cross-neutralizing antibodies reacting with ZIKV will suffer from congenital syndromes such as microcephaly.

Thus, disclosed herein is a vaccine expressing NS3 from ZIKV and DENV to induce a large amount of memory CTLs to prevent the consequences of ZIKV infections. Vaccination in the DENV-immune population with the disclosed ZIKV DNA vaccine will boost cross-reacting CTLs and prevent the transmission from mother to fetus and its consequences, such as microcephaly.

Table 1 discloses amino acid sequences of ZIKV and DENV used herein.

TABLE 1

Sequence Identifiers

| | |
|---|---|
| SEQ ID NO: 1 | ZIKV (PRVABC59/2015 strain) NS3 wild-type DNA sequence<br>agtggtgctctatgggatgtgcctgctcccaaggaagtaaaaaaggggagaccaca<br>gatggagtgtacagagtaatgactcgtagactgctaggttcaacacaagttggagtg<br>ggagttatgcaagaggggtctttcacactatgtggcacgtcacaaaaggatccgcg<br>ctgagaagcggtgaagggagacttgatccatactggggagatgtcaagcaggatctg<br>gtgtcatactgtggtccatggaagctagatgccgcctgggatgggcacagcgaggtg<br>cagctcttggccgtgccccccggagagagagcgaggaacatccagactctgcccgga<br>atatttaagacaaaggatggggacattggagcggttgcgctggattacccagcagga<br>acttcaggatctccaatcctagacaagtgtgggagagtgataggactttatggcaat<br>ggggtcgtgatcaaaaacgggagttatgttagtgccatcacccaagggaggagggag<br>gaagagactcctgttgagtgcttcgagccctcgatgctgaagaagaagcagctaact<br>gtcttagacttgcatcctggagctgggaaaaccaggagagttcttcctgaaatagtc<br>cgtgaagccataaaaacaagactccgtactgtgatcttagctccaaccagggttgtc<br>gctgctgaaatggaggaggcccttagagggcttccagtgcgttatatgacaacagca<br>gtcaatgtcacccactctggaacagaaatcgtcgacttaatgtgccatgccaccttc<br>acttcacgtctactacagccaatcagagtccccaactataatctgtatattatggat<br>gaggcccacttcacagatccctcaagtatagcagcaagaggatacatttcaacaagg<br>gttgagatgggcgaggcggctgccatcttcatgaccgccacgccaccaggaacccgt<br>gacgcatttccggactccaactcaccaattatggacaccgaagtggaagtcccagag<br>agagcctggagctcaggctttgattgggtgacggatcattctggaaaaacagtttgg<br>tttgttccaagcgtgaggaacggcaatgagatcgcagcttgtctgacaaaggctgga<br>aaacgggtcatacagctcagcagaaagacttttgagacagagttccagaaaacaaaa<br>catcaagagtgggactttgtcgtgacaactgacatttcagagatgggcgccaacttt<br>aaagctgaccgtgtcatagattccaggagatgcctaaagccggtcatacttgatggc<br>gagagagtcattctggctgacccatgcctgtcacacatgccagcgctgcccagagg<br>aggggcgcataggcaggaatcccaacaaacctggagatgagtatctgtatggaggt<br>gggtgcgcagagactgacgaagaccatgcacactggcttgaagcaagaatgctcctt<br>gacaatatttacctccaagatggcctcatagcctcgctctatcgacctgaggccgac<br>aaagtagcagccattgagggagagttcaagcttaggacggagcaaaggaagacctttg<br>gtggaactcatgaaaagaggagatcttcctgtttggctggcctatcaggttgcatct<br>gccggaataacctacacagatagaagatggtgctttgatggcacgaccaacaacacc<br>ataatggaagacagtgtgccggcagaggtgtggaccagacacggagagaaaagagtg<br>ctcaaaccgaggtggatggacgccagagtttgttcagatcatgcggccctgaagtca<br>ttcaaggagtttgccgctgggaaaaga |
| SEQ ID NO: 2 | ZIKV (PRVABC59/2015 strain) NS3 protein wild-type amino acid sequence<br>MTRRLLGSTQVGVGVMQEGVFHTMWHVTKGSALRSGEGRLDPYWGDVKQDLVSYCGP<br>WKLDAAWDGHSEVQLLAVPPGERARNIQTLPGIFKTKDGDIGAVALDYPAGTSGSPI<br>LDKCGRVIGLYGNGWIKNGSYVSAITQGRREEETPVECFEPSMLKKKQLTVLDLHP<br>GAGKTRRVLPEIVREAIKTRLRTVILAPTRVVAAEMEEALRGLPVRYMTTAVNVTHS<br>GTEIVDLMCHATFTSRLLQPIRVPNYNLYIMDEAHFTDPSSIAARGYISTRVEMGEA<br>AAIFMTATPPGTRDAFPDSNSPIMDTEVEVPERAWSSGFDWVTDHSGKTVWFVPSVR<br>NGNEIAACLTKAGKRVIQLSRKTFETEFQKTKHQEWDFWTTDISEMGANFKADRVI<br>DSRRCLKPVILDGERVILAGPMPVTHASAAQRRGRIGRNPNKPGDEYLYGGGCAETD<br>EDHAHWLEARMLLDNIYLQDGLIASLYRPEADKVAAIEGEFKLRTEQRKTFVELMKR<br>GDLPVWLAYQVASAGITYTDRRWCFDGTTNNTIMEDSVPAEVWTRHGEKRVLKPRWM<br>DARVCSDHAALKSFKEFAAGKR |
| SEQ ID NO: 3 | Rearranged NS3 ZIKV (PRVABC59/2015 strain) DNA sequence<br>caagagtgggactttgtcgtgacaactgacatttcagagatgggcgccaactttaaa<br>gctgaccgtgtcatagattccaggagatgcctaaagccggtcatacttgatggcgag<br>agagtcattctggctgacccatgcctgtcacacatgccagcgctgcccagaggagg<br>gggcgcataggcaggaatcccaacaaacctggagatgagtatctgtatggaggtggg<br>tgcgcagagactgacgaagaccatgcacactggcttgaagcaagaatgctccttgac<br>aatatttacctccaagatggcctcatagcctcgctctatcgacctgaggccgacaaa<br>gtagcagccattgagggagagttcaagcttaggacggagcaaaggaagacctttgtg<br>gaactcatgaaaagaggagatcttcctgtttggctggcctatcaggttgcatctgcc<br>ggaataacctacacagatagaagatggtgctttgatggcacgaccaacaacaccata<br>atggaagacagtgtgccggcagaggtgtggaccagacacggagagaaaagagtgctc<br>aaaccgaggtggatggacgccagagtttgttcagatcatgcggccctgaagtcattc<br>aaggagtttgccgctgggaaaagacctggagctgggaaaaccaggagagttcttcct<br>gaaatagtccgtgaagccataaaaacaagactccgtactgtgatcttagctccaacc<br>agggttgtcgctgctgaaatggaggaggcccttagagggcttccagtgcgttatatg<br>acaacagcagtcaatgtcacccactctggaacagaaatcgtcgacttaatgtgccat<br>gccaccttcacttcacgtctactacagccaatcagagtccccaactataatctgtat<br>attatggatgaggcccacttcacagatccctcaagtatagcagcaagaggatacatt |

TABLE 1-continued

Sequence Identifiers

```
tcaacaagggttgagatgggcgaggcggctgccatcttcatgaccgccacgccacca
ggaacccgtgacgcatttccggactccaactcaccaattatggacaccgaagtggaa
gtcccagagagagcctggagctcaggctttgattgggtgacggatcattctggaaaa
acagtttggtttgttccaagcgtgaggaacggcaatgagatcgcagcttgtctgaca
aaggctggaaaacgggtcatacagctcagcagaaagacttttgagacagagttccag
aaaacaaacatcaagagtgggactttgtcgtgacaactgacagtggtgctctatgg
gatgtgcctgctcccaaggaagtaaaaaaggggggagaccacagatggagtgtacaga
gtaatgactcgtagactgctaggttcaacacaagttggagtgggagttatgcaagag
ggggtctttcacactatgtggcacgtcacaaaaggatccgcgctgagaagcggtgaa
gggagacttgatccatactggggagatgtcaagcaggatctggtgtcatactgtggt
ccatggaagctagatgccgcctgggatgggcacagcgaggtgcagctcttggccgtg
cccccggagagagagcgaggaacatccagactctgcccggaatatttaagacaaag
gatggggacattggagcggttgcgctggattacccagcaggaacttcaggatctcca
atcctagacaagtgtgggagagtgataggactttatggcaatgggtcgtgatcaaa
aacgggagttatgttagtgccatcacccaagggagggagggaagagactcctgtt
gagtgcttcgagccctcgatgctgaagaagaagcagctaactgtcttagacttgcat
cctggagctgggaaaaccaggagagttctt
```

SEQ ID NO: 4    Ubiquitin DNA sequence

```
atgcagatcttcgtgaagactctgactggtaagaccatcaccctcgaggttgagccca
gtgacaccatcgagaatgtcaaggcaaagatccaagataaggaaggcatccctcctga
ccagcagaggctgatctttgctggaaaacagctggaagatgggagcaccctgtctgac
tacaacatccagaaagagtccaccctgcacatggtgctcagtatcagaggtggg
```

SEQ ID NO: 5    Rearranged ubiquitin (Ub)/NS3 ZIKV (PRVABC59/2015 strain) DNA sequence (used for construction of ZIKV TCI-DNA vaccine)

```
ctagaattcgttcttgccaccatgcagatcttcgtgaagactctgactggtaagacca
tcaccctcgaggttgagcccagtgacaccatcgagaatgtcaaggcaaagatccaaga
taaggaaggcatccctcctgaccagcagaggctgatctttgatggaaaacagctggaa
gatgggcgcaccctgtctgactacaacatccagaaagagtccaccatgcacctgstgc
tccgtctcagaggtgcccaagagtgggactttgtcgtgacaactgacatttcagagat
gggcgccaactttaaagctgaccgtgtcatagattccaggagatgcctaaagccggtc
atacttgatggcgagagagtcattctggctggacccatgcctgtcacacatgccagcg
ctgcccagaggaggggggcgcataggcaggaatcccaacaaacctggagatgagtatct
gtatggaggtgggtgcgcagagactgacgaagaccatgcacactggcttgaagcaaga
atgctccttgacaatatttacctccaagatggcctcatagcctcatctatcgacctg
aggccgacaaagtagcagccattgagggagagttcaagcttaggacggagcaaaggaa
gacctttgtggaactcatgaaaagaggagatcttcctgttgctggcctatcaggtt
gcatctgccggaataacctacacagatagaagatggtgctttgatggcacgaccaaca
acaccataatggaagacagtgtgccggcagagtgtggaccagacacggagagaaaag
agtgctcaaaccgaggtggatggacgccagagttgttcagatcatgcggccctgaag
tcattcaaggagtttgccgctgggaaaagacctggagctgggaaaaccaggagagttc
ttcctgaaatagtccgtgaagccataaaaacaagactccgtactgtgatcttagctcc
aacaagggttgtcgctgctgaaatggaggaggccctagagggcttccagtgcgttat
atgacaacagcagtcaatgtcacccactctgaacagaaatcgtcgacttaatgtgcc
atgccaccttcacttcacgtctactacagccaatcagagtccccaactataatctgta
tattatggatgaggcccacttcacagatccctcaagtatagcagcaagaggatacatt
tcaacaagggttgagatgggcgaggcggctgccatcttcatgaccgccacgccaccag
gaacccgtgacgcatttccggactccaactcaccaattatggacaccgaagtggaagt
cccagagagagcctggagctcaggctttgattgggtgacggatcattctggaaaaaca
gtttggtttgttccaagcgtgaggaacggcaatgagatcgcagcttgtctgacaaagg
ctggaaaacgggtcatacagctcagcagaaagacttttgagacagagttccagaaaac
aaaacatcaagagtgggactttgtcgtgacaactgacagtggtgctctatgggatgtg
cctgctcccaaggaagtaaaaaaggggggagaccacagatggagtgtacagagtaatga
ctcgtagactgctaggttcaacacaagttggagtgggagttatgcaagagggggtctt
tcacactatgtggcacgtcacaaaaggatccgcgctgagaagcggtgaagggagactt
gatccatactggggagatgtcaagcaggatctggtgtcatactgtggtcatggaagc
tagatgccgcctgggatgggcacagcgaggtgcagctcttggccgtgcccccggaga
gagagcgaggaacatccagactctgcccggaatatttaagacaaaggatggggacatt
ggagcggttgcgctggattacccagcaggaacttcaggatctccaatcctagacaagt
gtgggagagtgataggactttatggcaatgggtcgtgatcaaaaacgggagttatgt
tagtgccatcacccaagggagggagggaagagactcctgttgagtgcttcgagccc
tcgatgctgaagaagaagcagctaactgtcttagacttgcatcctggagctgggaaaa
ccaggagagttctttaggttcttgcggccgccta
```

SEQ ID NO: 6    Rearranged Ub/NS3 ZIKV (PRVABC59/2015 strain) amino acid sequence (translated from constructed ZIKV TCI-DNA vaccine in SEQ ID: NO: 3)

```
MQIFVKTLTGKTITLEVEPSDTIENVKAKIQDKEGIPPDQQRLIFAGKQLEDGRTLS
DYNIQKESTLHLVLRLRGAQEWDFvvTTDISEMGANFKADRVIDSRRCLKPVILDGE
RVILAGPMPVTHASAAQRRGIGRNPNKPGDEYLYGGGCAETDEDHAHWLEARMLLD
NIYLQDGLIASLYRPEADKVAAIEGEFKLRTEQRKTFVELMKRGDLPVWLAYQVASA
GITYTDRRWCFDGTTNNT1MEDSVPAEVWTRHGEKRVLKPRWMDARVCSDHAALKSF
KEFAAGKRPGAGKTRRVLPEIVREAIKTRLRTVILAPTRVVAAEMEEALRGLPVRYM
TTAVNVTHSGTEIVDLMCHATFTSRLLQPIRVPNYNLYIMDEAHFTDPSSIAARGYI
STRVEMGEAAAIFMTATPPGTRDAFPDSNSPIMDTEVEVPERAWSSGFDWVTDHSGK
TVWFVPSVRNGNEIAACLTKAGKRVIQLSRKTFETEFQKTKHQEWDFVVTTDSGALW
DVPAPKEVKKGETTDGVYRVMTRRLLGSTQVGVGVMQEGVFHTMWHVTKGSALRSGE
GRLDPYWGDVKQDLVSYCGPWKLDAAWDGHSEVQLLAVPPGERARNIQTLPGIFKTK
```

TABLE 1-continued

| Sequence Identifiers | |
|---|---|
| | DGDIGAVALDYPAGTSGSPILDKCGRVIGLYGNGVVIKNGSYVSAITQGRREEETPV<br>ECFEPSMLKKKQLTVLDLHPGAGKTRRVL |
| SEQ ID NO: 7 | Rearranged NS3 ZIKV (PRVABC59/2015 strain) amino acid sequence<br>MGANFKADRVIDSRRCLKPVILDGERVILAGPMPVTHASAAQRRGRIGRNPNKPGDE<br>YLYGGGCAETDEDHAHWLEARMLLDNIYLQDGLIASLYRPEADKVAAIEGEFKLRTE<br>QRKTFVELMKRGDLPVWLAYQVASAGITYTDRRWCFDGTTNNTIMEDSVPAEVWTRH<br>GEKRVLKPRWMDARVCSDHAALKSFKEFAAGKRPGAGKTRRVLPEIVREAIKTRLRT<br>VILAPTRVVAAEMEEALRGLPVRYMTTAVNVTHSGTEIVDLMCHATFTSRLLQPIRV<br>PNYNLYIMDEAHFTDPSSIAARGYISTRVEMGEAAAIFMTATPPGTRDAFPDSNSPI<br>MDTEVEVPERAWSSGFDWVTDHSGKTVWFVPSVRNGNEIAACLTKAGKRVIQLSRKT<br>FETEFQKTKHQEWDFvvTTDSGALWDVPAPKEVKKGETTDGVYRVMTRRLLGSTQVG<br>VGVMQEGVFHTMWHVTKGSALRSGEGRLDPYWGDVKQDLVSYCGPWKLDAAWDGHSE<br>VQLLAVPPGERARNIQTLPGIFKTKDGDIGAVALDYPAGTSGSPILDKCGRVIGLYG<br>NGVVIKNGSYVSAITQGRREEETPVECFEPSMLKKKQLTVLDLHPGAGKTRRVL |
| SEQ ID NO: 8 | DENV-2 (V594 strain) NS3 protein wild-type amino acid sequence<br>AGVLWDVPSPPPVGKAELEDGAYRIKQRGIFGYSQIGAGVYKEGTFHTMWHVTRG<br>AVLMHRGKRIEPSWADVKKDLISYGGGWKLEGEWKEGEEVQVLALEPGKNPRAVQ<br>TKPGLFKTNTGTIGAVSLDFSPGTSGSPIVDRKGKVVGLYGNGVVTRSGAYVSAI<br>AQTEKSIEDNPEIEDDIFRKKRLTIMDLHPGAGKTKRYLPAIVREAIKRGLRTLI<br>LAPTRVVAAEMEEALRGLPIRYQTPAIRAEHTGREIVDLMCHATFTMRLLSPVRV<br>PNYNLiiMDEAHFTDPASIAARGYISTRVEMGEAAGIFMTATPPGSRDPFPQSNA<br>PIMDEEREIPERSWNSGHEWVTDFKGKTVWFVPSIKAGNDIAACLRKNGKKVIQL<br>SRKTFDSEYVKTRANDWDFVVTTDISEMGANFRAERVIDPRRCMKPVILTDGEER<br>VILAGPMPVTHSSAAQRRGRIGRNPKNENDQYIYMGEPLENDEDCAHWKEAKMLL<br>DNINTPEGIIPSMFEPEREKVDAIDGEYRLRGEARKTFVDLMRRGDLPVWLAYRV<br>AAEGINYADRRWCFDGIKNNQILEENVEVEIWTKEGERKKLKPRWLDARIYSDPL<br>ALKEFKEFAAGRK |

EXAMPLES

Example 1. Design and Characterization of a T Cell-Inducing ZIKV DNA (TCI-DNA) Vaccine Methods Construction of the vaccine plasmid. ZIKV NS3 sequence (PRVABC59/2015 strain, GenBank: KX087101) (SEQ ID NO:1) was rearranged and an ubiquitin (Ub) sequence was added to the front of the rearranged NS3 (SEQ ID NO:5). Before this combined Ub/NS3 sequence, a Kozak sequence was placed in order to ensure efficient transcription of the plasmid. Upstream of the Kozak sequence, linker DNA as well as an EcoRI restriction site was placed to facilitate proper cloning of the gene segment into the vector of interest. Downstream of the rearranged Ub/NS3 gene sequence, a stop codon was placed along with linker DNA and a NotI restriction site. This nucleotide sequence was ordered through GeneArt® program (Thermo Fisher Scientific). The NS3 gene was delivered in a proprietary Thermo Fisher Scientific vector in a lyophilized form. Plasmid DNA was resuspended in molecular biology grade water to a concentration of approximately 200 ng/uL. DNA was digested with FastDigest™ (FD) EcoRI and NotI for 15 min in a 37° C. heat block. The digested DNA was then loaded directly onto a 1% agarose gel and allowed to run for 40 min at 80V. The 2.2 kb Ub/NS3 DNA was exposed to 440 nm UV light in the imaging room and excised. The gel slice was placed into a clear, 1.5 mL microcentrifuge tube and the purified DNA was extracted using a QIAquick® Gel Extraction Kit. This gene fragment was stored in a −20° C. freezer and the pVAX1 vector was digested with FD EcoRI and FD NotI, run on a gel, and extracted using the same kit. The Ub/NS3 gene fragment was ligated using a 3:1 ratio of insert DNA (Ub/NS3) to vector DNA (pVAX1) at room temperature in the presence of T4 DNA ligase.

Bacterial transformation. Previously-made, chemically competent DH5α *E. coli* were removed from −80° C. freezer and thawed on ice for 25 min. Ligated Ub/NS3/pVAX1 was introduced to the *E. coli* and incubated on ice for 30 min. Heat shock transformation occurred by placing the tube into a 42° C. heat block for 45 sec and back on ice for 2 min. 1 mL of SOC media (super optimal broth with catabolite repression) was added to the *E. coli* and the transformed bacteria was grown in a shaking incubator at 37° C. for 45 min. The *E. coli* was then spun down at 9,000 rpm for 2 min, resuspended in 200 μL SOC media, and streaked on an LB kanamycin (Kan$^+$) plate. Once dry, the plate was inverted and incubated overnight at 37° C. Colonies from the plate were inoculated into 2 mL LB Kan$^+$ media, and a miniprep was prepared using a QIAprep® Spin Miniprep Kit according to the manufacturer's instructions. Plasmids were subsequently re-digested with FD EcoRI and NotI. Upon observance of correct band digestion, the plasmid was sequenced for confirmation of correct insertion.

Plasmid transfection. 293T cells were cultured in Dulbecco's Modified Eagle Medium (DMEM) with 10% fetal bovine serum (FBS) and 1% penicillin/streptomycin. Cells were split upon reaching 90% confluence (every 2-3 days). Upon sufficient generation of 293T cells, 10 μg of Ub/NS3/pVAX1 plasmid was transfected into the cells using polyethylenimine (PEI) transfection reagent overnight. Media was removed the next morning and cells were cultured in DMEM. In some experiments, a proteasome inhibitor, MG132, was added to cell culture medium in a 1:1,000 ratio overnight at 12, 36, or 60 h after transfection.

Quantitative reverse transcription PCR (qRT-PCR). After 293T cells were transfected as described above, purification of total RNA was conducted using an RNeasy® mini Kit. First-strand cDNA was then synthesized using a GoScript™ Reverse Transcription System. In a PCR tube, the RNA harvested from transfected 293T cells was incubated with NS3-specific primers along with GAPDH primers (negative control) in a heat block at 70° C. for 5 min. The tubes were immediately placed on ice for 10 min. The RNA/primer mix was mixed with GoScript™ Reverse Transcription mix in a 3:1 ratio for each reaction. The tubes were placed on a heat block at 25° C. for 5 min, then placed on a heat block at 42° C. for 1 h. Reverse transcriptase was inactivated by placing the tubes in a heat block at 70° C. for 15 min. The qRT-PCR was conducted using iTaq™ Universal SYBR Green Supermix using NS3-specific primers as well as GAPDH specific primers (negative control). Fold induction was measured as $2^{-\Delta\Delta C_T}$.

Western blot 293T cells were cultured, transfected, and treated with proteasome inhibitor as described above. After overnight treatment with 50 μM MG132, 293T cells were treated with 0.25% trypsin for 5 min at 37° C. in 5% $CO_2$. 293T cells were resuspended in DMEM, centrifuged at 1,200 rpm for 5 min, and cell pellets were resuspended in RIPA (radioimmunoprecipitation assay) buffer with freshly added proteinase inhibitor. Total protein concentration was calculated via Bradford Assay and 6×SDS loading buffer was added to 20 μg of total protein. Protein was denatured at 100° C. for 10 min and then placed on ice for 2-3 min. Proteins were run on a 12% polyacrylamide gel for 20 min at 80V and for 40 minutes at 120V, or until the dye line reached the bottom of the gel. Bands from the polyacrylamide gel were transferred to a nitrocellulose membrane using an iBlot™ Gel Transfer Device. The membrane was blocked in 5% blocking buffer (5% non-fat milk in PBS) for 1 h and the membrane was washed in PBS-Tween 20 (PBS-T) and blocked in 5% blocking buffer containing a 1:1,000 dilution of anti-ZIKV NS3 antibody overnight. The next day, the membrane was washed with PBS-T for 20 min and blocked in 5% blocking buffer with secondary horseradish peroxidase (HRP)-conjugated goat anti-rabbit antibody for 1 h. The membrane was then washed in PBS-T for 20 min, and then exposed to 10 mL chemiluminescent substrate for 3 min devoid of light. Proteins were visualized using a FluorChem™ E system.

Results

T Cell-Inducing ZIKV Vaccine (TCI-DNA) Design and Characterization.

A predictive epitope analysis found that all $CD8^+$ T-cell epitopes on the NS3 amino acid sequence were conserved across 54 different ZIKV genomes. Normally, the NS3 protein is covalently bonded to NS2B, an anchor protein which functions as a cofactor to promote the productive folding and activity of NS3. The N-terminal region of the NS3 protein encodes for a serine protease, while the latter region encodes for a helicase. This NS2B-NS3pro complex is responsible for the cleavage of the ZIKV polyprotein precursor and generation of the other proteins in the ZIKV viral genome. As the NS3 protein is essential for the function of every other ZIKV viral protein, and its $CD8^+$ T-cell epitopes are conserved across 54 different ZIKV genomes, this protein serves as an attractive target. Thus, a unique TCI-DNA ZIKV vaccine was constructed using ZIKV NS3 as the target protein.

First, the NS3 gene (PRVABC59/2015 strain of ZIKV in Homo sapiens) was split into three parts which were rearranged (FIG. 1A) in order to disrupt NS3's viral functions. Furthermore, this rearrangement may produce an unstable protein which will be likely targeted to the proteasome for degradation. In constructing this sequence, the 30 nucleotide bases before and after all nominal break points were included to preserve any CTL epitopes that might otherwise have been disrupted. The open reading frame (ORF) encoding for a mouse/human monomer of ubiquitin (Ub) was placed immediately upstream the rearranged NS3 DNA sequence. A glycine codon at the $76^{th}$ residue was modified to encode an alanine in order to enhance the stability of the Ub/NS3 complex (FIG. 1A), which may promote protein degradation in the proteasome. In order to ensure efficient transcription, a Kozak sequence was placed upstream of this combined Ub/NS3 sequence. The rearranged Ub/NS3 sequence was inserted into pVAX1, an FDA approved vector for the use in DNA vaccines in humans. This construct is the ZIKV TCI-DNA vaccine used in the subsequent experiments.

To determine expression of the rearranged NS3, the plasmid DNA was used to transfect 293T cells. RNA was isolated and RNA reverse transcription was conducted. qRT-PCR was conducted using primers specific to the Ub/NS3 sequence. NS3 gene transcription was confirmed (FIG. 2A). The expression of NS3 protein was further determined (FIG. 2B). Visualizing a protein that is innately ubiquitinated can be problematic. Many proteins are targeted for degradation by covalent ligation to Ub. Therefore, any protein that is ubiquitinated is targeted for immediate destruction. To address this issue, a proteasome inhibitor MG132 was used in cultures to preserve the ubiquitinated protein.

293T cells were transfected overnight with the plasmid DNA delivered in PEI transfection reagents. The 293T cells were allowed to stably express the transfected protein for 36 or 60 hours. After this period, cells were treated with 50 μM MG132 overnight. A Western blot was then run to determine the production of the rearranged Ub/NS3 (FIGS. 1B and C). In both un-transfected protein lanes, no Ub/NS3 protein was shown. Of the triplicate experiments shown in FIG. 1B, however, only one of the three shows faint protein bands in the transfected cell lanes without MG132 treatment. In the cells with MG132 treatment, the Ub/NS3 protein was clearly evident (FIG. 1B).

Example 2. The ZIKV TCI-DNA Vaccine Protected Female Pregnant BALB/c Mice and Their Fetuses Against ZIKV Challenge Methods Immunization of BALB/c mice with ZIKV vaccines. BALB/c mice were immunized with ZIKV TCI-DNA vaccine or control vaccines (ZIKV full-length E protein or EDI/EDII mixed peptides (equal concentrations of the five peptides in Table 2)). Briefly, female BALB/c mice (4-weeks old) were intramuscularly (i.m.) immunized with ZIKV full-length E protein (10 μg/mouse) or EDI/EDII mixed peptides (50 μg/mouse) in the presence of aluminum hydroxide (hereinafter Alum; 500 μg/mouse) and monophosphoryl lipid A (MPL; 10 μg/mouse) adjuvants, or with TCI-DNA (10 μg/mouse) in the presence of imiquimod adjuvant (20 μg/mouse). Mice injected with PBS were included as a control. The immunized mice were boosted once at three weeks, and sera were collected 10 days post-boost to detect IgG antibodies by ELISA, neutralizing antibodies by plaque reduction neutralization assay (PRNT), and antibody-dependent enhancement (ADE) (see Example 4). The immunized BALB/c mice were processed for subsequent ZIKV challenge experiments (as described below).

TABLE 2

ZIKV EDI/II mixed peptides control

| Peptide name | Sequence | SEQ ID NO. |
|---|---|---|
| 1 | IGVSNRDFVEGMSGG | 9 |
| 2 | TWWDVVLEHGGCVTV | 10 |
| 3 | MAQDKPTVDIELVTT | 11 |
| 4 | VDRGWGNGCGLFGKG | 12 |
| 5 | WLGSQEGAVHTALA | 13 |

Challenge of pregnant BALB/c mice with ZIKV. Ten days post-last dose of ZIKV TCI-DNA vaccine, control vaccines (full-length E protein and EDI/EDII mixed peptides) and PBS control, the immunized female BALB/c mice were mated with naïve male BALB/c mice. The pregnant mice (embryonic day E5-E7) were injected with anti-IFNAR1 blocking mAb (MAR1-5A3, 2 mg/mouse), and 24 h later, they were challenged intraperitoneally (I.P.) with ZIKV (strain R103451), $2\times10^5$ PFU/mouse). Six days post-infection (p.i.), placenta and amniotic fluid were collected for analysis of viral titers (as described below), and uteri were collected for analysis of morphological changes.

ZIKV plaque-forming assay. Viral titers in the ZIKV-challenged mice were measured by plaque-forming assay. Briefly, sera, amniotic fluid, and tissue lysates of ZIKV-challenged mice were serially diluted and transferred to Vero E6 cells, which were cultured at 37° C. for 1 h. The cells were further overlaid with DMEM containing 1% carboxymethyl cellulose and 2% FBS, and cultured at 37° C. for 4-5 days, followed by staining of plaques with crystal violet (0.5%). ZIKV titers were calculated using the CalcuSyn computer program, and expressed as PFU/g or PFU/ml of test samples.

Results

ZIKV TCI-DNA Vaccine Protected Female Pregnant BALB/c Mice and Their Fetuses Against ZIKV Challenge.

To investigate the efficacy of the ZIKV TCI-DNA vaccine in protecting pregnant mothers and their fetuses against ZIKV infection, this vaccine was evaluated in immunocompetent mice. Immunocompromised mice, such as IFN-α/β receptor (IFNAR)-knockout mice, may have a reduced ability to generate CTLs. Immunocompetent female BALB/c mice (non-lethal to ZIKV infection) were immunized with the TCI-DNA vaccine in the presence of imiquimod adjuvant (an agonist for toll-like receptor 7 (TLR7)), or with ZIKV full-length E protein or EDI/II mixed peptides in the presence of Alum and MPL adjuvants, or PBS as controls. The full-length E protein is expected to induce E protein-specific antibodies which may result in ADE. The full-length E protein used as a control (Aviva Systems Biology) should be recognized by B cells and be processed in antigen-presenting cells for presentation to CD4+ and CD8+ T cells. The EDI/II mixed peptides control is made up of long peptides containing MHC class I-restricted epitopes including H-2, $D^b$, $K^b$, and $K^d$-restricted epitopes (no MHC class II-restricted epitopes) are expected to induce only CTLs but are less immunogenic than the ZIKV TCI-DNA vaccine. Ten days after the second immunization, the female mice were mated with males. The pregnant female mice (E5-E7) were injected with anti-IFNAR1 antibody (to make the mice susceptible to ZIKV by blocking IFN-α/β receptors). One day later, the mice were challenged with a high-dose of ZIKV (R103451, $2\times10^5$ PFU), and examined for morphological changes in uteri 6 days after. Mouse placenta and amniotic fluid were also evaluated for ZIKV titers via plaque-forming assay.

Figure 3A:
FIG. 3A-C depict that the ZIKV TCI-DNA vaccine-protected female pregnant BALB/c mice and their fetuses against ZIKV challenge. Female BALB/c mice were immunized with ZIKV TCI-DNA vaccine, control vaccines (ZIKV full-length E protein and EDI/II mixed peptides), or PBS control for two doses, sera was collected, and then mated with male BALB/c mice at 10 days post-$2^{nd}$ immunization. After receiving antibodies to IFNAR1 (for depleting type I IFN), the pregnant mice (embryonic day (E5-E7)) were intraperitoneally (I.P.) challenged with ZIKV (stain R103451 (2015/Honduras), GenBank: KX262887) ($2\times10^5$ plaque-forming unit (PFU)/mouse). Six days post-challenge, the mice were euthanized, examined for morphological changes in uteri, and ZIKV titers were measured using a plaque-forming assay.
Figures 3B, 3C:
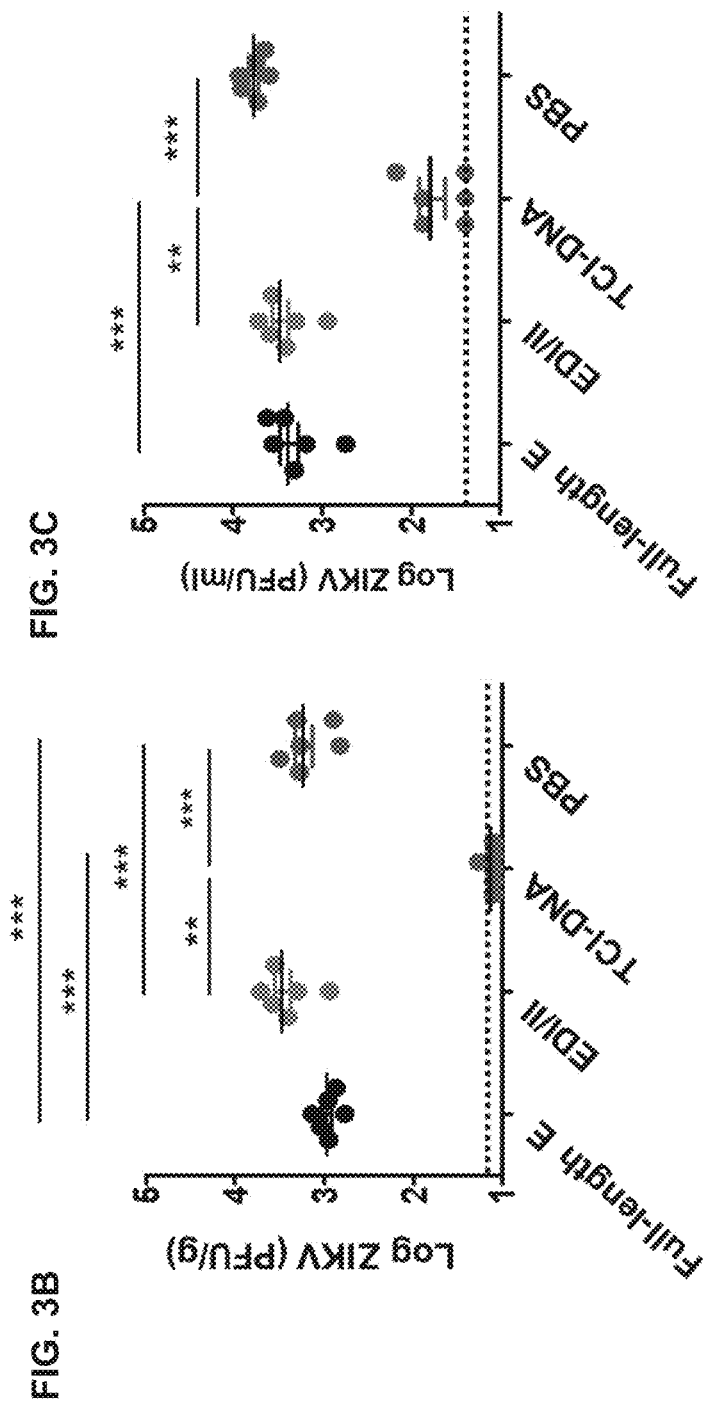

The uteri (E11-E13) from TCI-DNA and full-length E protein-immunized pregnant BALB/C mice exhibited normal morphology without obvious fetal death, indicating complete protection against uterine damage and fetal death. In contrast, EDI/II peptide or PBS-injected pregnant mice had either slightly or severely damaged uteri with reduced size, indicating fetal death and incomplete protection against ZIKV infection (FIG. 3A). Investigation of viral titers in ZIKV-infected placenta and amniotic fluid revealed undetectable, or significantly lower titers of ZIKV in placenta (FIG. 3B) and amniotic fluid (FIG. 3C) of mice receiving the TCI-DNA vaccine, than in those of mice receiving full-length E protein, EDI/II mixed peptides, or PBS. In addition, there were significant, but slightly lower, viral titers in the placenta of mice immunized with full-length E protein than in those of mice injected with PBS (FIG. 3B). Collectively, these results suggest that the TCI-DNA vaccine completely protected immunocompetent pregnant mice and their fetuses against high-dose challenge of ZIKV R103451, a strain responsible for recent ZIKV outbreaks in humans.

Example 3. The ZIKV TCI-DNA Vaccine Protected ZIKV-Susceptible Adult or Pregnant Ifnar1$^{-/-}$ Mice and Their Fetuses Against Two Divergent Strains of ZIKV Challenge Materials and Methods Immunization of Ifnar1$^{-/-}$ mice with ZIKV vaccine. Ifnar1$^{-/-}$ mice were immunized with the ZIKV TCI-DNA vaccine or control vaccines (ZIKV full-length E protein and EDI/EDII mixed peptides) using a similar protocol as described for BALB/c mice (see in Example 2). Briefly, female Ifnar1$^{-/-}$ (4-week old), or mixed-sex Ifnar1$^{-/-}$ (3 female and 3 male, 5-6-week old) mice were i.m. immunized with ZIKV full-length E protein (10 μg/mouse) or EDI/EDII mixed peptides (50 μg/mouse) in the presence of alum (500 μg/mouse) and MPL (10 μg/mouse) adjuvants, or with the ZIKV TCI-DNA (10 μg/mouse) in the presence of imiquimod adjuvant (20 μg/mouse). Mice injected with PBS were included as a control. The immunized mice were boosted once at three weeks, and sera was collected 10 days post-boost for detection of IgG antibodies, neutralizing antibodies, and ADE (see Example 4). The immunized mice were further challenged with ZIKV as described below.

ZIKV challenge studies and evaluation of vaccine efficacy in Ifnar1$^{-/-}$ mice. The following experiments were designed to evaluate the efficacy of the ZIKV TCI-DNA vaccine and control vaccines (ZIKV full-length E protein and EDI/EDII mixed peptides) in the immunized Ifnar1$^{-/-}$ mice.

(1) At 13 days post-last dose of the afore-mentioned vaccines or PBS control, Ifnar1$^{-/-}$ mice (male and female) were challenged (I.P.) with ZIKV (human strain R103451; $10^3$ PFU; 200 μl/mouse), and investigated for survival and weight daily for 14 days.

(2) Immunized Ifnar1$^{-/-}$ mice were challenged (I.P.) with ZIKV (human strain PAN2016, $10^3$ PFU/mouse; 200 μl/mouse) as in (1), and 6 days later, sera and tissues were collected for measurement of viral titers by plaque-forming assay (see Example 2).

(3) Ten days post-last dose of the ZIKV TCI-DNA vaccine, control vaccines, or PBS control, female Ifnar1$^{-/-}$ mice were mated with naïve male Ifnar1$^{-/-}$ mice. The pregnant Ifnar1$^{-/-}$ mice (E10-E12) were challenged (I.P.) with ZIKV (strain R103451, $10^4$ PFU/mouse). Six days p.i., sera and tissues of adult mice, as well as placenta, amniotic fluid, and fetal brain, were collected for measurement of viral titers by plaque-forming assay, and uteri and fetuses were collected for analysis of morphological changes. Since Ifnar1$^{-/-}$ mice are susceptible to ZIKV infection, all ZIKV-challenged Ifnar1$^{-/-}$ mice with greater than 25% weight loss and significant clinical symptoms were humanely euthanized.

Results

ZIKV TCI-DNA Vaccine Protected ZIKV-Susceptible Adult or Pregnant Ifnar1$^{-/-}$ Mice and Their Fetuses Against Two Divergent Strains of ZIKV Challenge Because there is no disease pathology in wild-type (BALB/c) adult mice challenged with the ZIKV, a lethal mouse model was used to test the efficacy of the ZIKV TCI-DNA vaccine. Thus, Ifnar1$^{-/-}$ mice, an IFNAR-deficient mouse model in which ZIKV infection is lethal, were immunized with the ZIKV TCI-DNA vaccine, control vaccines (ZIKV full-length E protein or EDI/II mixed peptides), or PBS control, as described above, and the following three challenge experiments were performed.

Figure 4A:
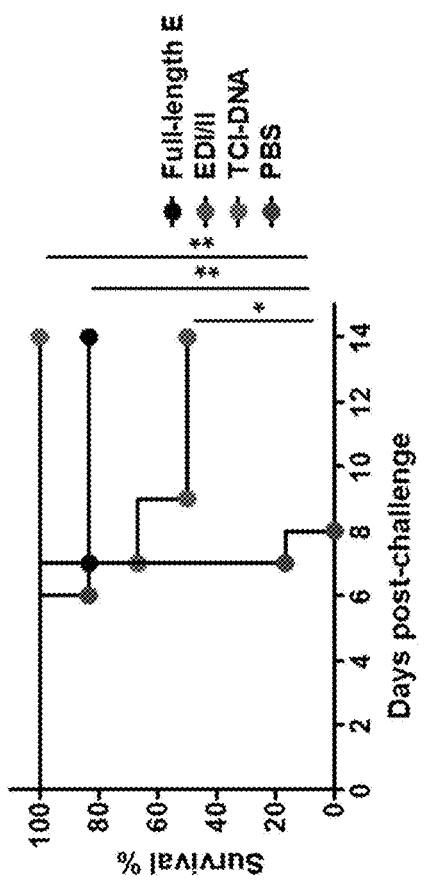
FIG. 4A-C depict that the ZIKV TCI-DNA vaccine protected adult male and female Ifnar1$^{-/-}$ mice against ZIKV challenge with complete survival and reduced viral titers, including in reproductive organs. Equal numbers of male and female Ifnar1$^{-/-}$ mice were immunized with ZIKV TCI-DNA vaccine, control vaccines (ZIKV full-length E protein and EDI/II mixed peptides), or PBS control, and sera was collected at 10 days post-$2^{nd}$ immunization. At 13 days post-$2^{nd}$ immunization, the mice were challenged (I.P.) with ZIKV (strain R103451, $10^3$ PFU/mouse), and weight (FIG. 4A) and survival (FIG. 4B) were recorded daily for 14 days (n=6).
Figure 4B:
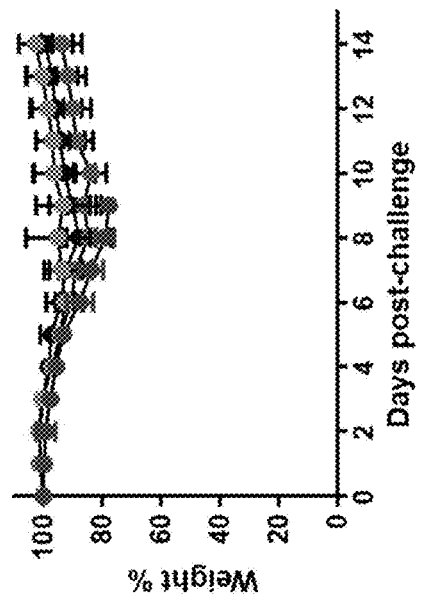

First, immunized adult (male and female) Ifnar1$^{-/-}$ mice were challenged with ZIKV (strain R103451, $10^3$ PFU) 10 days post-last vaccine dose, and monitored for their weight and survival changes for 14 days. The result showed that mice immunized with TCI-DNA vaccine exhibited only slight weight loss during days 7-9 post-challenge, followed by constantly increased weight until 14 days (FIG. 4A), and that all mice from this group survived the ZIKV challenge (FIG. 4B). However, the mice immunized with full-length E protein or EDI/II peptides showed reduced survival rates (to about 83% and 50%, respectively) and their weight either slightly or moderately decreased (FIG. 4A-B). In contrast, mice injected with PBS had continuously decreased weight and all mice died within 8 days post-challenge (FIG. 4A-B). These data confirm complete protection by the TCI-DNA vaccine against ZIKV-caused death and weight loss.

Figure 4C:
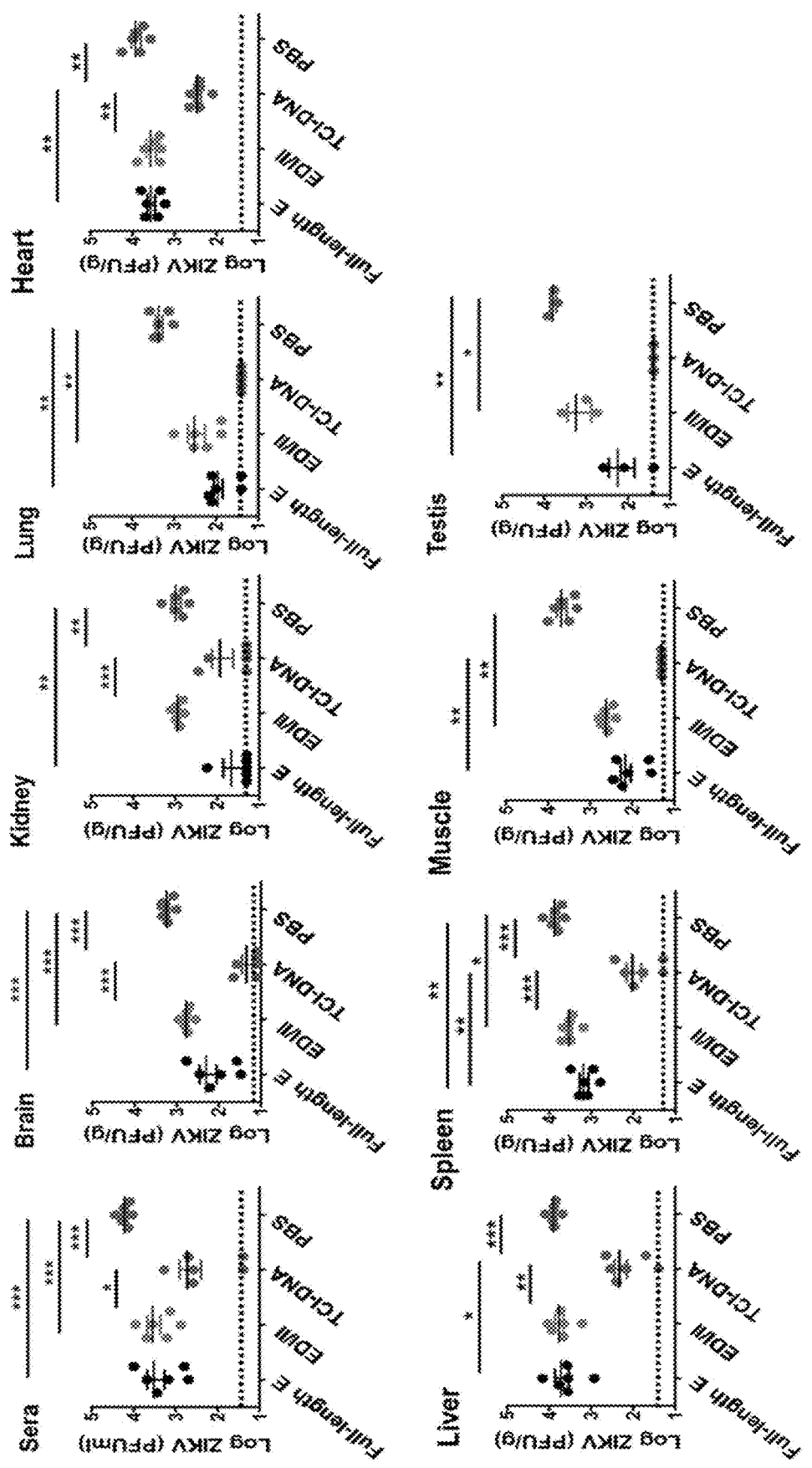

Second, a cohort of immunized adult (male and female) Ifnar1$^{-/-}$ mice were challenged with ZIKV PAN2016 ($10^3$ PFU/mouse), another strain causing human ZIKV disease, and ZIKV titers were measured in sera and tissues via plaque-forming assay 6 days later. There were undetectable viral titers in the lung, muscle, and testis of mice immunized with the TCI-DNA vaccine, and viral titers in the sera and other tissues of these mice were also significantly lower than in those of mice immunized with full-length E, EDI/II mixed peptides, or PBS (for heart, liver, and spleen), or with EDI/II mixed peptides or PBS (for sera, brain, and kidney) (FIG. 4C). In addition, ZIKV titers in sera, brain, kidney, lung, spleen, muscle, or testis of mice receiving full-length E protein and/or EDI/II peptides were also significantly lower than in those of mice injected with PBS (FIG. 4C). These data indicate that although full-length ZIKV E protein or EDI/II mixed peptides may protect Ifnar1$^{-/-}$ mice against ZIKV challenge achieving reduced viral titers, the TCI-DNA vaccine significantly enhanced this protection, resulting in undetectable or significantly decreased viremia and viral titers in key organs, including reproductive organs, such as testis.

Figure 5A:
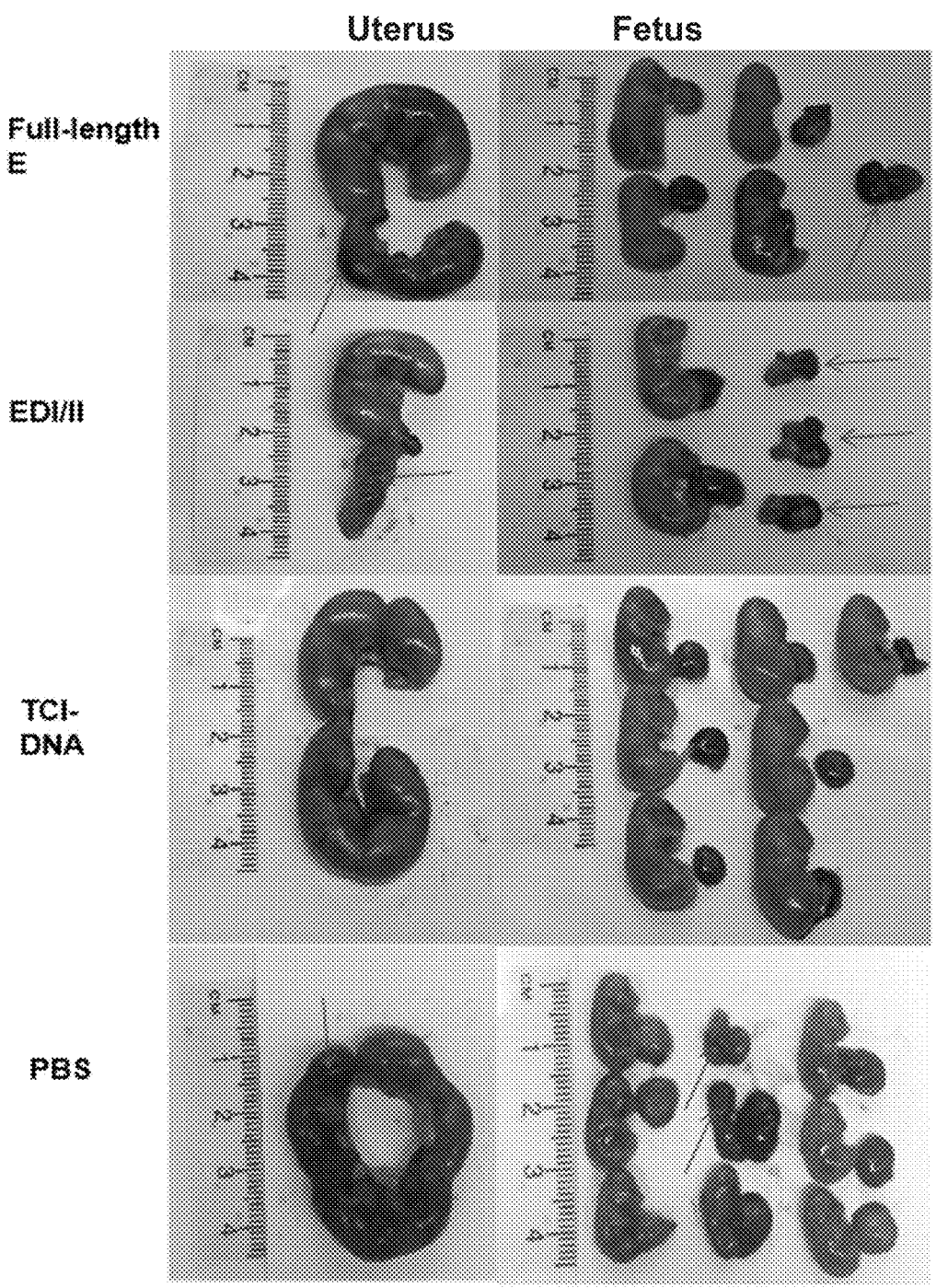
Figure 5E:
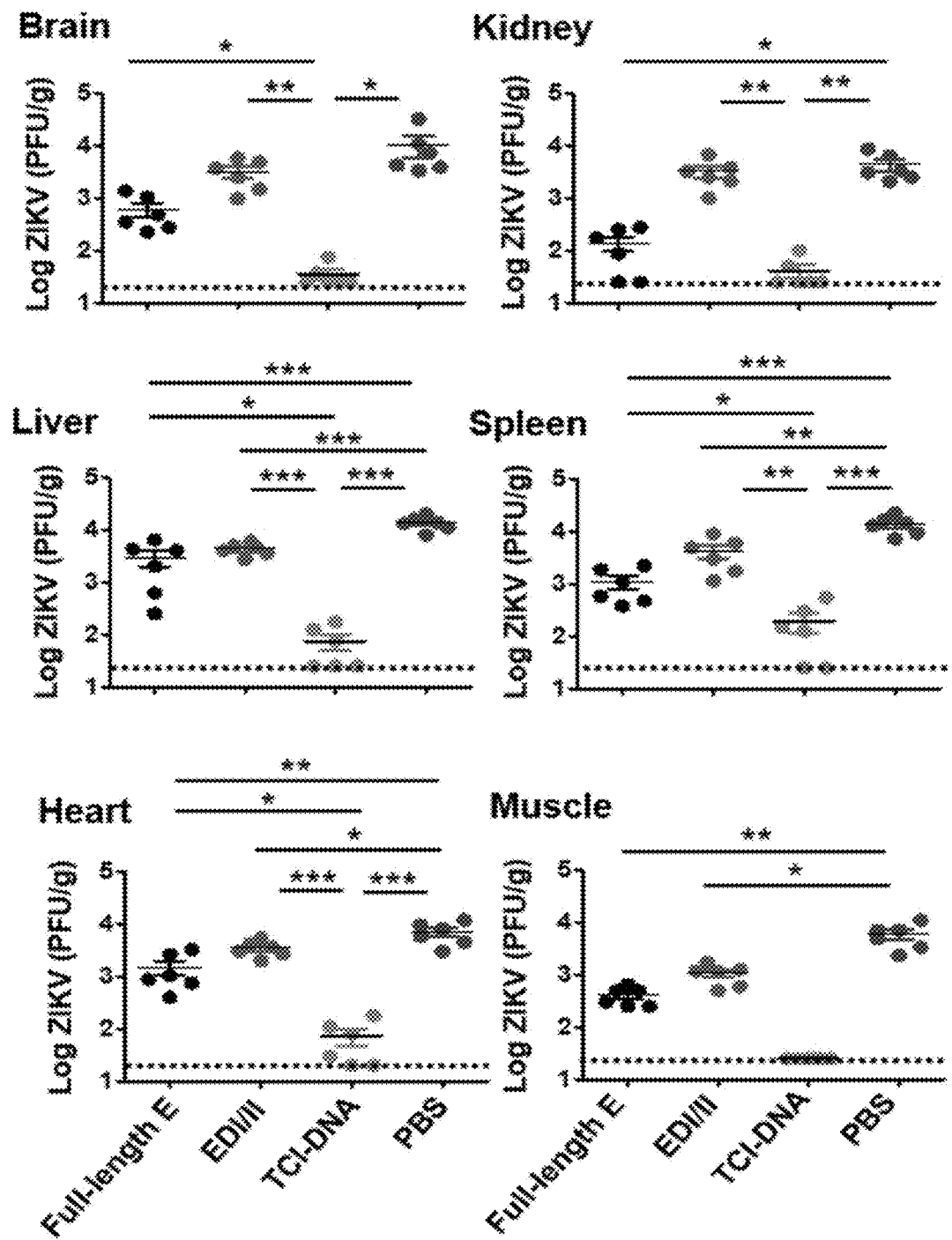
Figure 6A:
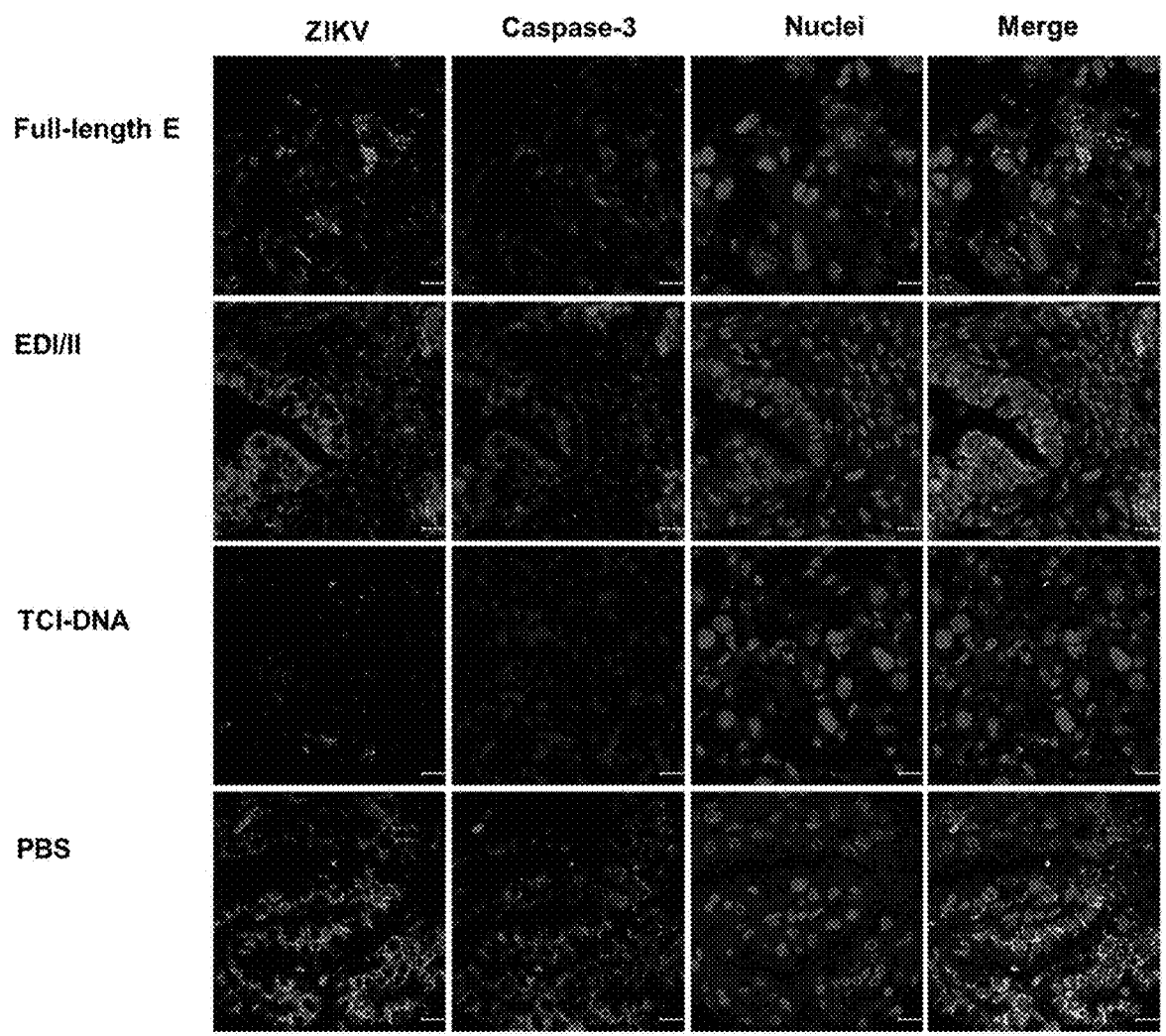
FIG. 6A-C depict that the ZIKV TCI-DNA vaccine prevented ZIKV-caused apoptosis in placenta of female pregnant Ifnar1$^{-/-}$ mice. Placentas collected from the ZIKV-challenged pregnant (E10-E12) Ifnar1$^{-/-}$ mice were stained for the activated form of caspase-3 (an apoptotic marker) by immunofluorescence assay.
Figure 6B:
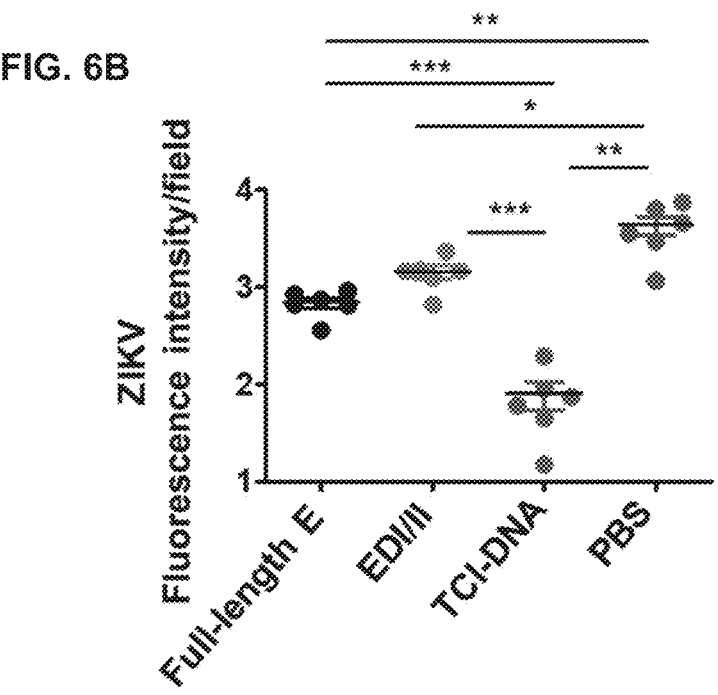
Figure 6C:
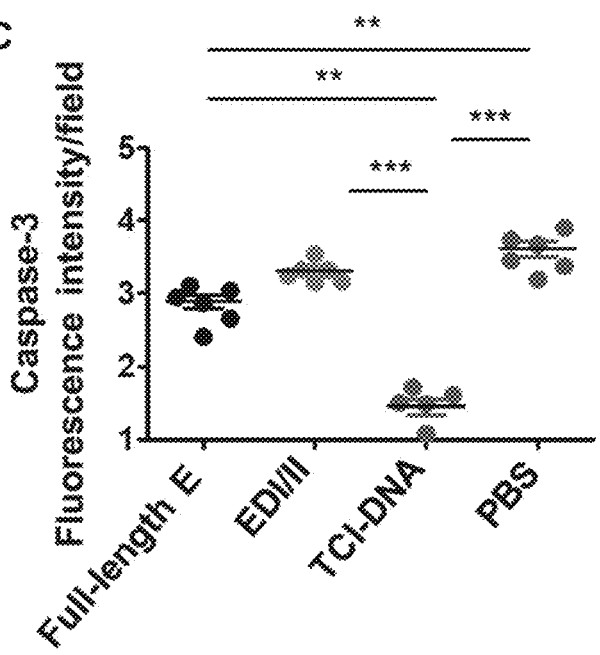
Figure 7A:
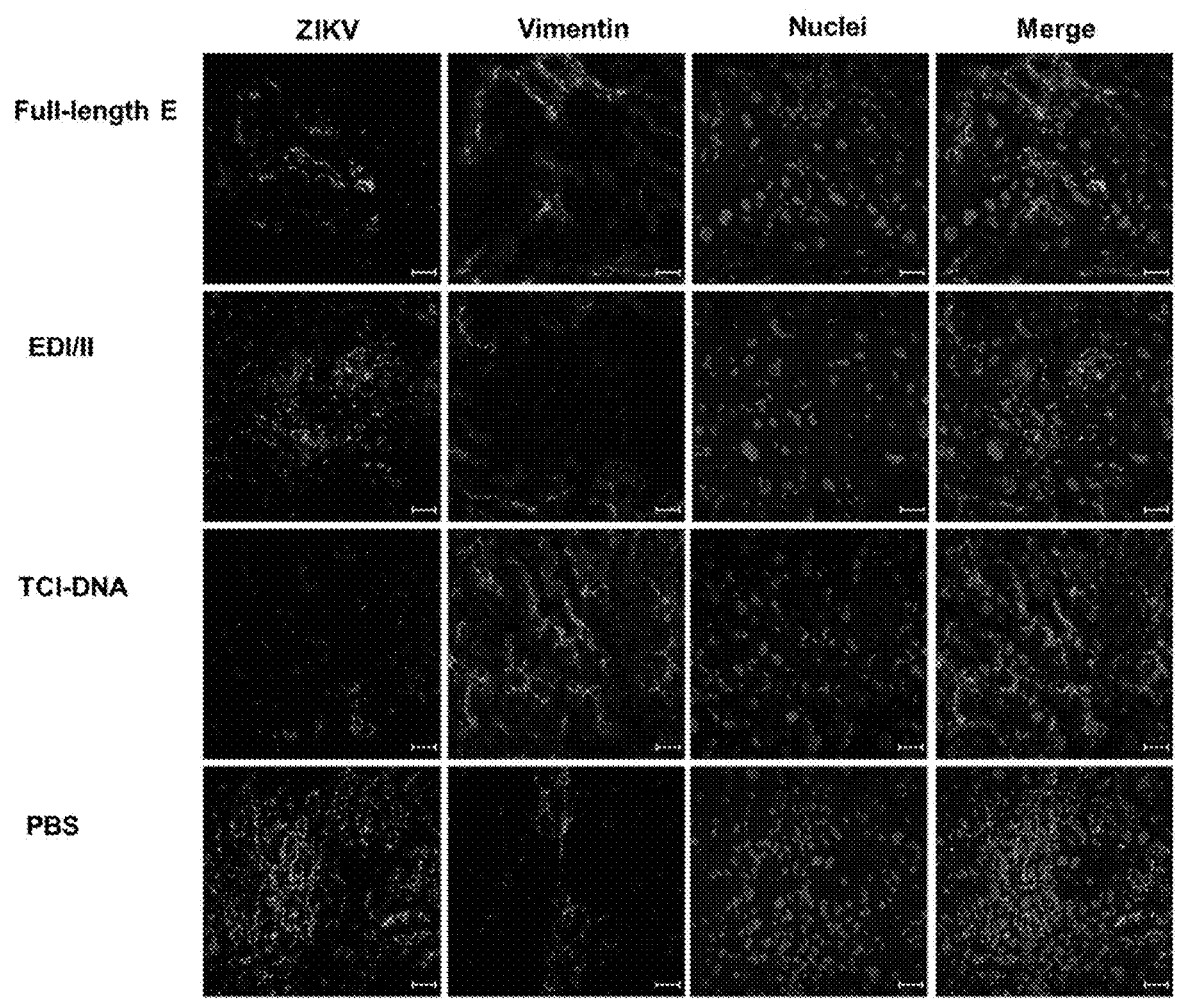
FIG. 7A-C depict that the ZIKV TCI-DNA vaccine prevented ZIKV-caused vascular damage to placenta of female pregnant Ifnar1$^{-/-}$ mice. Placentas collected from the ZIKV-challenged pregnant (E10-E12) Ifnar1$^{-/-}$ mice were stained for vimentin (a marker for fetal capillary endothelium and fetal blood vessels in placenta) by an immunofluorescence assay.
Figure 7B:
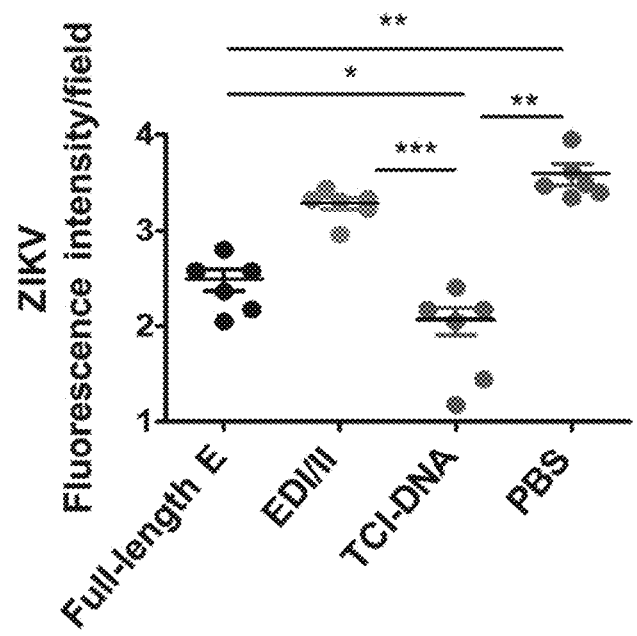
Figure 7C:
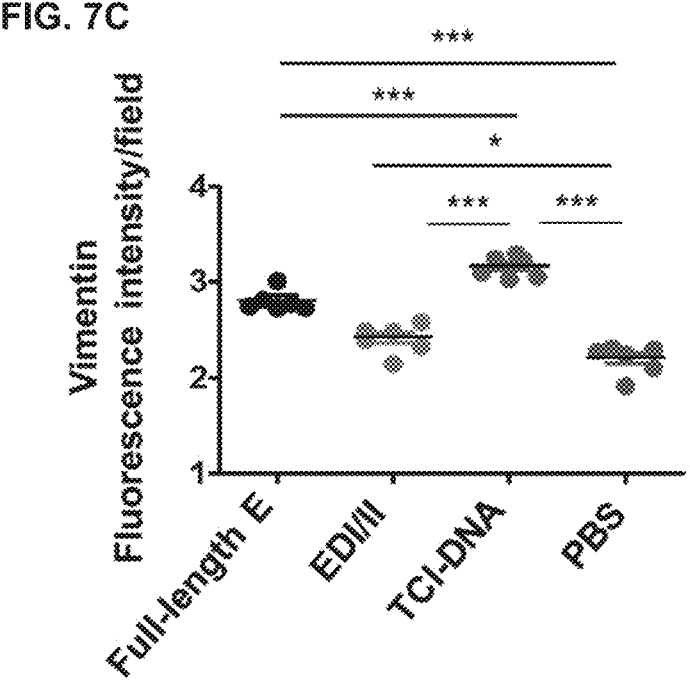
Figure 8A:
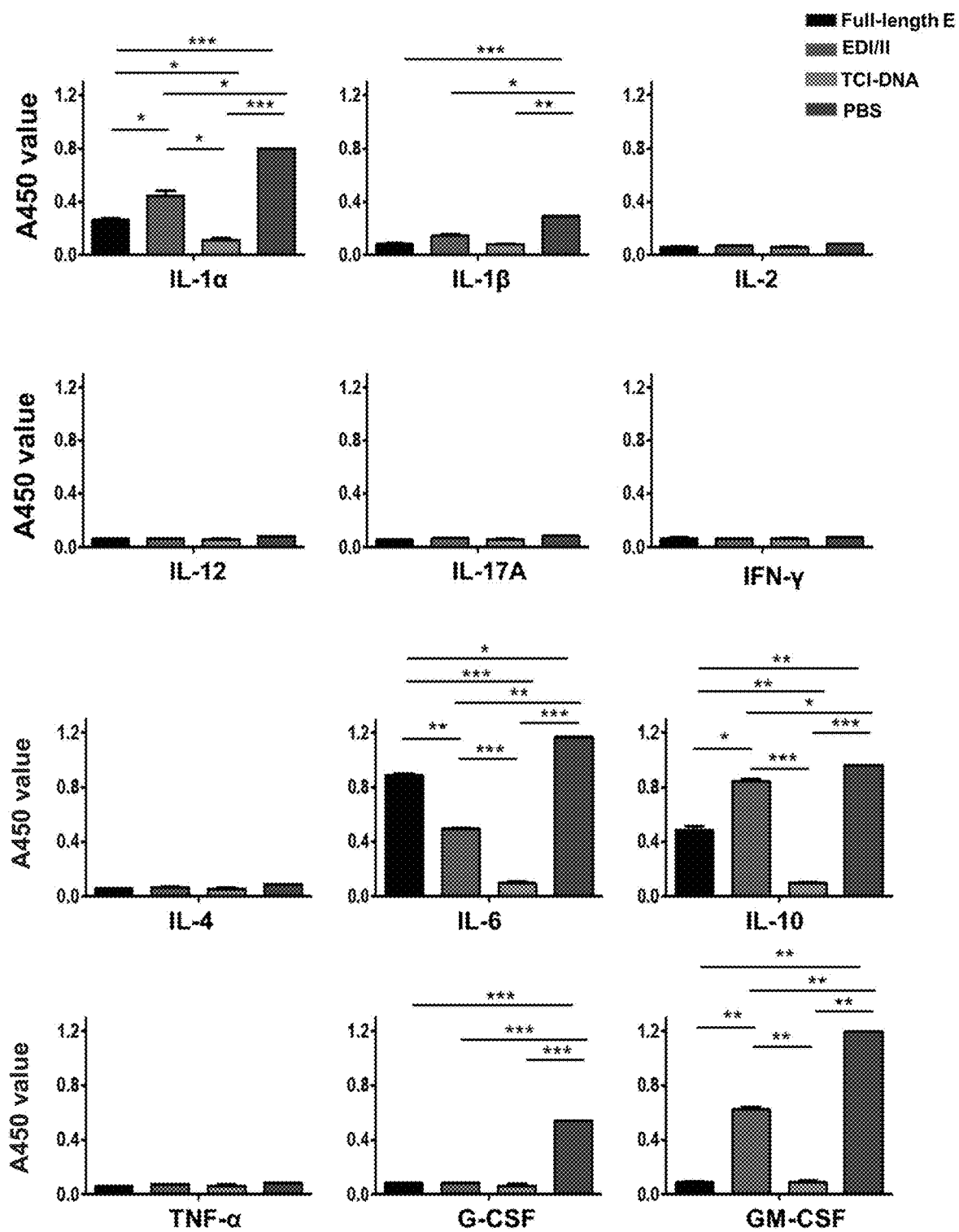
FIG. 8A-B depict that the ZIKV TCI-DNA vaccine prevented ZIKV-caused inflammation in placenta of female pregnant Ifnar1$^{-/-}$ mice. Placentas collected from the challenged pregnant (E10-E12) Ifnar1$^{-/-}$ mice were evaluated for inflammatory cytokines (FIG. 8A) and chemokines (FIG. 8B) by Mouse Inflammatory Cytokines Multi-Analyte ELISArray Kit and Mouse Common Chemokines Multi-Analyte ELISArray Kit, respectively. The data are presented as mean±s.e.m (n=6). *,  and * indicate P<0.05, P<0.01, and P<0.001, respectively.
Figure 8B:
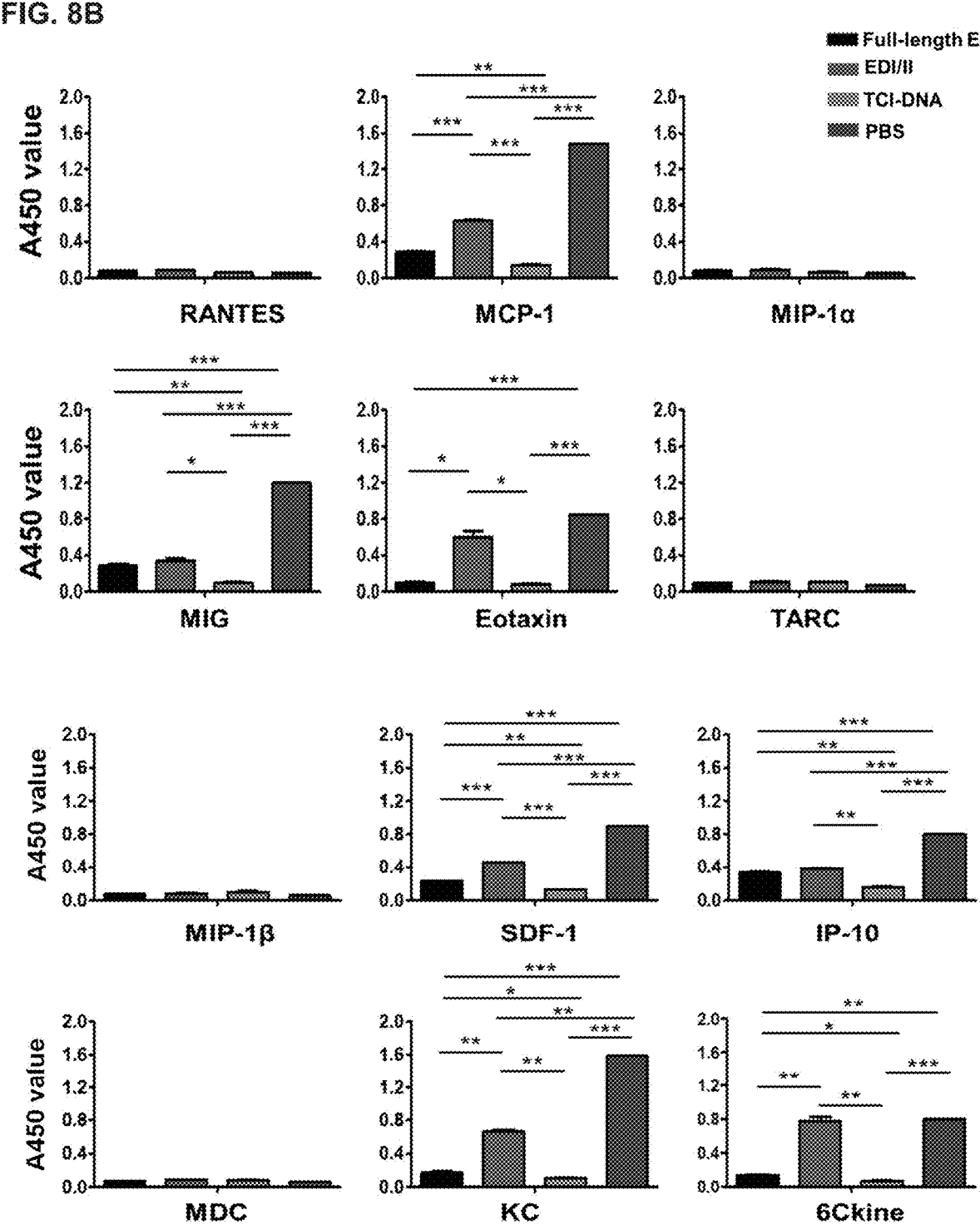

Third, a cohort of TCI-DNA vaccine-immunized female Ifnar1$^{-/-}$ mice were mated with male Ifnar1$^{-/-}$ mice (unimmunized) and the pregnant mice (E5-E7) were challenged with ZIKV (strain R103451; $10^4$ PFU/mouse). The mice were then examined for morphological changes in uteri and fetuses, as well as viral titers in sera, amniotic fluid, fetal brain, and tissues at 6 days post-challenge. The uteri from TCI-DNA-immunized pregnant Ifnar1$^{-/-}$ mice had intact morphology and normal fetuses without demise, whereas the uteri from mice immunized with full-length E protein or EDI/II mixed peptides, or injected with PBS, exhibited slight or severe damage, with moderate and severe fetal resorption or fetal death in utero, respectively (FIG. 5A-B). Importantly, viral titers in the placenta and fetal brain (FIG. 5C), sera and amniotic fluid (FIG. 5D) of mice receiving TCI-DNA vaccine were either undetectable, or significantly lower than in those of mice receiving full-length E, EDI/II mixed peptides, or PBS. Also, there were significantly lower titers of ZIKV in the placenta, amniotic fluid, and fetal brain of mice immunized with full-length E protein and EDI/II mixed peptides than in those of mice injected with PBS (FIG. 5C-D). Notably, ZIKV titers in the muscle, brain, heart, liver, and spleen of mice immunized with TCI-DNA were undetectable, or significantly lower than in those of mice immunized with full-length E, EDI/II mixed peptides, or PBS, and viral titers in the sera and kidney of TCI-DNA-immunized mice were also significantly lower than in those of mice receiving EDI/II mixed peptides or PBS (FIG. 5E). Moreover, the results also denoted significantly lower viral titers in the sera and tissues (kidney, heart, liver, spleen, and muscle) of mice vaccinated with full-length E and/or EDI/II mixed peptides than in those of mice injected with PBS (FIG. 5E).

Collectively, the above data indicate partial protection by immunization with full-length E protein or EDI/II mixed peptides against ZIKV challenge, and that the TCI-DNA vaccine completely protected adult or pregnant Ifnar1$^{-/-}$ mice and their fetuses against two divergent strains of ZIKV infection.

Example 4. The ZIKV TCI-DNA Vaccine Prevented ZIKV-Caused Apoptosis, Vascular Damage and Inflammation, and ZIKV-Associated ADE Methods ELISA. ZIKV-, E-, or NS3-specific IgG antibodies were assayed by ELISA in the sera of above immunized BALB/c and Ifnar1$^{-/-}$ mice (see Examples 2 and 3). Briefly, ELISA plates were pre-coated with ZIKV full-length E protein (1 μg/ml), NS3 peptides (Table 3), or ZIKV (strain R103451)-infected Vero E6 cell lysates at 4° C. overnight and blocked with PBS-T containing 2% non-fat milk at 37° C. for 2 h. After three washes with PBS-T, the plates were then sequentially incubated at 37° C. for 1 h with serially-diluted mouse sera and HRP-conjugated anti-mouse IgG-Fab antibody (1:5,000). The substrate 3,3',5,5'-tetramethylbenzidine was added to the plates, and the reaction was stopped after addition of 1N $H_2SO_4$. Absorbance at 450 nm ($A_{450}$) was measured using ELISA plate reader.

TABLE 3

ZIKV NS3 overlapping peptides used for stimulation of CD8$^+$ T cell responses and IgG antibody detection

| Peptide name | Sequence | SEQ ID NO. |
|---|---|---|
| 1 | AETDEDHAHWLEARM | 14 |
| 2 | HAHWLEARMLLDNIY | 15 |
| 3 | ARMLLDNIYLQDGLI | 16 |

TABLE 3-continued

ZIKV NS3 overlapping peptides used for stimulation of $CD8^+$ T cell responses and IgG antibody detection

| Peptide name | Sequence | SEQ ID NO. |
|---|---|---|
| 4 | NIYLQDGLIASLYRP | 17 |
| 5 | GLIASLYRPEADKVA | 18 |
| 6 | YRPEADKVAAIEGEF | 19 |
| 7 | KVAAIEGEFKLRTEQ | 20 |
| 8 | GEFKLRTEQRKTFVE | 21 |
| 9 | TEQRKTFVELMKRGD | 22 |
| 10 | FVELMKRGDLPV | 23 |

PRNT assay. This assay was performed to detect neutralizing antibodies in the immunized mouse sera (see Examples 2 and 3). Briefly, ZIKV (strain R103451, 100 PFU/mouse) was incubated with 2-fold serially-diluted immunized mouse sera at 37° C. for 1.5 h, which was added to Vero E6 cells and the cells cultured at 37° C. for 1 h. The cells were then overlaid with DMEM containing 1% carboxymethyl cellulose and 2% FBS, and cultured at 37° C. for 4-5 days, followed by staining with crystal violet (0.5%). PRNT titers ($PRNT_{50}$) were calculated based on 2-fold serial dilutions of individual mouse serum at 50% plaque reduction using the CalcuSyn computer program.

In vitro ADE assay. ADE potentially induced by the immunized mouse serum antibodies (see Examples 2 and 3) was measured in K562 cells using a flow cytometry-based assay. Briefly, 100 PFU of ZIKV (strain R103451) was mixed with sera at 4-fold serial dilutions, and incubated at 37° C. for 1 h. The virus-serum mixture was then added to K562 cells ($5\times10^4$/well), and incubated at 37° C. for 2 h in DMEM containing 10% FBS and 1% penicillin/streptomycin, followed by washing the cells with fresh DMEM, and culturing them for 3 days. The cells were then fixed, permeabilized, and sequentially stained with mouse anti-flavivirus 4G2 mAb (2 μg/ml) and FITC-conjugated anti-mouse antibody (1:100). The percent of infected cells was calculated based on the fluorescence signals in the presence or absence of serially diluted mouse sera.

Immunofluorescence staining. Maternal placental tissues harvested from the ZIKV-challenged pregnant $Ifnar1^{-/-}$ mice (see Example 3) were fixed in 4% paraformaldehyde, which were further embedded in paraffin and sectioned. For vimentin staining, deparaffinized tissue slides were blocked with 2% BSA for 30 min at room temperature, and then sequentially incubated with ZIKV envelope domain III (EDIII)-specific human mAb (ZV-64, 1:200) and rabbit anti-vimentin antibody (1:300). For caspase-3 staining, the tissue slides were fixed and permeabilized with FIX and PERM™ Cell Permeabilization Kit, before being blocked as described above and incubated sequentially with ZV-64 and rabbit anti-active caspase-3 antibodies (1:200). The slides were washed with PBS, and incubated for 1 h at room temperature with anti-human FITC (for ZIKV)- or anti-rabbit Alexa Fluor® 647 (1:300; for vimentin and caspase-3)-conjugated antibodies, which were counter-stained for nuclei for 5 min with DAPI (4',6-diamidino-2-phenylindole, 300 nM), and mounted in a mounting medium (VectaMount Permanent). The stained slides were imaged on a confocal microscope, and prepared for images using ZEN software. The fluorescence signals were quantified by ImageJ software for relative intensity (particle analysis).

Detection of inflammatory cytokines and chemokines. Maternal placental tissues collected from the ZIKV-challenged pregnant $Ifnar1^{-/-}$ mice (see Example 3) were measured for inflammatory cytokines and chemokines using Mouse Inflammatory Cytokines Multi-Analyte ELISArray Kit and Mouse Common Chemokines Multi-Analyte ELISArray Kit. Briefly, ELISA plates were pre-coated with cytokine or chemokine capture antibodies, followed by incubation with tissue lysates for 2 h at room temperature. After three washes, the plates were sequentially incubated with detection antibody for 1 h, and avidin-HRP conjugates for 30 min at room temperature, followed by incubation with development and stop solutions, respectively. A450 value was measured using ELISA plate reader.

Results

ZIKV TCI-DNA Vaccine Prevented ZIKV-Caused Apoptosis, Vascular Damage and Inflammation, and ZIKV-Associated ADE ZIKV infection may cause apoptosis and fetal blood vessel damage in placenta, leading to severe inflammation with increased cytokines and chemokines. ZIKV E protein, including the fusion loop (FP) region, may induce cross-reactive antibodies that enhance ZIKV or DENV infection, resulting in ADE.

To evaluate whether the ZIKV TCI-DNA vaccine can prevent apoptosis and vascular damage associated with ZIKV, placental tissues of vaccine-immunized and ZIKV-challenged pregnant $Ifnar1^{-/-}$ mice (as described above) were immunofluorescent stained for active caspase-3, an apoptotic marker, and vimentin, a marker for fetal blood vessels and fetal capillary endothelium. There were significantly lower numbers of caspase-$3^+$ and $ZIKV^+$ signals in the placenta of mice immunized with TCI-DNA vaccine than in those of mice immunized with full-length E, EDI/II, or PBS (FIG. 6A-C), suggesting nearly no ZIKV-associated cell death in the TCI-DNA-immunized mouse placenta. However, there was moderate to strong staining of caspase-3 and ZIKV in the placenta from other vaccine groups (full-length E and EDI/II) or PBS control (FIG. 6A-C), illustrating that full-length E or EDI/II may not fully prevent ZIKV-related cell death. In contrast, there was strong staining for vimentin in the placenta of mice immunized with TCI-DNA (FIG. 7A), with significantly higher numbers of vimentin signals than those of mice receiving other vaccines or PBS (FIG. 7B-C), suggesting intact vasculature in the TCI-DNA-vaccinated mouse placenta, but partially or completely damaged vasculature in the placenta of other groups.

To determine whether the ZIKV TCI-DNA vaccine can prevent ZIKV-caused inflammation, inflammatory cytokines and chemokines were measured in the placenta of immunized and ZIKV-infected pregnant $Ifnar1^{-/-}$ mice using Multi-Analyte ELISArray kits. Significantly lower level of cytokines (IL-1α, IL-1β, IL-6, IL-10, G-CSF, and GM-CSF) (FIG. 8A) and chemokines (MCP-1, SDF-1, IP-10, MIG, Eotaxin, KC, and 6Ckine) (FIG. 8B) were identified in the TCI-DNA-immunized mouse placenta than in the placenta of mice immunized with EDI/II mixed peptides, and/or full-length E or PBS. In addition, the level of these cytokines and chemokines in the full-length E-immunized mouse placenta was also significantly lower than in the placenta of mice injected with PBS and/or EDI/II mixed peptides. These results indicate improved capacity of full-length E protein in preventing the inflammation than EDI/DII peptides, but TCI-DNA was the most effective in preventing ZIKV-associated inflammation.

Figure 10A:
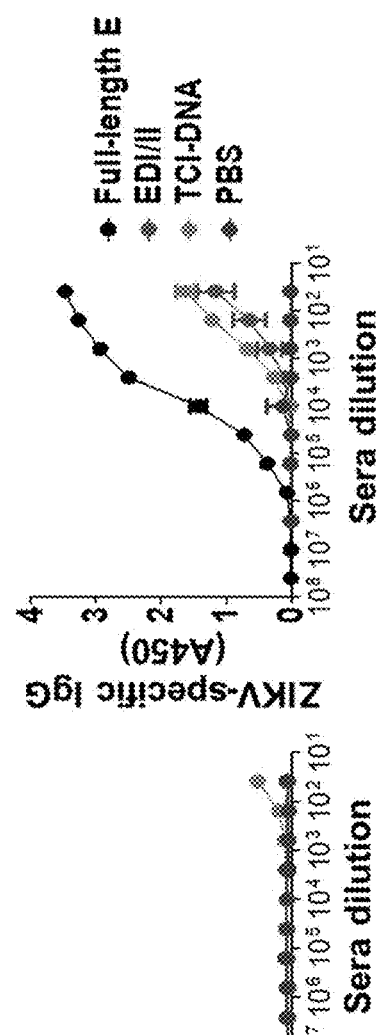
FIG. 10A-E depict that the ZIKV TCI-DNA vaccine induced low to no ZIKV-, E-, and NS3-specific antibodies, eliminating the ADE effect in Ifnar1$^{-/-}$ mice. Mouse sera collected at 10 days post-2$^{nd}$ immunization were assayed for ZIKV E-, NS3-, and ZIKV-specific IgG antibody, neutralizing antibodies, and ADE of ZIKV infection. ZIKV strain R103451 was used for the neutralization and ADE tests. ELISA for detection of IgG antibody specific to ZIKV full-length E protein (FIG. 10A), NS3 peptides (FIG. 10B), and ZIKV (R103451 strain) (FIG. 10C) in sera of Ifnar1$^{-/-}$ mice immunized with ZIKV full-length E protein, EDI/II mixed peptides, TCI-DNA, or PBS control. IgG antibody titers are presented as positively detectable endpoint serum dilutions. Measurement of neutralizing antibodies (FIG. 10D) by plaque reduction neutralization test (PRNT) and ADE (FIG. 10E) by flow cytometry-based assay was performed in sera of immunized Ifnar1$^{-/-}$ mice. Neutralizing antibody titers are presented as 50% plaque reduction neutralizing antibody titer (PRNT$_{50}$) of 2-fold serially diluted sera. The ADE is presented as percent of infected cells, which was calculated based on fluorescence signals in the presence or absence of serially diluted sera. The data are expressed as mean±s.e.m (n=6). * indicates P<0.01.
Figure 10B:
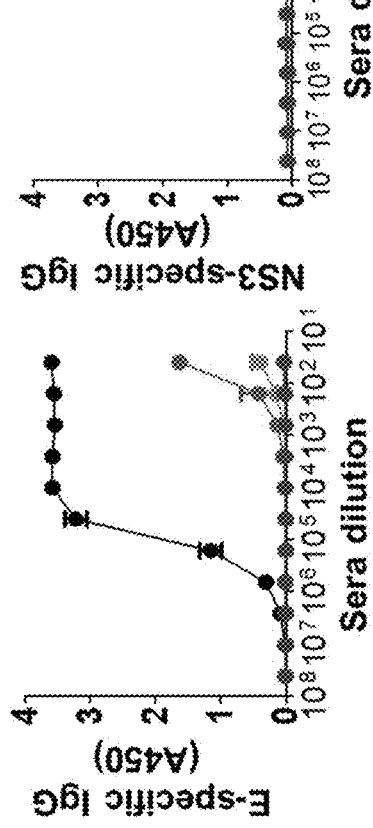
Figure 10C:
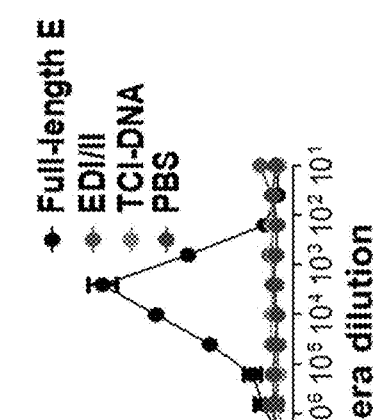
Figure 10D:
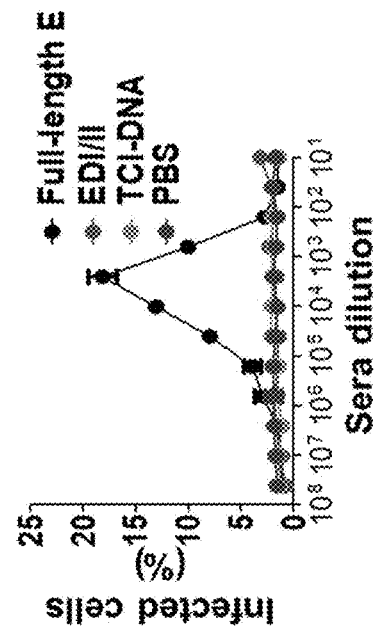
Figure 10E:
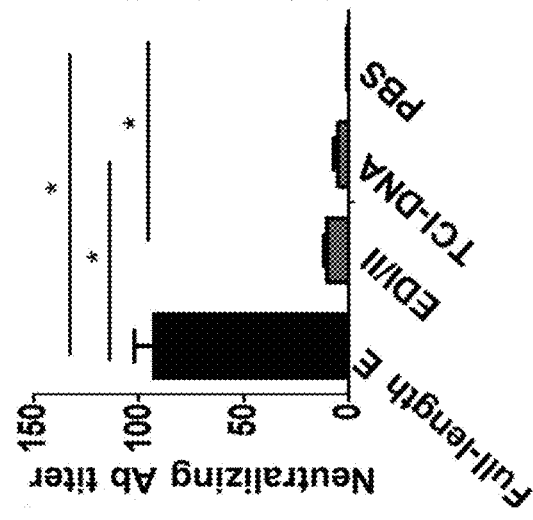

To investigate whether the ZIKV TCI-DNA vaccine induces ZIKV-specific antibodies and if so, whether these antibodies can cause ZIKV-associated ADE, ZIKV antibodies were measured by ELISA and plaque-forming neutralization assay, and tested for ADE in vitro using immunized sera of BALB/c (FIG. 9A-E) and Ifnar1$^{-/-}$ (FIG. 10A-E) mice. No, or very low levels, of IgG antibodies were detected against ZIKV E protein, NS3 peptides, and/or ZIKV lysates in the sera of mice immunized with TCI-DNA (FIG. 9A-C, 10A-C) and there were no neutralizing antibodies detected against ZIKV in these sera (FIGS. 9D, 10D). Moreover, similar to the sera collected from PBS-injected mice, TCI-DNA-immunized mouse sera did not exhibit any ADE (FIG. 9E, 10E). In contrast, ZIKV full-length E protein elicited high-level E- and ZIKV-specific IgG antibodies with neutralizing activity against ZIKV infection, exhibiting strong ADE of ZIKV infection (FIGS. 9 and 10). However, the ADE only showed up when the sera was diluted so that the neutralizing activity was gone. These data demonstrate that unlike ZIKV full-length E protein, TCI-DNA did not induce ZIKV E-specific antibodies, but only elicited very weak N53-specific antibody responses, eliminating the possibility to cause ZIKV-associated ADE.

Collectively, the above results confirm that the ZIKV TCI-DNA vaccine demonstrated the ability to prevent ZIKV-associated apoptosis, vascular damage, and inflammation, without leading to ADE.

Example 5. The ZIKV TCI-DNA Vaccine-Induced CD8$^+$ T Cells Play a Key Role in Protecting Pregnant Mice and Their Fetuses Against ZIKV Infection Methods Immunization of BALB/c mice with vaccines, depletion of CD8$^+$ T cells, and challenge of pregnant BALB/c mice with ZIKV. Female BALB/c mice (8-10-week old) were immunized with TCI-DNA vaccine (10 μg/mouse) and imiquimod adjuvant, or PBS (control), and boosted once at 3 weeks. Ten days post-last dose, female BALB/c mice were mated with naïve male BALB/c mice for pregnancy. The pregnant mice (E10-E12) were injected (I.P.) with or without anti-CD8a IgG2a mAb (200 μg/mouse, for TCI-DNA) or IgG2a isotype control mAb (for PBS) at −2, −1, and 3 days post-ZIKV challenge (described below), and peripheral blood cells (collected at 6 h before infection and 3 days p.i.) and splenocytes (collected at 6 days p.i.) were evaluated for CD8$^+$ T cell depletion by flow cytometry analysis (described below). The pregnant mice (with or without CD8$^+$ depletion) were also injected with anti-IFNAR1 blocking mAb (MAR1-5A3, 2 mg/mouse), and 24 h later, they were (I.P.) challenged with ZIKV (strain R103451, 2×10$^5$ PFU/mouse). Sera (collected 3 and 6 days p.i.) and tissues (placenta, amniotic fluid, and fetal brain collected 6 days p.i.) were assayed for viral titers by plaque-forming assay, fetuses and uteri (collected 6 days p.i.) were observed for morphological analysis, and splenocytes (collected 6 days p.i.) were assayed for ZIKV-specific CD8$^+$ T cell responses by flow cytometry analysis, as described below.

Flow cytometry. Flow cytometry analysis was performed to evaluate CD8$^+$ cell depletion and ZIKV-specific CD8$^+$ T cell responses in the challenged mice. For analysis of CD8$^+$ depletion in whole blood and splenocytes, peripheral blood cells (collected at 6 h before infection and 3 days p.i.) and splenocytes (collected at 6 days p.i.) were treated with 1× Red Blood Cell Lysis Buffer, and stained with PerCP-Cy5.5 anti-mouse CD8a mAb, followed by flow cytometry analysis using BD LSRFortessa 4 system. For analysis of ZIKV-specific CD8$^+$ T cell responses, the above-treated splenocytes (2×10$^6$ cells/well) were incubated with ZIKV NS3 overlapping peptides (0.25 nM/peptide, final concentration 5 μg/ml; equal concentrations of each of the peptides in Table 3) in the presence of 5 μg/ml brefeldin A, and cultured at 37° C. for 5 h. After stimulation, the cells were washed with PBS and stained for surface marker using PerCP/Cy5.5 anti-mouse CD8a. After fixation and permeabilization, the cells were stained for intracellular markers using FITC anti-mouse IL-2, PE anti-mouse IFN-γ, and Brilliant Violet 421™ anti-mouse TNF-α mAbs, followed by analysis using flow cytometry as described above.

Results

ZIKV TCI-DNA Vaccine-Induced CD8$^+$ T Cells Play a Key Role in Protecting Pregnant Mice and Their Fetuses Against ZIKV Infection Since ZIKV TCI-DNA induced very low to no antibody responses, we determined whether the T cell responses elicited by this vaccine were essential in protecting against ZIKV infection. Therefore, two experiments were conducted.

Figure 11A:
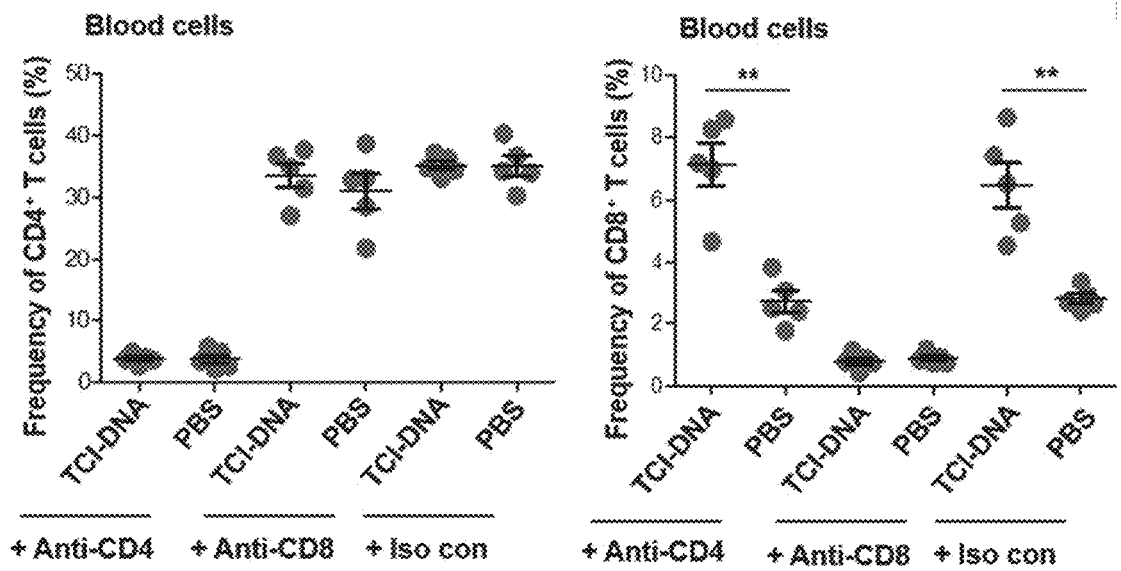
FIG. 11A-C depicts that CD8$^+$ T-cells induced by ZIKV TCI-DNA vaccine were essential in protecting adult mice against ZIKV infection. Male and female BALB/c mice were immunized with ZIKV TCI-DNA or PBS control for two doses; 10 days post-2$^{nd}$ dose they were injected (I.P.) with anti-CD4 (for depleting CD4$^+$ T cells), anti-CD8a (for depleting CD8$^+$ T cells), or IgG2b isotype control (i.e., Iso con; without depleting either CD4$^+$ or CD8$^+$ T cells) antibody (200 μg/mouse) for three times (−2, −1, and 1 day p.i.). One day before challenge, the mice were injected with anti-IFNAR1 blocking antibody (for depleting type I IFN; 2 mg/mouse), and then infected with ZIKV (strain R103451, 2.5×10$^5$ PFU/mouse). Three days post-challenge, the mice were sacrificed and the frequencies of CD4$^+$ or CD8$^+$ T cells in blood cells (FIG. 11A) and splenocytes (FIG. 11B) were quantified by flow cytometry analysis, as well as viral titers were determined by plaque-forming assay in sera and tissues (lung, eye, and muscle) (FIG. 11C). The detection limit was 50 PFU/ml (for sera) or 50 PFU/g (for lung, eye, and muscle). The data are represented as mean±s.e.m (n=5). *,  and * indicate P<0.05, P<0.01, and P<0.001, respectively.
Figure 11B:
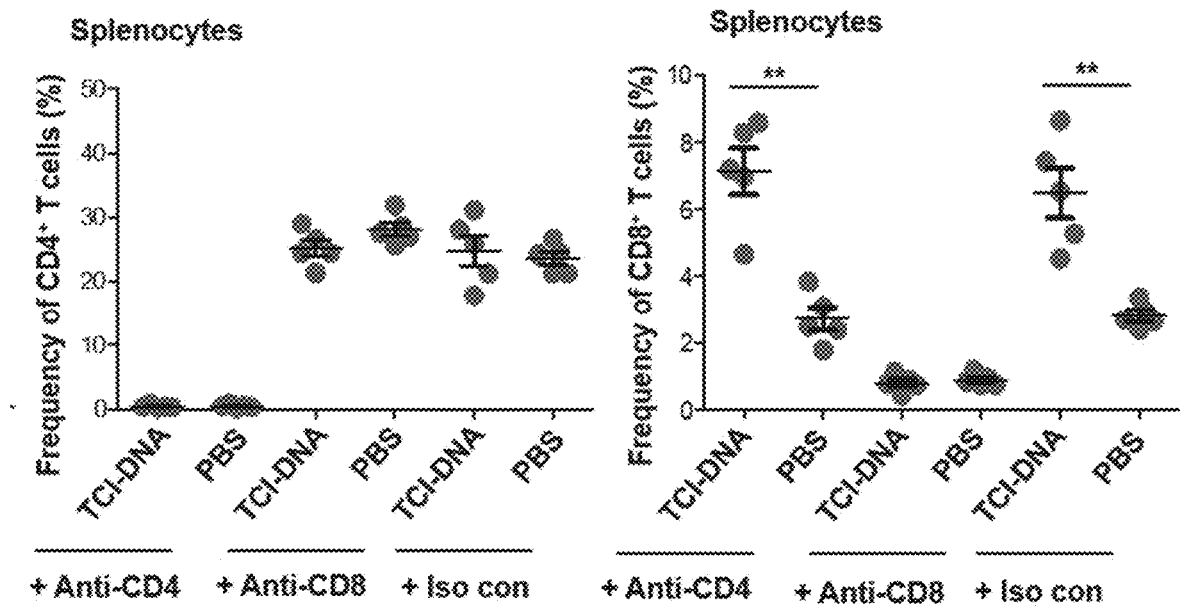
Figure 11C:
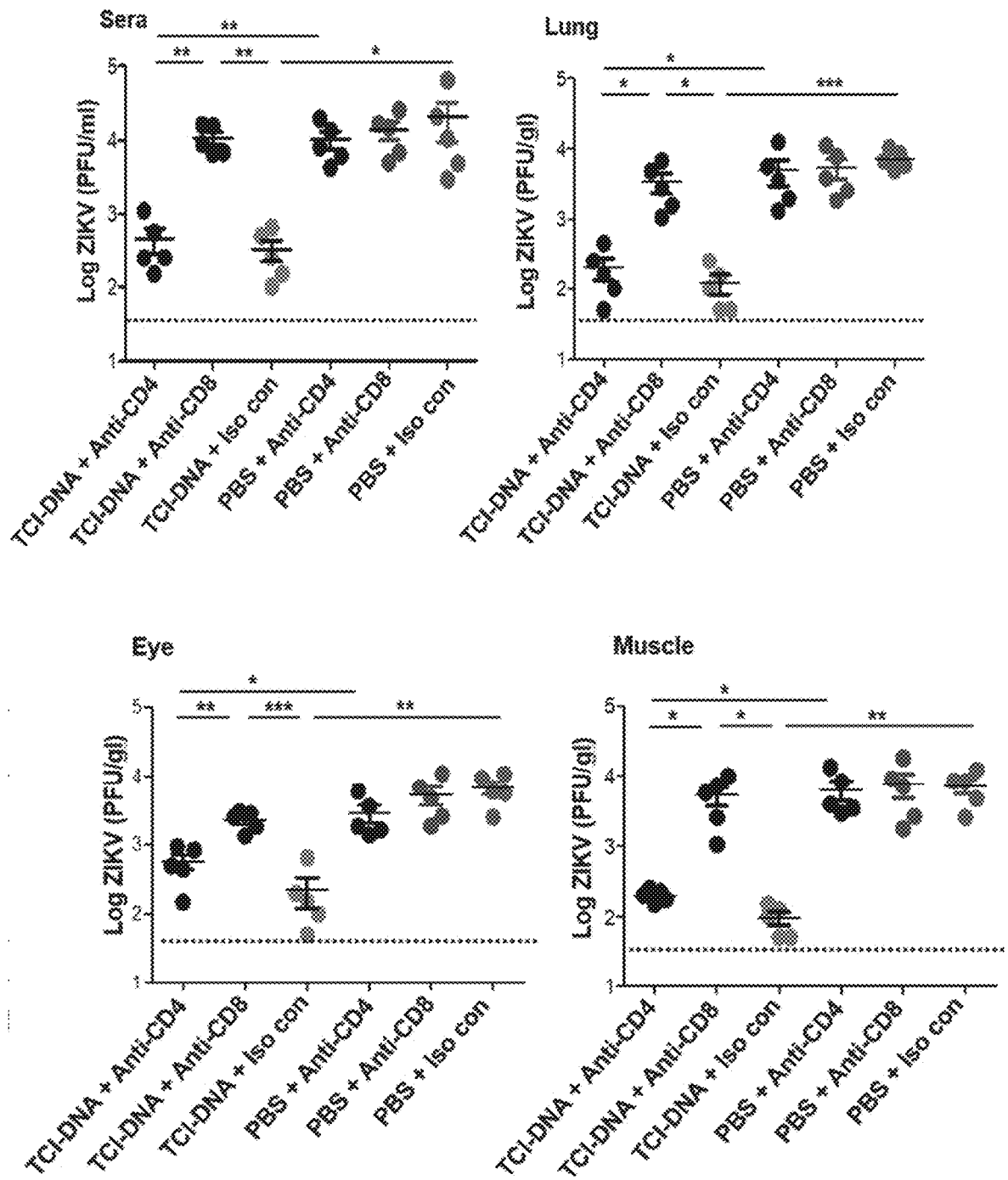

First, immunocompetent male and female BALB/c mice were immunized with TCI-DNA or PBS control, and then their CD4$^+$ and CD8$^+$ T cells were depleted, respectively (using anti-CD4 or anti-CD8a antibody), followed by ZIKV challenge. There were minimal numbers of CD4$^+$ or CD8$^+$ T cells in the peripheral blood cells (FIG. 11A) and splenocytes (FIG. 11B) of anti-CD4- or anti-CD8a-treated, TCI-DNA or PBS-immunized mice as compared to those of mice treated with isotype antibody control (FIG. 11A-B), confirming complete depletion of CD4$^+$ or CD8$^+$ T cells in these mice. Compared to PBS control, the mice immunized with TCI-DNA vaccine have significantly more CD8$^+$ T cells as seen in the mice receiving anti-CD4 or isotype control antibody (no CD8$^+$ T cell depletion) (FIG. 11A-B). In contrast, the mice immunized with TCI-DNA have similar numbers of CD4$^+$ T cells as control mice as seen in the mice receiving anti-CD8a or isotype control antibody (no CD4$^+$ T cell depletion) (FIG. 11A-B). In addition, high viral titers were detected in the sera and tissues (lung, eye, and muscle) of mice immunized with TCI-DNA vaccine and CD8$^+$ T cells depleted, which were significantly higher than those of TCI-DNA-immunized mice injected with anti-CD4 or isotype control antibody (no CD8$^+$ T cell depletion) (FIG. 11C). In contrast, there were no significant differences of viral titers in the mice immunized with TCI-DNA and received either anti-CD4 (CD4$^+$ T cell depletion) or isotype control antibody (FIG. 11A-C). These data suggest that CD8$^+$ T cells in TCI-DNA-immunized adult mice are essential in prevention of ZIKV infection.

Figure 12A:
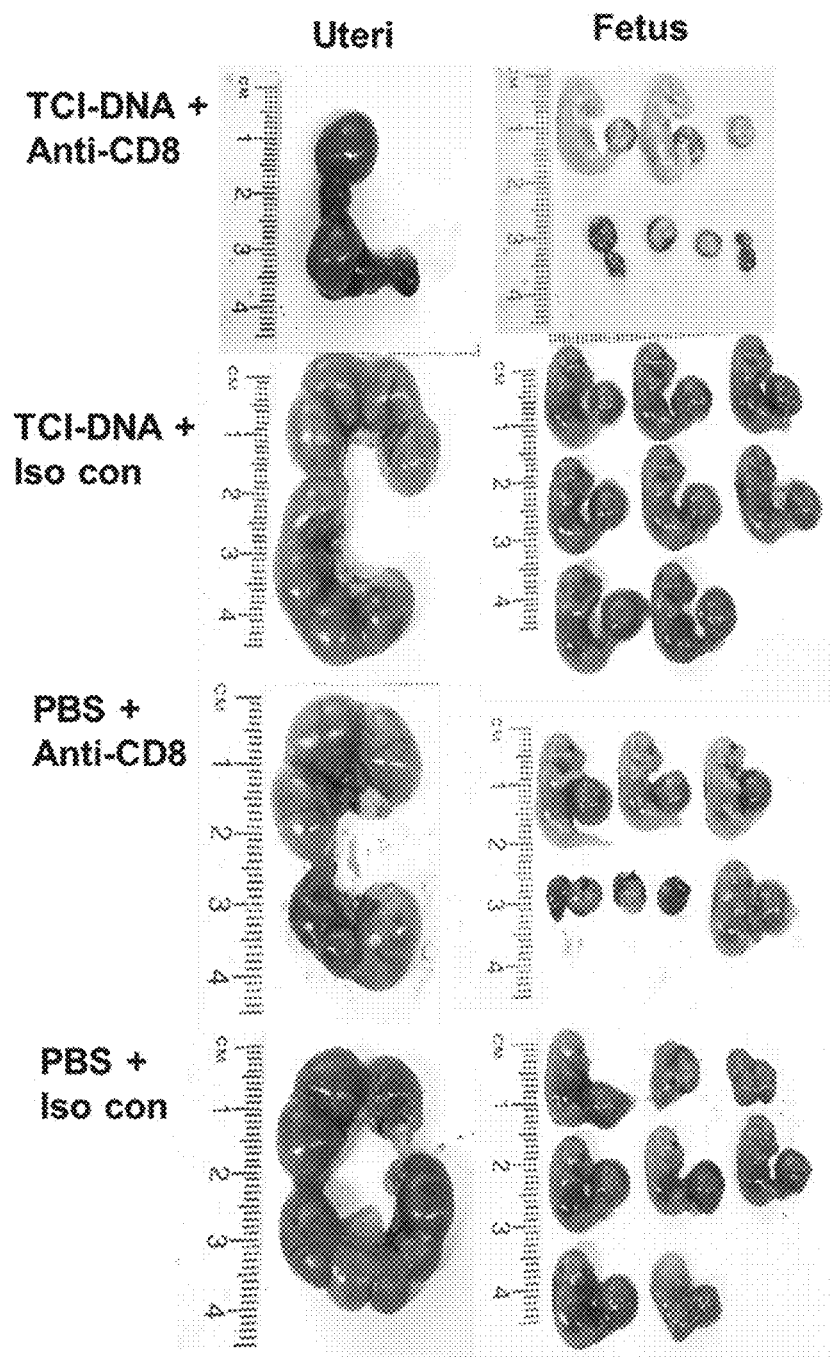
FIG. 12A-B depicts that CD8$^+$ T-cell-mediated immune responses induced by the ZIKV TCI-DNA vaccine played a key role in protecting pregnant mothers and their fetuses against ZIKV infection. Female BALB/c mice were immunized with the ZIKV TCI-DNA vaccine or PBS control for two doses, and then mated with male BALB/c mice at 10 days post-2$^{nd}$ immunization. The pregnant (E10-E12) mice were then injected (I.P.) with anti-CD8a (for depleting CD8$^+$ T cells) or IgG2a isotype control (i.e., Iso con; without depleting CD8$^+$ T cells) antibody (200 μg/mouse) three times (−2, −1, and 3 days p.i. (post-infection)). One day before challenge, the mice were also injected with anti-IFNAR1 blocking antibody (for depleting type I IFN; 2 mg/mouse), and then infected with ZIKV (strain R103451, 10$^6$ PFU/mouse). Six days post-challenge, the mice were euthanized, and morphology of uteri and fetuses (FIG. 12A) and number of total and dead fetuses (FIG. 12B) were recorded.
Figure 12B:
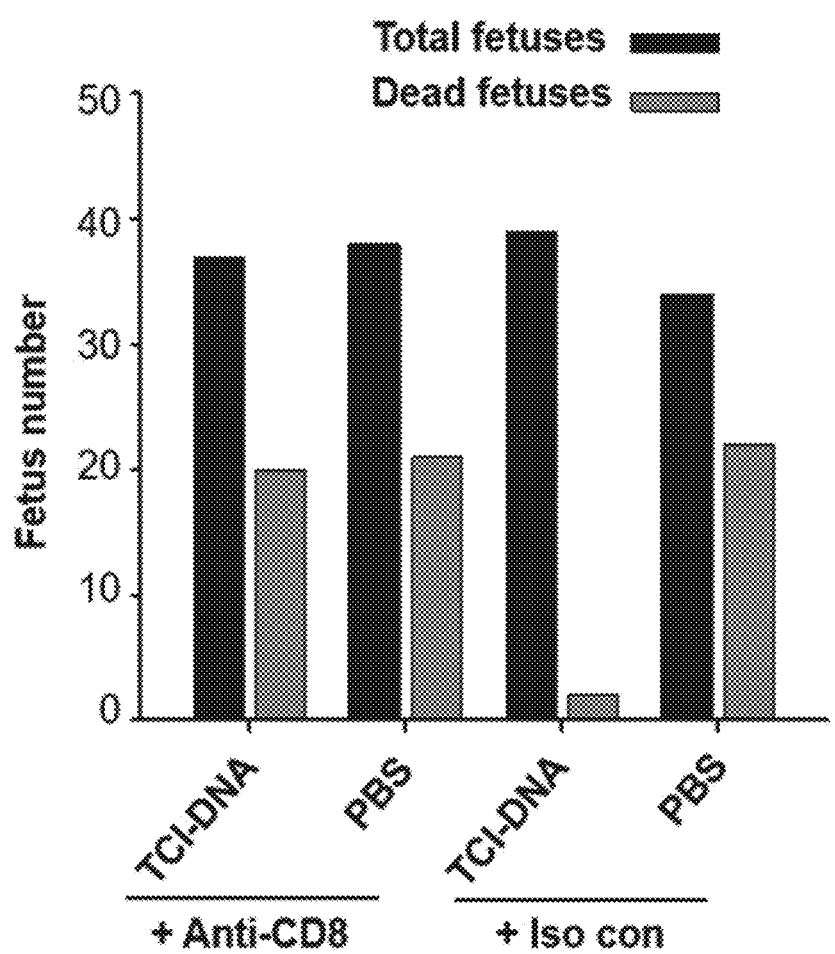
Figure 13A:
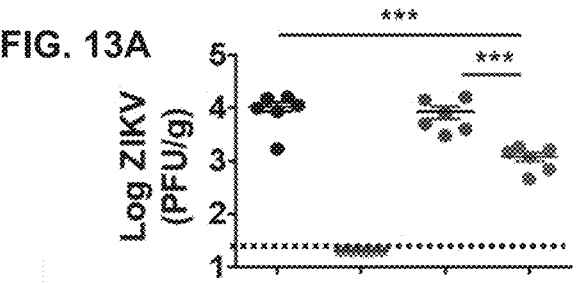
FIG. 13A-E depict viral titers in placenta (FIG. 13A), amniotic fluid (FIG. 13B), and fetal brain (FIG. 13C). Viral titers were determined in sera collected at three (FIG. 13D) and six (FIG. 12E) days post-challenge in the mice of FIG. 12. The detection limit was 20 PFU/g (for placenta), 40 PFU/g (for fetal brain), and 50 PFU/ml (for sera and amniotic fluid). The data are represented as mean±s.e.m (n=6). *,  and * indicate P<0.05, P<0.01, and P<0.001, respectively.
Figure 13D:
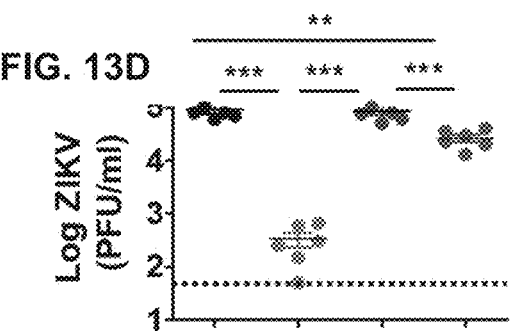
Figure 13B:
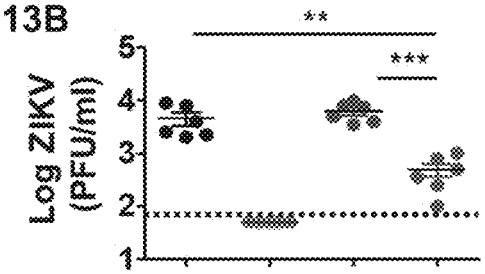
Figure 13E:
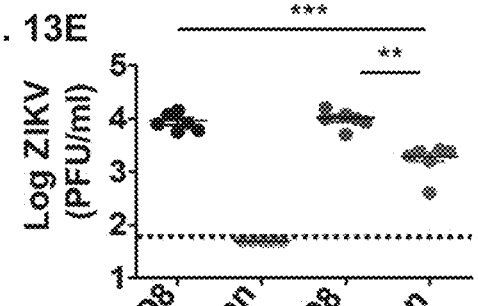
Figure 13C:
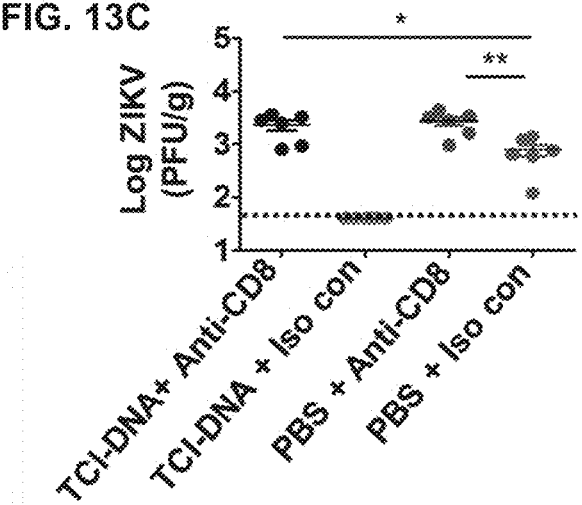

Second, CD8$^+$ T cells were evaluated by flow cytometry analysis in the whole blood of mice 6 h before and 3 days after ZIKV challenge. There were minimal numbers of CD8$^+$ T cells in the peripheral blood cells of anti-CD8a-treated TCI-DNA or PBS-immunized mice as compared to those of mice treated with isotype antibody control (not shown), confirming complete depletion of CD8$^+$ T cells in these mice when they were challenged with ZIKV. In the mice immunized with TCI DNA vaccine, significantly damaged uteri and severe fetal demise were found in the mice with CD8$^+$ T cells depleted, whereas intact uteri and fetuses without any damage were found in the mice injected with isotype control antibody (no CD8$^+$ T cell depletion) (FIG. 12A). The mice receiving PBS and injected with anti-CD8a or isotype control antibody exhibited different degrees of uterine damage and/or fetal death (FIG. 12A-B). In addition, CD8+ T cell depletion leads to significantly increased ZIKV titers in the placenta, amniotic fluid, and fetal brain (FIG. 13A-C), as well as in day-3 or day-6 post-infection (p.i.) sera (FIG. 13D-E) in the TCI-DNA-immunized pregnant mice and their fetuses. These data showed enhanced infection of TCI-DNA-vaccinated pregnant mice to ZIKV after their CD8+ T cells were depleted.

Figure 14A:
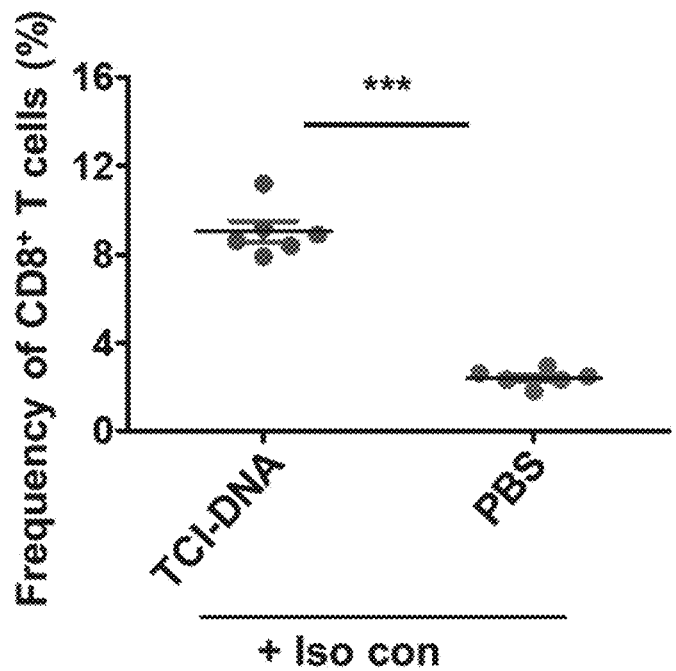
FIG. 14A-B depicts ZIKV-specific CD8$^+$ T cell responses in the mice of FIG. 12. Six days post-challenge, splenocytes were isolated from the mice injected with isotype control antibody (i.e., Iso con), and analyzed for ZIKV-specific CD8$^+$ T cell responses by flow cytometry analysis. The frequencies of CD8$^+$ T cells (FIG. 14A), as well as IL2$^+$, IFN-γ$^+$ and TNF-α secretion were quantitated in CD8$^+$ T cells (FIG. 14B). The data are represented as mean±s.e.m (n=6). *,  and * indicate P<0.05, P<0.01, and P<0.001, respectively.
Figure 14B:
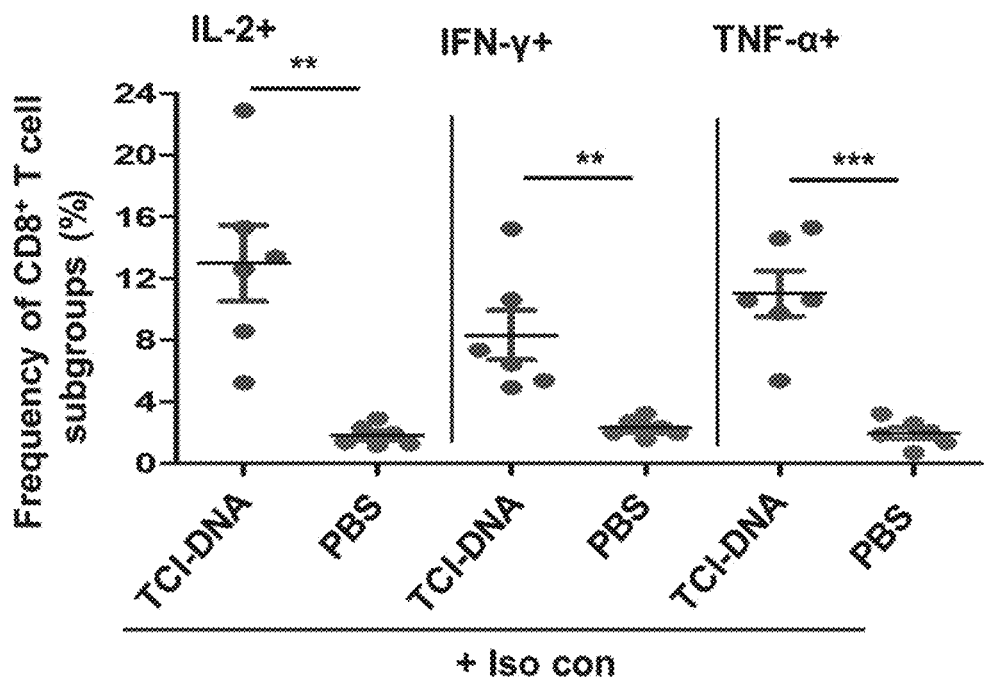

ZIKV-specific CD8+ T cell responses were also evaluated using flow cytometry analysis in the TCI-DNA-immunized and ZIKV-challenged mice without CD8+ T cell depletion (i.e., mice receiving isotype antibody). Splenocytes were isolated from these mice 6 days post-challenge, and stimulated with ZIKV NS3 overlapping peptides (Table 3). Remarkably, the TCI-DNA vaccine elicited ZIKV-specific CD8+ T cell responses in the mice (FIG. 14A), exhibiting high-level secretion of IL-2, IFN-γ and TNF-α cytokines. However, splenocytes from mice immunized with the PBS control only induced background levels of these cytokines (FIG. 14B).

Collectively, the above data demonstrate that the ZIKV TCI-DNA vaccine-induced CD8+ T cell responses play an essential role in protecting pregnant mice and their fetuses against ZIKV-associated fetal death and viral infection.

Example 6. The ZIKV TCI-DNA Vaccine Cross-Protected Against Dengue Virus (DENV) Infection Methods Challenge of vaccine-immunized Ifnar1$^{-/-}$ mice with DENV. Ifnar1$^{-/-}$ mice (male and female) were immunized with the ZIKV TCI-DNA vaccine, control vaccines (ZIKV full-length E protein and EDI/EDII mixed peptides), or PBS control, and boosted once at 3 weeks (as described in Example 3). At 13 days post-last dose of immunization, Ifnar1$^{-/-}$ mice were challenged (I.P.) with ZIKV (human strain R103451; $10^3$ PFU; 200 μl/mouse), and investigated for survival and weight daily for 14 days. The surviving mice in each group were further challenged (I.P.) with DENV-2 (human strain V594, $2 \times 10^6$ PFU; 200 μl/mouse). Three days p.i., sera and tissues were collected for detection of viral titers by plaque-forming assay (as described below). Naïve Ifnar1$^{-/-}$ mice were included as a mock control in the DENV-2 challenge studies.

DENV plaque-forming assay. Viral titers in the above DENV-2 (strain V594)-challenged Ifnar1$^{-/-}$ mice were measured by DENV plaque-forming assay. This assay was similar to ZIKV plaque-forming assay (see Example 2), except that LLC-MK2 cells were used for DENV-2 infection. DENV titers were calculated using the CalcuSyn computer program, and expressed as PFU/g or PFU/ml of test samples.

Results

Figure 15:
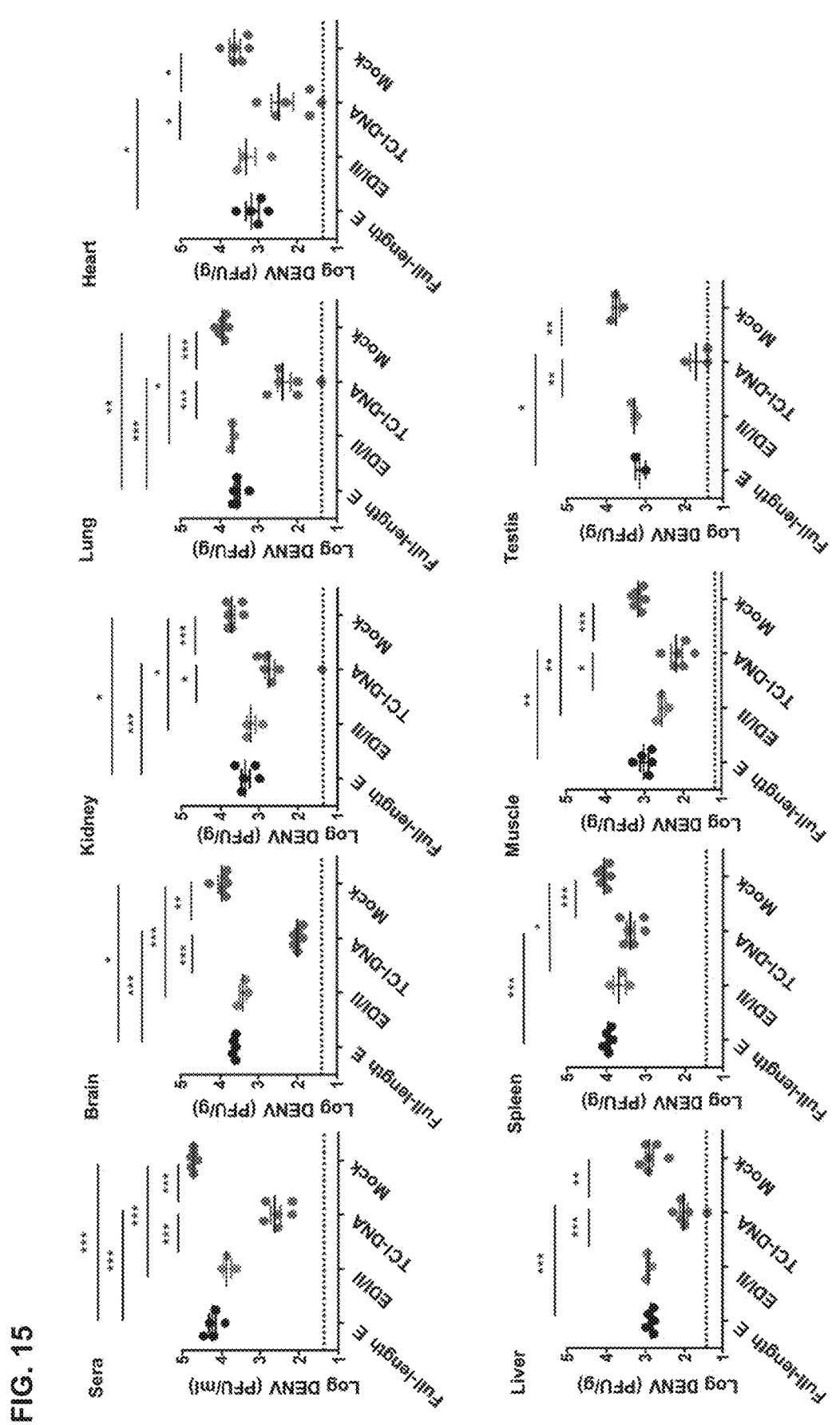
FIG. 15 depicts that the ZIKV TCI-DNA vaccine cross-protected adult male and female Ifnar1$^{-/-}$ mice against DENV challenge with reduced viral titers. Male and female Ifnar1$^{-/-}$ mice were immunized with ZIKV TCI-DNA vaccine, control vaccines (ZIKV full-length E protein and EDI/II mixed peptides), or PBS control, challenged with ZIKV at 13 days post-2$^{nd}$ immunization, and survival was measured for 14 days, as described in FIG. 4B. The mice that survived the ZIKV challenge were infected with DENV-2 (strain V594 (2006/Puerto Rico) (SEQ ID NO:5), 2×10$^6$ PFU/mouse); and 3 days later, they were euthanized, and sera and tissues were collected to measure DENV titers by plaque-forming assay. The mock control represents mice infected with DENV only. The detection limit was 12.5 PFU/g (for muscle), 25 PFU/ml (for sera), or 25 PFU/g (for brain, kidney, lung, heart, liver, spleen and testis). The data are represented as mean±s.e.m (n=3 mice/group for testis, and n=3-6 mice/group for sera and other tissues). *, , and * indicate P<0.05, P<0.01, and P<0.001, respectively.

ZIKV TCI-DNA Vaccine Cross-Protected Against DENV Infection, Leading to Significantly Reduced Viral Titers ZIKV and DENV belong to the same genus, and their NS3 regions contain high levels of homology. To explore the potential of the ZIKV TCI-DNA vaccine to induce cross-protection against DENV infection, male and female Ifnar1$^{-/-}$ mice, which were immunized with TCI-DNA or control vaccines (i.e., full-length E or EDI/EDII mixed peptides) and survived ZIKV challenge (as described above), were further challenged with DENV-2 (strain V594, $2 \times 10^6$ PFU), and DENV titers were measured in the sera and tissues of mice 3 days post-challenge. There were lower, or significantly lower, titers of DENV in the TCI-DNA-immunized mouse sera and other tissues tested, including testis, than in those of the mice receiving full-length E, EDI/II peptides, or mock controls. DENV titers in the full-length E protein or EDI/II peptide-immunized mouse sera and several (but not all) tissues tested, such as brain, kidney, lung, spleen, and/or muscle, were only slightly reduced as compared with those of the mock control (FIG. 15).

These data confirm the efficacy of the ZIKV TCI-DNA vaccine in cross-protecting mice against DENV infection, with significantly reduced DENV titers, particularly in the reproductive organ, testis.

Unless otherwise indicated, all numbers expressing quantities of ingredients, properties such as molecular weight, reaction conditions, and so forth used in the specification and claims are to be understood as being modified in all instances by the term "about." As used herein the terms "about" and "approximately" means within 10 to 15%, preferably within 5 to 10%. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. An immunogenic composition comprising an expression vector and a nucleotide sequence disposed therein, wherein the nucleotide sequence comprises:
   a Zika virus NS3 nucleotide sequence encoding a Zika virus NS3 protein, wherein the Zika virus NS3 nucleotide sequence is reorganized and comprises the nucleotide sequence of SEQ ID NO:3; and
   a ubiquitin nucleotide sequence upstream of the Zika virus NS3 protein sequence.

2. The immunogenic composition of claim 1, wherein the nucleotide sequence disposed in the expression vector is SEQ ID NO:5.

3. An immunogenic composition comprising an expression vector and a nucleotide sequence disposed therein, wherein the nucleotide sequence comprises a Zika virus NS3 nucleotide sequence encoding a Zika virus NS3 protein, wherein the Zika virus NS3 nucleotide sequence is reorganized and comprises the nucleotide sequence of SEQ ID NO: 3.

4. A method for inducing an immune response to a Zika virus infection in a subject in need thereof, the method comprising administering to the subject a therapeutically effective amount of the immunogenic composition of claim 1.

5. The method of claim 4, further comprising co-administering the immunogenic composition with an adjuvant.

6. The method of claim 4, wherein administering the immunogenic composition increases production of Zika virus-specific cytotoxic T lymphocytes in the subject.

7. The method of claim 4, wherein the subject is a woman who is pregnant, who may become pregnant, or who plans to become pregnant.

8. The method of claim 7, wherein the woman does not produce neutralizing antibodies after infection with Zika virus.

9. The method of claim 7, wherein the woman exhibits decreased viral titers after infection with Zika virus compared to a woman not immunized with the immunogenic composition.

10. The method of claim 7, wherein administering the immunogenic composition increases production of Zika virus-specific CD8$^+$ T lymphocytes in the woman.

11. The method of claim 7, wherein a pregnancy in the woman does not result in Zika virus-associated birth defects.

12. The method of claim 7, wherein a cytotoxic T lymphocyte (CTL) response against Zika virus is induced.

13. The method of claim 12, wherein the CTL response provides protection against Zika virus infection.

* * * * *

SEQUENCE LISTING

```
<160> NUMBER OF SEQ ID NOS: 23

<210> SEQ ID NO 1
<211> LENGTH: 1851
<212> TYPE: DNA
<213> ORGANISM: Zika virus

<400> SEQUENCE: 1
agtggtgctc tatgggatgt gcctgctccc aaggaagtaa aaaaggggga gaccacagat      60
ggagtgtaca gagtaatgac tcgtagactg ctaggttcaa cacaagttgg agtgggagtt     120
atgcaagagg gggtctttca cactatgtgg cacgtcacaa aaggatccgc gctgagaagc     180
ggtgaaggga gacttgatcc atactgggga gatgtcaagc aggatctggt gtcatactgt     240
ggtccatgga agctagatgc cgcctgggat gggcacagcg aggtgcagct cttggccgtg     300 cccccccggag agagagcgag gaacatccag actctgcccg gaatatttaa gacaaaggat     360
ggggacattg gagcggttgc gctggattac ccagcaggaa cttcaggatc tccaatccta     420
gacaagtgtg ggagagtgat aggactttat ggcaatgggg tcgtgatcaa aaacgggagt     480
tatgttagtg ccatcaccca agggaggagg gaggaagaga ctcctgttga gtgcttcgag     540
ccctcgatgc tgaagaagaa gcagctaact gtcttagact tgcatcctgg agctgggaaa     600
accaggagag ttcttcctga aatagtccgt gaagccataa aaacaagact ccgtactgtg     660
atcttagctc aaccagggt tgtcgctgct gaaatggagg aggcccttag agggcttcca     720
gtgcgttata tgcaacagc agtcaatgtc acccactctg gaacagaaat cgtcgactta     780
atgtgccatg ccaccttcac ttcacgtcta ctacagccaa tcagagtccc caactataat     840
ctgtatatta tggatgaggc ccacttcaca gatccctcaa gtatagcagc aagaggatac     900
atttcaacaa gggttgagat gggcgaggcg gctgccatct tcatgaccgc cacgccacca     960
ggaacccgtg acgcattcc ggactccaac tcaccaatta tggacaccga agtggaagtc    1020
ccagagagag cctggagctc aggctttgat tgggtgacga tcattctgg aaaaacagtt    1080 tggtttgttc aagcgtgag gaacggcaat gagatcgcag cttgtctgac aaaggctgga    1140
aaacgggtca tacagctcag cagaaagact tttgagacag agttccagaa aacaaaacat    1200
caagagtggg actttgtcgt gacaactgac atttcagaga tgggcgccaa ctttaaagct    1260
gaccgtgtca tagattccag gagatgccta aagccggtca tacttgatgg cgagagagtc    1320
attctggctg gaccatgcc tgtcacacat gccagcgctg cccagaggag ggggcgcata    1380
```

-continued

```
ggcaggaatc ccaacaaacc tggagatgag tatctgtatg gaggtgggtg cgcagagact    1440
gacgaagacc atgcacactg gcttgaagca agaatgctcc ttgacaatat ttacctccaa    1500
gatggcctca tagcctcgct ctatcgacct gaggccgaca agtagcagc cattgaggga     1560 gagttcaagc ttaggacgga gcaaaggaag acctttgtgg aactcatgaa agaggagat    1620 cttcctgttt ggctggccta tcaggttgca tctgccggaa taacctacac agatagaaga   1680
tggtgctttg atggcacgac caacaacacc ataatgaag acagtgtgcc ggcagaggtg    1740
tggaccagac acggagagaa aagagtgctc aaaccgaggt ggatggacgc cagagtttgt   1800
tcagatcatg cggccctgaa gtcattcaag gagtttgccg ctgggaaaag a            1851
```

<210> SEQ ID NO 2
<211> LENGTH: 592
<212> TYPE: PRT
<213> ORGANISM: Zika virus

<400> SEQUENCE: 2

```
Met Thr Arg Arg Leu Leu Gly Ser Thr Gln Val Gly Val Gly Val Met
1               5                   10                  15

Gln Glu Gly Val Phe His Thr Met Trp His Val Thr Lys Gly Ser Ala
            20                  25                  30

Leu Arg Ser Gly Glu Gly Arg Leu Asp Pro Tyr Trp Gly Asp Val Lys
        35                  40                  45

Gln Asp Leu Val Ser Tyr Cys Gly Pro Trp Lys Leu Asp Ala Ala Trp
    50                  55                  60

Asp Gly His Ser Glu Val Gln Leu Leu Ala Val Pro Pro Gly Glu Arg
65                  70                  75                  80

Ala Arg Asn Ile Gln Thr Leu Pro Gly Ile Phe Lys Thr Lys Asp Gly
                85                  90                  95

Asp Ile Gly Ala Val Ala Leu Asp Tyr Pro Ala Gly Thr Ser Gly Ser
            100                 105                 110

Pro Ile Leu Asp Lys Cys Gly Arg Val Ile Gly Leu Tyr Gly Asn Gly
        115                 120                 125

Val Val Ile Lys Asn Gly Ser Tyr Val Ser Ala Ile Thr Gln Gly Arg
    130                 135                 140

Arg Glu Glu Glu Thr Pro Val Glu Cys Phe Glu Pro Ser Met Leu Lys
145                 150                 155                 160

Lys Lys Gln Leu Thr Val Leu Asp Leu His Pro Gly Ala Gly Lys Thr
                165                 170                 175

Arg Arg Val Leu Pro Glu Ile Val Arg Glu Ala Ile Lys Thr Arg Leu
            180                 185                 190

Arg Thr Val Ile Leu Ala Pro Thr Arg Val Val Ala Ala Glu Met Glu
        195                 200                 205

Glu Ala Leu Arg Gly Leu Pro Val Arg Tyr Met Thr Thr Ala Val Asn
    210                 215                 220

Val Thr His Ser Gly Thr Glu Ile Val Asp Leu Met Cys His Ala Thr
225                 230                 235                 240

Phe Thr Ser Arg Leu Leu Gln Pro Ile Arg Val Pro Asn Tyr Asn Leu
                245                 250                 255

Tyr Ile Met Asp Glu Ala His Phe Thr Asp Pro Ser Ser Ile Ala Ala
            260                 265                 270

Arg Gly Tyr Ile Ser Thr Arg Val Glu Met Gly Glu Ala Ala Ala Ile
        275                 280                 285

Phe Met Thr Ala Thr Pro Pro Gly Thr Arg Asp Ala Phe Pro Asp Ser
```

|     |     |     |     |     | 290 |     |     |     |     | 295 |     |     |     |     | 300 |

Asn Ser Pro Ile Met Asp Thr Glu Val Glu Val Pro Glu Arg Ala Trp
305                 310                 315                 320

Ser Ser Gly Phe Asp Trp Val Thr Asp His Ser Gly Lys Thr Val Trp
                325                 330                 335

Phe Val Pro Ser Val Arg Asn Gly Asn Glu Ile Ala Ala Cys Leu Thr
            340                 345                 350

Lys Ala Gly Lys Arg Val Ile Gln Leu Ser Arg Lys Thr Phe Glu Thr
        355                 360                 365

Glu Phe Gln Lys Thr Lys His Gln Glu Trp Asp Phe Val Val Thr Thr
370                 375                 380

Asp Ile Ser Glu Met Gly Ala Asn Phe Lys Ala Asp Arg Val Ile Asp
385                 390                 395                 400

Ser Arg Arg Cys Leu Lys Pro Val Ile Leu Asp Gly Glu Arg Val Ile
                405                 410                 415

Leu Ala Gly Pro Met Pro Val Thr His Ala Ser Ala Ala Gln Arg Arg
            420                 425                 430

Gly Arg Ile Gly Arg Asn Pro Asn Lys Pro Gly Asp Glu Tyr Leu Tyr
        435                 440                 445

Gly Gly Gly Cys Ala Glu Thr Asp Glu Asp His Ala His Trp Leu Glu
    450                 455                 460

Ala Arg Met Leu Leu Asp Asn Ile Tyr Leu Gln Asp Gly Leu Ile Ala
465                 470                 475                 480

Ser Leu Tyr Arg Pro Glu Ala Asp Lys Val Ala Ala Ile Glu Gly Glu
                485                 490                 495

Phe Lys Leu Arg Thr Glu Gln Arg Lys Thr Phe Val Glu Leu Met Lys
            500                 505                 510

Arg Gly Asp Leu Pro Val Trp Leu Ala Tyr Gln Val Ala Ser Ala Gly
        515                 520                 525

Ile Thr Tyr Thr Asp Arg Arg Trp Cys Phe Asp Gly Thr Thr Asn Asn
530                 535                 540

Thr Ile Met Glu Asp Ser Val Pro Ala Glu Val Trp Thr Arg His Gly
545                 550                 555                 560

Glu Lys Arg Val Leu Lys Pro Arg Trp Met Asp Ala Arg Val Cys Ser
                565                 570                 575

Asp His Ala Ala Leu Lys Ser Phe Lys Glu Phe Ala Ala Gly Lys Arg
            580                 585                 590

<210> SEQ ID NO 3
<211> LENGTH: 1911
<212> TYPE: DNA
<213> ORGANISM: Artificial Sequence
<220> FEATURE:
<223> OTHER INFORMATION: Rearranged NS3 ZIKV (PRVABC59/2015 strain) DNA
      sequence

<400> SEQUENCE: 3
caagagtggg actttgtcgt gacaactgac atttcagaga tgggcgccaa ctttaaagct    60
gaccgtgtca tagattccag gagatgccta aagccggtca tacttgatgg cgagagagtc   120
attctggctg acccatgcc tgtcacacat gccagcgctg cccagaggag ggggcgcata    180
ggcaggaatc ccaacaaacc tggagatgag tatctgtatg gaggtgggtg cgcagagact   240
gacgaagacc atgcacactg gcttgaagca agaatgctcc ttgacaatat ttacctccaa   300
gatggcctca tagcctcgct ctatcgacct gaggccgaca agtagcagc cattgaggga    360

```
gagttcaagc ttaggacgga gcaaaggaag acctttgtgg aactcatgaa agaggagat       420 cttcctgttt ggctggccta tcaggttgca tctgccggaa taacctacac agatagaaga      480
tggtgctttg atggcacgac caacaacacc ataatggaag acagtgtgcc ggcagaggtg      540
tggaccagac acggagagaa aagagtgctc aaaccgaggt ggatggacgc cagagtttgt      600
tcagatcatg cggccctgaa gtcattcaag gagtttgccg ctgggaaaag acctggagct      660
gggaaaacca ggagagttct tcctgaaata gtccgtgaag ccataaaaac aagactccgt      720
actgtgatct tagctccaac cagggttgtc gctgctgaaa tggaggaggc ccttagaggg      780
cttccagtgc gttatatgac aacagcagtc aatgtcaccc actctggaac agaaatcgtc      840
gacttaatgt gccatgccac cttcacttca cgtctactac agccaatcag agtccccaac      900
tataatctgt atattatgga tgaggcccac ttcacagatc cctcaagtat agcagcaaga      960
ggatacattt caacaagggt tgagatgggc gaggcggctg ccatcttcat gaccgccacg     1020
ccaccaggaa cccgtgacgc atttccggac tccaactcac caattatgga caccgaagtg     1080
gaagtcccag agagagcctg gagctcaggc tttgattggg tgacggatca ttctggaaaa     1140
acagtttggt ttgttccaag cgtgaggaac ggcaatgaga tcgcagcttg tctgacaaag     1200
gctggaaaac gggtcataca gctcagcaga aagacttttg acagagtt ccagaaaaca      1260 aaacatcaag agtgggactt tgtcgtgaca actgacagtg gtgctctatg ggatgtgcct     1320
gctcccaagg aagtaaaaaa gggggagacc acagatgagt gtacagagt aatgactcgt     1380 agactgctag gttcaacaca agttggagtg ggagttatgc aagaggggt ctttcacact     1440 atgtggcacg tcacaaaagg atccgcgctg agaagcggtg aagggagact tgatccatac     1500
tggggagatg tcaagcagga tctggtgtca tactgtggtc catggaagct agatgccgcc     1560
tgggatgggc acagcgaggt gcagctcttg gccgtgcccc ccggagagag agcgaggaac     1620
atccagactc tgcccggaat atttaagaca aaggatgggg acattggagc ggttgcgctg     1680
gattacccag caggaactcc aggatctcca atcctagaca gtgtgggag agtgataggc      1740 ctttatggca atggggtcgt gatcaaaaac gggagttatg ttagtgccat cacccaaggg     1800
aggagggagg aagagactcc tgttgagtgc ttcgagccct cgatgctgaa gaagaagcag     1860
ctaactgtct tagacttgca tcctggagct gggaaaacca ggagagttct t              1911

<210> SEQ ID NO 4
<211> LENGTH: 228
<212> TYPE: DNA
<213> ORGANISM: Mus musculus

<400> SEQUENCE: 4
atgcagatct tcgtgaagac tctgactggt aagaccatca ccctcgaggt tgagcccagt        60
gacaccatcg agaatgtcaa ggcaaagatc caagataagg aaggcatccc tcctgaccag      120
cagaggctga tctttgctgg aaaacagctg gaagatgggc gcaccctgtc tgactacaac      180
atccagaaag agtccaccct gcacctggtg ctccgtctca gaggtggg                  228

<210> SEQ ID NO 5
<211> LENGTH: 2181
<212> TYPE: DNA
<213> ORGANISM: Artificial Sequence
<220> FEATURE:
<223> OTHER INFORMATION: Rearranged ubiquitin (Ub)/NS3 ZIKV
      (PRVABC59/2015 strain) DNA sequence

<400> SEQUENCE: 5
```

-continued

| | |
|---|---|
| ctagaattcg ttcttgccac catgcagatc ttcgtgaaga ctctgactgg taagaccatc | 60 |
| accctcgagg ttgagcccag tgacaccatc gagaatgtca aggcaaagat ccaagataag | 120 |
| gaaggcatcc ctcctgacca gcagaggctg atctttgctg aaaacagct ggaagatggg | 180 |
| cgcaccctgt ctgactacaa catccagaaa gagtccaccc tgcacctggt gctccgtctc | 240 |
| agaggtgccc aagagtggga cttttgtcgtg acaactgaca tttcagagat gggcgccaac | 300 |
| tttaaagctg accgtgtcat agattccagg agatgcctaa agccggtcat acttgatggc | 360 |
| gagagagtca ttctggctgg acccatgcct gtcacacatg ccagcgctgc cagaggagg | 420 |
| gggcgcatag gcaggaatcc caacaaacct ggagatgagt atctgtatgg aggtgggtgc | 480 |
| gcagagactg acgaagacca tgcacactgg cttgaagcaa gaatgctcct tgacaatatt | 540 |
| tacctccaag atggcctcat agcctcgctc tatcgacctg aggccgacaa agtagcagcc | 600 |
| attgagggag agttcaagct taggacggag caaaggaaga cctttgtgga actcatgaaa | 660 |
| agaggagatc ttcctgtttg gctggcctat caggttgcat ctgccggaat aacctacaca | 720 |
| gatagaagat ggtgctttga tggcacgacc aacaacacca taatgaaga cagtgtgccg | 780 |
| gcagaggtgt ggaccagaca cggagagaaa agagtgctca aaccgaggtg gatggacgcc | 840 |
| agagtttgtt cagatcatgc ggccctgaag tcattcaagg agtttgccgc tgggaaaaga | 900 |
| cctggagctg gaaaaccag gagagttctt cctgaaatag tccgtgaagc cataaaaaca | 960 |
| agactccgta ctgtgatctt agctccaacc agggttgtcg ctgctgaaat ggaggaggcc | 1020 |
| cttagagggc ttccagtgcg ttatatgaca acagcagtca atgtcaccca ctctggaaca | 1080 |
| gaaatcgtcg acttaatgtg ccatgccacc ttcacttcac gtctactaca gccaatcaga | 1140 |
| gtccccaact ataatctgta tattatggat gaggcccact tcacagatcc ctcaagtata | 1200 |
| gcagcaagag gatacatttc aacaagggtt gagatgggcg aggcggctgc catcttcatg | 1260 |
| accgccacgc caccaggaac ccgtgacgca tttccggact ccaactcacc aattatggac | 1320 |
| accgaagtgg aagtcccaga gagagcctgg agctcaggct tgattgggt gacggatcat | 1380 |
| tctggaaaaa cagtttggtt tgttccaagc gtgaggaacg gcaatgagat cgcagcttgt | 1440 |
| ctgacaaagg ctggaaaacg ggtcatacag ctcagcagaa agactttga gacagagttc | 1500 |
| cagaaaacaa acatcaaga gtgggacttt gtcgtgacaa ctgacagtgg tgctctatgg | 1560 |
| gatgtgcctg ctcccaagga agtaaaaaag ggggagacca cagatggagt gtacagagta | 1620 |
| atgactcgta gactgctagg ttcaacacaa gttggagtgg gagttatgca agaggggtc | 1680 |
| tttcacacta tgtggcacgt cacaaaagga tccgcgctga aagcggtga agggagactt | 1740 |
| gatccatact ggggagatgt caagcaggat ctggtgtcat actgtggtcc atggaagcta | 1800 |
| gatgccgcct gggatgggca cagcgaggtg cagctcttgg ccgtgcccc cggagagaga | 1860 |
| gcgaggaaca tccagactct gcccggaata tttaagacaa aggatgggga cattggagcg | 1920 |
| gttgcgctgg attacccagc aggaacttca ggatctccaa tcctagacaa gtgtgggaga | 1980 |
| gtgataggac tttatggcaa tggggtcgtg atcaaaaacg ggagttatgt tagtgccatc | 2040 |
| acccaaggga ggagggagga agagactcct gttgagtgct cgagccctc gatgctgaag | 2100 |
| aagaagcagc taactgtctt agacttgcat cctggagctg ggaaaaccag gagagttctt | 2160 |
| taggttcttg cggccgccct a | 2181 |

<210> SEQ ID NO 6
<211> LENGTH: 713
<212> TYPE: PRT
<213> ORGANISM: Artificial Sequence
<220> FEATURE:
<223> OTHER INFORMATION: Rearranged Ub/NS3 ZIKV (PRVABC59/2015 strain)
amino acid sequence

<400> SEQUENCE: 6

Met Gln Ile Phe Val Lys Thr Leu Thr Gly Lys Thr Ile Thr Leu Glu
1 5 10 15

Val Glu Pro Ser Asp Thr Ile Glu Asn Val Lys Ala Lys Ile Gln Asp
20 25 30

Lys Glu Gly Ile Pro Pro Asp Gln Gln Arg Leu Ile Phe Ala Gly Lys
35 40 45

Gln Leu Glu Asp Gly Arg Thr Leu Ser Asp Tyr Asn Ile Gln Lys Glu
50 55 60

Ser Thr Leu His Leu Val Leu Arg Leu Arg Gly Ala Gln Glu Trp Asp
65 70 75 80

Phe Val Val Thr Thr Asp Ile Ser Glu Met Gly Ala Asn Phe Lys Ala
85 90 95

Asp Arg Val Ile Asp Ser Arg Arg Cys Leu Lys Pro Val Ile Leu Asp
100 105 110

Gly Glu Arg Val Ile Leu Ala Gly Pro Met Pro Val Thr His Ala Ser
115 120 125

Ala Ala Gln Arg Arg Gly Arg Ile Gly Arg Asn Pro Asn Lys Pro Gly
130 135 140

Asp Glu Tyr Leu Tyr Gly Gly Gly Cys Ala Glu Thr Asp Glu Asp His
145 150 155 160

Ala His Trp Leu Glu Ala Arg Met Leu Leu Asp Asn Ile Tyr Leu Gln
165 170 175

Asp Gly Leu Ile Ala Ser Leu Tyr Arg Pro Glu Ala Asp Lys Val Ala
180 185 190

Ala Ile Glu Gly Glu Phe Lys Leu Arg Thr Glu Gln Arg Lys Thr Phe
195 200 205

Val Glu Leu Met Lys Arg Gly Asp Leu Pro Val Trp Leu Ala Tyr Gln
210 215 220

Val Ala Ser Ala Gly Ile Thr Tyr Thr Asp Arg Arg Trp Cys Phe Asp
225 230 235 240

Gly Thr Thr Asn Asn Thr Ile Met Glu Asp Ser Val Pro Ala Glu Val
245 250 255

Trp Thr Arg His Gly Glu Lys Arg Val Leu Lys Pro Arg Trp Met Asp
260 265 270

Ala Arg Val Cys Ser Asp His Ala Ala Leu Lys Ser Phe Lys Glu Phe
275 280 285

Ala Ala Gly Lys Arg Pro Gly Ala Gly Lys Thr Arg Arg Val Leu Pro
290 295 300

Glu Ile Val Arg Glu Ala Ile Lys Thr Arg Leu Arg Thr Val Ile Leu
305 310 315 320

Ala Pro Thr Arg Val Val Ala Ala Glu Met Glu Glu Ala Leu Arg Gly
325 330 335

Leu Pro Val Arg Tyr Met Thr Thr Ala Val Asn Val Thr His Ser Gly
340 345 350

Thr Glu Ile Val Asp Leu Met Cys His Ala Thr Phe Thr Ser Arg Leu
355 360 365

Leu Gln Pro Ile Arg Val Pro Asn Tyr Asn Leu Tyr Ile Met Asp Glu
370 375 380

Ala His Phe Thr Asp Pro Ser Ser Ile Ala Ala Arg Gly Tyr Ile Ser

```
                385                 390                 395                 400
        Thr Arg Val Glu Met Gly Glu Ala Ala Ala Ile Phe Met Thr Ala Thr
                        405                 410                 415

Pro Pro Gly Thr Arg Asp Ala Phe Pro Asp Ser Asn Ser Pro Ile Met
                        420                 425                 430

Asp Thr Glu Val Glu Val Pro Glu Arg Ala Trp Ser Ser Gly Phe Asp
                        435                 440                 445

Trp Val Thr Asp His Ser Gly Lys Thr Val Trp Phe Val Pro Ser Val
                450                 455                 460

Arg Asn Gly Asn Glu Ile Ala Ala Cys Leu Thr Lys Ala Gly Lys Arg
        465                 470                 475                 480

Val Ile Gln Leu Ser Arg Lys Thr Phe Glu Thr Glu Phe Gln Lys Thr
                        485                 490                 495

Lys His Gln Glu Trp Asp Phe Val Val Thr Thr Asp Ser Gly Ala Leu
                        500                 505                 510

Trp Asp Val Pro Ala Pro Lys Glu Val Lys Lys Gly Glu Thr Thr Asp
                        515                 520                 525

Gly Val Tyr Arg Val Met Thr Arg Arg Leu Leu Gly Ser Thr Gln Val
                530                 535                 540

Gly Val Gly Val Met Gln Glu Gly Val Phe His Thr Met Trp His Val
        545                 550                 555                 560

Thr Lys Gly Ser Ala Leu Arg Ser Gly Glu Gly Arg Leu Asp Pro Tyr
                        565                 570                 575

Trp Gly Asp Val Lys Gln Asp Leu Val Ser Tyr Cys Gly Pro Trp Lys
                        580                 585                 590

Leu Asp Ala Ala Trp Asp Gly His Ser Glu Val Gln Leu Leu Ala Val
                595                 600                 605

Pro Pro Gly Glu Arg Ala Arg Asn Ile Gln Thr Leu Pro Gly Ile Phe
        610                 615                 620

Lys Thr Lys Asp Gly Asp Ile Gly Ala Val Ala Leu Asp Tyr Pro Ala
        625                 630                 635                 640

Gly Thr Ser Gly Ser Pro Ile Leu Asp Lys Cys Gly Arg Val Ile Gly
                        645                 650                 655

Leu Tyr Gly Asn Gly Val Val Ile Lys Asn Gly Ser Tyr Val Ser Ala
                        660                 665                 670

Ile Thr Gln Gly Arg Arg Glu Glu Glu Thr Pro Val Glu Cys Phe Glu
                        675                 680                 685

Pro Ser Met Leu Lys Lys Lys Gln Leu Thr Val Leu Asp Leu His Pro
                690                 695                 700

Gly Ala Gly Lys Thr Arg Arg Val Leu
        705                 710

<210> SEQ ID NO 7
<211> LENGTH: 624
<212> TYPE: PRT
<213> ORGANISM: Artificial Sequence
<220> FEATURE:
<223> OTHER INFORMATION: Rearranged NS3 ZIKV (PRVABC59/2015 strain)
    amino acid sequence

<400> SEQUENCE: 7

Met Gly Ala Asn Phe Lys Ala Asp Arg Val Ile Asp Ser Arg Arg Cys
1               5                   10                  15

Leu Lys Pro Val Ile Leu Asp Gly Glu Arg Val Ile Leu Ala Gly Pro
            20                  25                  30
```

-continued

```
Met Pro Val Thr His Ala Ser Ala Gln Arg Arg Gly Arg Ile Gly
             35                  40                  45
Arg Asn Pro Asn Lys Pro Gly Asp Glu Tyr Leu Tyr Gly Gly Cys
 50                  55                  60
Ala Glu Thr Asp Glu Asp His Ala His Trp Leu Glu Ala Arg Met Leu
 65                  70                  75                  80
Leu Asp Asn Ile Tyr Leu Gln Asp Gly Leu Ile Ala Ser Leu Tyr Arg
                     85                  90                  95
Pro Glu Ala Asp Lys Val Ala Ala Ile Glu Gly Glu Phe Lys Leu Arg
                 100                 105                 110
Thr Glu Gln Arg Lys Thr Phe Val Glu Leu Met Lys Arg Gly Asp Leu
                 115                 120                 125
Pro Val Trp Leu Ala Tyr Gln Val Ala Ser Ala Gly Ile Thr Tyr Thr
             130                 135                 140
Asp Arg Arg Trp Cys Phe Asp Gly Thr Thr Asn Asn Thr Ile Met Glu
145                 150                 155                 160
Asp Ser Val Pro Ala Glu Val Trp Thr Arg His Gly Glu Lys Arg Val
                 165                 170                 175
Leu Lys Pro Arg Trp Met Asp Ala Arg Val Cys Ser Asp His Ala Ala
                 180                 185                 190
Leu Lys Ser Phe Lys Glu Phe Ala Ala Gly Lys Arg Pro Gly Ala Gly
             195                 200                 205
Lys Thr Arg Arg Val Leu Pro Glu Ile Val Arg Glu Ala Ile Lys Thr
             210                 215                 220
Arg Leu Arg Thr Val Ile Leu Ala Pro Thr Arg Val Val Ala Ala Glu
225                 230                 235                 240
Met Glu Glu Ala Leu Arg Gly Leu Pro Val Arg Tyr Met Thr Thr Ala
                 245                 250                 255
Val Asn Val Thr His Ser Gly Thr Glu Ile Val Asp Leu Met Cys His
             260                 265                 270
Ala Thr Phe Thr Ser Arg Leu Leu Gln Pro Ile Arg Val Pro Asn Tyr
             275                 280                 285
Asn Leu Tyr Ile Met Asp Glu Ala His Phe Thr Asp Pro Ser Ser Ile
             290                 295                 300
Ala Ala Arg Gly Tyr Ile Ser Thr Arg Val Glu Met Gly Glu Ala Ala
305                 310                 315                 320
Ala Ile Phe Met Thr Ala Thr Pro Pro Gly Thr Arg Asp Ala Phe Pro
                 325                 330                 335
Asp Ser Asn Ser Pro Ile Met Asp Thr Glu Val Glu Val Pro Glu Arg
             340                 345                 350
Ala Trp Ser Ser Gly Phe Asp Trp Val Thr Asp His Ser Gly Lys Thr
             355                 360                 365
Val Trp Phe Val Pro Ser Val Arg Asn Gly Asn Glu Ile Ala Ala Cys
             370                 375                 380
Leu Thr Lys Ala Gly Lys Arg Val Ile Gln Leu Ser Arg Lys Thr Phe
385                 390                 395                 400
Glu Thr Glu Phe Gln Lys Thr Lys His Gln Glu Trp Asp Phe Val Val
                 405                 410                 415
Thr Thr Asp Ser Gly Ala Leu Trp Asp Val Pro Ala Pro Lys Glu Val
                 420                 425                 430
Lys Lys Gly Glu Thr Thr Asp Gly Val Tyr Arg Val Met Thr Arg Arg
             435                 440                 445
Leu Leu Gly Ser Thr Gln Val Gly Val Gly Val Met Gln Glu Gly Val
```

```
                   450               455               460
Phe His Thr Met Trp His Val Thr Lys Gly Ser Ala Leu Arg Ser Gly
465               470               475               480

Glu Gly Arg Leu Asp Pro Tyr Trp Gly Asp Val Lys Gln Asp Leu Val
                485               490               495

Ser Tyr Cys Gly Pro Trp Lys Leu Asp Ala Ala Trp Asp Gly His Ser
                500               505               510

Glu Val Gln Leu Leu Ala Val Pro Pro Gly Glu Arg Ala Arg Asn Ile
                515               520               525

Gln Thr Leu Pro Gly Ile Phe Lys Thr Lys Asp Gly Asp Ile Gly Ala
                530               535               540

Val Ala Leu Asp Tyr Pro Ala Gly Thr Ser Gly Ser Pro Ile Leu Asp
545               550               555               560

Lys Cys Gly Arg Val Ile Gly Leu Tyr Gly Asn Gly Val Val Ile Lys
                565               570               575

Asn Gly Ser Tyr Val Ser Ala Ile Thr Gln Gly Arg Arg Glu Glu Glu
                580               585               590

Thr Pro Val Glu Cys Phe Glu Pro Ser Met Leu Lys Lys Lys Gln Leu
                595               600               605

Thr Val Leu Asp Leu His Pro Gly Ala Gly Lys Thr Arg Arg Val Leu
                610               615               620
```

<210> SEQ ID NO 8
<211> LENGTH: 618
<212> TYPE: PRT
<213> ORGANISM: Dengue virus

<400> SEQUENCE: 8

```
Ala Gly Val Leu Trp Asp Val Pro Ser Pro Pro Val Gly Lys Ala
1               5               10              15

Glu Leu Glu Asp Gly Ala Tyr Arg Ile Lys Gln Arg Gly Ile Phe Gly
                20              25              30

Tyr Ser Gln Ile Gly Ala Gly Val Tyr Lys Glu Gly Thr Phe His Thr
                35              40              45

Met Trp His Val Thr Arg Gly Ala Val Leu Met His Arg Gly Lys Arg
                50              55              60

Ile Glu Pro Ser Trp Ala Asp Val Lys Lys Asp Leu Ile Ser Tyr Gly
65              70              75              80

Gly Gly Trp Lys Leu Glu Gly Glu Trp Lys Glu Gly Glu Glu Val Gln
                85              90              95

Val Leu Ala Leu Glu Pro Gly Lys Asn Pro Arg Ala Val Gln Thr Lys
                100             105             110

Pro Gly Leu Phe Lys Thr Asn Thr Gly Thr Ile Gly Ala Val Ser Leu
                115             120             125

Asp Phe Ser Pro Gly Thr Ser Gly Ser Pro Ile Val Asp Arg Lys Gly
                130             135             140

Lys Val Val Gly Leu Tyr Gly Asn Gly Val Val Thr Arg Ser Gly Ala
145             150             155             160

Tyr Val Ser Ala Ile Ala Gln Thr Glu Lys Ser Ile Glu Asp Asn Pro
                165             170             175

Glu Ile Glu Asp Asp Ile Phe Arg Lys Lys Arg Leu Thr Ile Met Asp
                180             185             190

Leu His Pro Gly Ala Gly Lys Thr Lys Arg Tyr Leu Pro Ala Ile Val
                195             200             205
```

-continued

Arg Glu Ala Ile Lys Arg Gly Leu Arg Thr Leu Ile Leu Ala Pro Thr
210                 215                 220

Arg Val Val Ala Ala Glu Met Glu Glu Ala Leu Arg Gly Leu Pro Ile
225                 230                 235                 240

Arg Tyr Gln Thr Pro Ala Ile Arg Ala Glu His Thr Gly Arg Glu Ile
            245                 250                 255

Val Asp Leu Met Cys His Ala Thr Phe Thr Met Arg Leu Leu Ser Pro
                260                 265                 270

Val Arg Val Pro Asn Tyr Asn Leu Ile Ile Met Asp Glu Ala His Phe
            275                 280                 285

Thr Asp Pro Ala Ser Ile Ala Ala Arg Gly Tyr Ile Ser Thr Arg Val
290                 295                 300

Glu Met Gly Glu Ala Ala Gly Ile Phe Met Thr Ala Thr Pro Pro Gly
305                 310                 315                 320

Ser Arg Asp Pro Phe Pro Gln Ser Asn Ala Pro Ile Met Asp Glu Glu
            325                 330                 335

Arg Glu Ile Pro Glu Arg Ser Trp Asn Ser Gly His Glu Trp Val Thr
            340                 345                 350

Asp Phe Lys Gly Lys Thr Val Trp Phe Val Pro Ser Ile Lys Ala Gly
        355                 360                 365

Asn Asp Ile Ala Ala Cys Leu Arg Lys Asn Gly Lys Lys Val Ile Gln
370                 375                 380

Leu Ser Arg Lys Thr Phe Asp Ser Glu Tyr Val Lys Thr Arg Ala Asn
385                 390                 395                 400

Asp Trp Asp Phe Val Val Thr Thr Asp Ile Ser Glu Met Gly Ala Asn
            405                 410                 415

Phe Arg Ala Glu Arg Val Ile Asp Pro Arg Arg Cys Met Lys Pro Val
        420                 425                 430

Ile Leu Thr Asp Gly Glu Glu Arg Val Ile Leu Ala Gly Pro Met Pro
            435                 440                 445

Val Thr His Ser Ser Ala Ala Gln Arg Arg Gly Arg Ile Gly Arg Asn
        450                 455                 460

Pro Lys Asn Glu Asn Asp Gln Tyr Ile Tyr Met Gly Glu Pro Leu Glu
465                 470                 475                 480

Asn Asp Glu Asp Cys Ala His Trp Lys Glu Ala Lys Met Leu Leu Asp
            485                 490                 495

Asn Ile Asn Thr Pro Glu Gly Ile Ile Pro Ser Met Phe Glu Pro Glu
            500                 505                 510

Arg Glu Lys Val Asp Ala Ile Asp Gly Glu Tyr Arg Leu Arg Gly Glu
        515                 520                 525

Ala Arg Lys Thr Phe Val Asp Leu Met Arg Arg Gly Asp Leu Pro Val
530                 535                 540

Trp Leu Ala Tyr Arg Val Ala Ala Glu Gly Ile Asn Tyr Ala Asp Arg
545                 550                 555                 560

Arg Trp Cys Phe Asp Gly Ile Lys Asn Asn Gln Ile Leu Glu Glu Asn
            565                 570                 575

Val Glu Val Glu Ile Trp Thr Lys Glu Gly Glu Arg Lys Lys Leu Lys
            580                 585                 590

Pro Arg Trp Leu Asp Ala Arg Ile Tyr Ser Asp Pro Leu Ala Leu Lys
        595                 600                 605

Glu Phe Lys Glu Phe Ala Ala Gly Arg Lys
610                 615

```
<210> SEQ ID NO 9
<211> LENGTH: 15
<212> TYPE: PRT
<213> ORGANISM: Zika virus

<400> SEQUENCE: 9

Ile Gly Val Ser Asn Arg Asp Phe Val Glu Gly Met Ser Gly Gly
1               5                   10                  15

<210> SEQ ID NO 10
<211> LENGTH: 15
<212> TYPE: PRT
<213> ORGANISM: Zika virus

<400> SEQUENCE: 10

Thr Trp Val Asp Val Val Leu Glu His Gly Gly Cys Val Thr Val
1               5                   10                  15

<210> SEQ ID NO 11
<211> LENGTH: 15
<212> TYPE: PRT
<213> ORGANISM: Zika virus

<400> SEQUENCE: 11

Met Ala Gln Asp Lys Pro Thr Val Asp Ile Glu Leu Val Thr Thr
1               5                   10                  15

<210> SEQ ID NO 12
<211> LENGTH: 15
<212> TYPE: PRT
<213> ORGANISM: Zika virus

<400> SEQUENCE: 12

Val Asp Arg Gly Trp Gly Asn Gly Cys Gly Leu Phe Gly Lys Gly
1               5                   10                  15

<210> SEQ ID NO 13
<211> LENGTH: 15
<212> TYPE: PRT
<213> ORGANISM: Zika virus

<400> SEQUENCE: 13

Val Val Leu Gly Ser Gln Glu Gly Ala Val His Thr Ala Leu Ala
1               5                   10                  15

<210> SEQ ID NO 14
<211> LENGTH: 15
<212> TYPE: PRT
<213> ORGANISM: Zika virus

<400> SEQUENCE: 14

Ala Glu Thr Asp Glu Asp His Ala His Trp Leu Glu Ala Arg Met
1               5                   10                  15

<210> SEQ ID NO 15
<211> LENGTH: 15
<212> TYPE: PRT
<213> ORGANISM: Zika virus

<400> SEQUENCE: 15

His Ala His Trp Leu Glu Ala Arg Met Leu Leu Asp Asn Ile Tyr
1               5                   10                  15

<210> SEQ ID NO 16
<211> LENGTH: 15
```

```
<212> TYPE: PRT
<213> ORGANISM: Zika virus

<400> SEQUENCE: 16

Ala Arg Met Leu Leu Asp Asn Ile Tyr Leu Gln Asp Gly Leu Ile
1               5                   10                  15

<210> SEQ ID NO 17
<211> LENGTH: 15
<212> TYPE: PRT
<213> ORGANISM: Zika virus

<400> SEQUENCE: 17

Asn Ile Tyr Leu Gln Asp Gly Leu Ile Ala Ser Leu Tyr Arg Pro
1               5                   10                  15

<210> SEQ ID NO 18
<211> LENGTH: 15
<212> TYPE: PRT
<213> ORGANISM: Zika virus

<400> SEQUENCE: 18

Gly Leu Ile Ala Ser Leu Tyr Arg Pro Glu Ala Asp Lys Val Ala
1               5                   10                  15

<210> SEQ ID NO 19
<211> LENGTH: 15
<212> TYPE: PRT
<213> ORGANISM: Zika virus

<400> SEQUENCE: 19

Tyr Arg Pro Glu Ala Asp Lys Val Ala Ala Ile Glu Gly Glu Phe
1               5                   10                  15

<210> SEQ ID NO 20
<211> LENGTH: 15
<212> TYPE: PRT
<213> ORGANISM: Zika virus

<400> SEQUENCE: 20

Lys Val Ala Ala Ile Glu Gly Glu Phe Lys Leu Arg Thr Glu Gln
1               5                   10                  15

<210> SEQ ID NO 21
<211> LENGTH: 15
<212> TYPE: PRT
<213> ORGANISM: Zika virus

<400> SEQUENCE: 21

Gly Glu Phe Lys Leu Arg Thr Glu Gln Arg Lys Thr Phe Val Glu
1               5                   10                  15

<210> SEQ ID NO 22
<211> LENGTH: 15
<212> TYPE: PRT
<213> ORGANISM: Zika virus

<400> SEQUENCE: 22

Thr Glu Gln Arg Lys Thr Phe Val Glu Leu Met Lys Arg Gly Asp
1               5                   10                  15

<210> SEQ ID NO 23
<211> LENGTH: 12
<212> TYPE: PRT
<213> ORGANISM: Zika virus
```

```
<400> SEQUENCE: 23

Phe Val Glu Leu Met Lys Arg Gly Asp Leu Pro Val
1               5                   10
```